US012590754B2

(12) United States Patent
Yang et al.

(10) Patent No.: US 12,590,754 B2
(45) Date of Patent: Mar. 31, 2026

(54) REFRIGERATOR

(71) Applicant: HISENSE REFRIGERATOR CO., LTD., Qingdao (CN)

(72) Inventors: Chun Yang, Qingdao (CN); Dong Guo, Qingdao (CN); Xiangping Zhang, Qingdao (CN); Jing Fu, Qingdao (CN); Yufeng Bao, Qingdao (CN); Haiyan Wang, Qingdao (CN)

(73) Assignee: HISENSE REFRIGERATOR CO., LTD., Qingdao (CN)

( * ) Notice: Subject to any disclaimer, the term of this patent is extended or adjusted under 35 U.S.C. 154(b) by 89 days.

(21) Appl. No.: 18/607,105

(22) Filed: Mar. 15, 2024

(65) Prior Publication Data

US 2024/0219106 A1 Jul. 4, 2024

Related U.S. Application Data

(63) Continuation of application No. PCT/CN2022/118562, filed on Sep. 13, 2022.

(30) Foreign Application Priority Data

Sep. 18, 2021 (CN) ......................... 202111098814.X
Sep. 18, 2021 (CN) ......................... 202111104648.X
(Continued)

(51) Int. Cl.
*F25D 23/02* (2006.01)
*E05D 3/18* (2006.01)
*F25D 23/06* (2006.01)

(52) U.S. Cl.
CPC ............ *F25D 23/028* (2013.01); *E05D 3/18* (2013.01); *F25D 23/062* (2013.01);
(Continued)

(58) Field of Classification Search
None
See application file for complete search history.

(56) References Cited

U.S. PATENT DOCUMENTS 1,075,130 A * 10/1913 Streberger ................ E05D 3/18 5/47
2,793,387 A * 5/1957 Odell ........................ E05D 3/18 16/358

(Continued)

FOREIGN PATENT DOCUMENTS

CN 101501288 A 8/2009
CN 104295174 A 1/2015

(Continued)

OTHER PUBLICATIONS

Chinese Notification of the First Office Action dated Aug. 15, 2023 in corresponding Chinese Application No. 202210388529.X, translated, 19 pages.

(Continued)

*Primary Examiner* — Hanh V Tran
(74) *Attorney, Agent, or Firm* — MH2 TECHNOLOGY LAW GROUP LLP

(57) ABSTRACT

A refrigerator includes a box body, a hinge assembly, and a door body. The hinge assembly includes a plate body, a locking hook, and a blocking portion. A free end of the locking hook extends in a direction away from the plate body and is bent in a direction proximate to the plate body, so as to form an opening toward the plate body. In a case where the door body is in a closed state, the blocking portion is located in the opening. During a process from closing to opening of the door body, the locking hook is deformed under force to be disengaged from the blocking portion and unlocked.

16 Claims, 13 Drawing Sheets

(30) Foreign Application Priority Data

Apr. 29, 2022 (CN) ......................... 202210464670.3
Apr. 29, 2022 (CN) ......................... 202210464933.0
Apr. 29, 2022 (CN) ......................... 202210464946.8

(52) U.S. Cl.
CPC ..... *E05Y 2900/31* (2013.01); *F25D 2323/024* (2013.01); *F25D 2323/06* (2013.01)

(56) References Cited

U.S. PATENT DOCUMENTS

| | | | | | |
|---|---|---|---|---|---|
| 2,867,839 | A * | 1/1959 | Squire | E05D 3/18 16/358 |
| 3,065,498 | A * | 11/1962 | Johnson | E05D 3/18 16/359 |
| 3,083,403 | A | 4/1963 | Van Noord | |
| 5,265,954 | A * | 11/1993 | Keil | E05D 7/081 312/405 |
| 6,493,906 | B2 * | 12/2002 | Matteau | E05D 3/18 16/358 |
| 8,303,059 | B2 * | 11/2012 | Darney | E05D 3/18 312/405 |
| 2012/0025686 | A1 | 2/2012 | Darney | |
| 2019/0186183 | A1 * | 6/2019 | He | E05D 11/06 |
| 2020/0124342 | A1 * | 4/2020 | Zhang | E05D 3/18 |
| 2020/0141166 | A1 | 5/2020 | Zhang et al. | |
| 2022/0259904 | A1 | 8/2022 | Xia et al. | |
| 2022/0259907 | A1 * | 8/2022 | Xia | E05D 3/18 |
| 2023/0375252 | A1 * | 11/2023 | Zhong | F25D 23/02 |
| 2023/0383582 | A1 | 11/2023 | Zhong et al. | |
| 2024/0167756 | A1 * | 5/2024 | Yang | F25D 23/063 |

FOREIGN PATENT DOCUMENTS

| | | | | |
|---|---|---|---|---|
| CN | 106196819 A | | 12/2016 | |
| CN | 106766596 A | | 5/2017 | |
| CN | 107178268 A | * | 9/2017 | E05D 11/00 |
| CN | 207048541 U | | 2/2018 | |
| CN | 109470000 A | | 3/2019 | |
| CN | 109470004 A | | 3/2019 | |
| CN | 109470018 A | | 3/2019 | |
| CN | 110220291 A | | 9/2019 | |
| CN | 111155859 A | | 5/2020 | |
| CN | 111734244 A | | 10/2020 | |
| CN | 112282540 A | | 1/2021 | |
| CN | 112282542 A | * | 1/2021 | E05D 11/1028 |
| CN | 112282543 A | | 1/2021 | |
| CN | 112282547 A | | 1/2021 | |
| CN | 112282549 A | | 1/2021 | |
| CN | 112284018 A | | 1/2021 | |
| CN | 212378331 U | | 1/2021 | |
| CN | 112304007 A | | 2/2021 | |
| CN | 112304008 A | | 2/2021 | |
| CN | 112360267 A | * | 2/2021 | E05D 3/18 |
| CN | 112444071 A | | 3/2021 | |
| CN | 112444086 A | * | 3/2021 | E05D 5/00 |
| CN | 112595011 A | | 4/2021 | |
| CN | 213330533 U | | 6/2021 | |
| CN | 215632370 U | | 1/2022 | |
| CN | 215983419 U | | 3/2022 | |
| CN | 114812073 A | | 7/2022 | |
| CN | 114812074 A | | 7/2022 | |
| CN | 114812075 A | | 7/2022 | |
| CN | 114812076 A | | 7/2022 | |
| CN | 114812077 A | | 7/2022 | |
| CN | 114812078 A | | 7/2022 | |
| CN | 114812079 A | | 7/2022 | |
| CN | 114812080 A | | 7/2022 | |
| CN | 114812081 A | | 7/2022 | |
| CN | 114812082 A | | 7/2022 | |
| CN | 114877602 A | | 8/2022 | |
| CN | 114877603 A | | 8/2022 | |
| CN | 114963662 A | | 8/2022 | |
| CN | 114963663 A | | 8/2022 | |
| CN | 114963664 A | | 8/2022 | |
| CN | 114963665 A | | 8/2022 | |
| CN | 114963666 A | | 8/2022 | |
| CN | 114963667 A | | 8/2022 | |
| CN | 115031477 A | | 9/2022 | |
| CN | 115143688 A | | 10/2022 | |
| CN | 115143689 A | | 10/2022 | |
| CN | 115143690 A | | 10/2022 | |
| CN | 115143691 A | | 10/2022 | |
| CN | 115143692 A | | 10/2022 | |
| CN | 115143693 A | | 10/2022 | |
| CN | 115143694 A | | 10/2022 | |
| CN | 115143695 A | | 10/2022 | |
| CN | 115143696 A | | 10/2022 | |
| CN | 115143697 A | | 10/2022 | |
| CN | 115143698 A | | 10/2022 | |
| CN | 115143699 A | | 10/2022 | |
| CN | 115143700 A | | 10/2022 | |
| CN | 115143701 A | | 10/2022 | |
| CN | 115143702 A | | 10/2022 | |
| CN | 115143703 A | | 10/2022 | |
| CN | 115143704 A | | 10/2022 | |
| CN | 115143705 A | | 10/2022 | |
| CN | 115143706 A | | 10/2022 | |
| CN | 115200304 A | | 10/2022 | |
| CN | 115289754 A | | 11/2022 | |
| CN | 115289755 A | | 11/2022 | |
| CN | 115289756 A | | 11/2022 | |
| CN | 115289757 A | | 11/2022 | |
| CN | 115289758 A | | 11/2022 | |
| CN | 115307361 A | | 11/2022 | |
| CN | 115307362 A | | 11/2022 | |
| CN | 115307363 A | | 11/2022 | |
| CN | 115307364 A | | 11/2022 | |
| CN | 115307365 A | | 11/2022 | |
| CN | 115307366 A | | 11/2022 | |
| CN | 115307367 A | | 11/2022 | |
| CN | 115307368 A | | 11/2022 | |
| CN | 115523710 A | | 12/2022 | |
| CN | 115615099 A | | 1/2023 | |
| CN | 115615100 A | | 1/2023 | |
| CN | 115680403 A | | 2/2023 | |
| CN | 115680404 A | | 2/2023 | |
| CN | 115680408 A | | 2/2023 | |
| CN | 115680409 A | | 2/2023 | |
| CN | 115680411 A | | 2/2023 | |
| CN | 115682514 A | | 2/2023 | |
| CN | 115682515 A | | 2/2023 | |
| CN | 115682516 A | | 2/2023 | |
| CN | 115682517 A | | 2/2023 | |
| CN | 115682518 A | | 2/2023 | |
| CN | 115682519 A | | 2/2023 | |
| CN | 115682520 A | | 2/2023 | |
| CN | 115682521 A | | 2/2023 | |
| CN | 115682522 A | | 2/2023 | |
| CN | 115682523 A | | 2/2023 | |
| CN | 115682524 A | | 2/2023 | |
| CN | 115682561 A | | 2/2023 | |
| CN | 115682594 A | | 2/2023 | |
| CN | 115682595 A | | 2/2023 | |
| CN | 115682596 A | | 2/2023 | |
| CN | 115682597 A | | 2/2023 | |
| CN | 115682598 A | | 2/2023 | |
| CN | 115682599 A | | 2/2023 | |
| CN | 115682600 A | | 2/2023 | |
| CN | 115682601 A | | 2/2023 | |
| CN | 115682602 A | | 2/2023 | |
| CN | 115682603 A | | 2/2023 | |
| CN | 115682604 A | | 2/2023 | |
| CN | 115682605 A | | 2/2023 | |
| CN | 115823798 A | | 3/2023 | |
| CN | 115823803 A | | 3/2023 | |
| CN | 115839568 A | | 3/2023 | |
| CN | 115839569 A | | 3/2023 | |
| CN | 115839570 A | | 3/2023 | |
| CN | 115839571 A | | 3/2023 | |
| CN | 115839572 A | | 3/2023 | |
| CN | 115839573 A | | 3/2023 | |

(56) References Cited

FOREIGN PATENT DOCUMENTS

| | | | | | |
|---|---|---|---|---|---|
| CN | 115839580 | A | | 3/2023 | |
| CN | 115839581 | A | | 3/2023 | |
| CN | 115839582 | A | | 3/2023 | |
| CN | 115839583 | A | | 3/2023 | |
| CN | 115839584 | A | * | 3/2023 | F25D 23/062 |
| CN | 115839585 | A | | 3/2023 | |
| CN | 115839586 | A | | 3/2023 | |
| CN | 115839587 | A | | 3/2023 | |
| CN | 115839588 | A | | 3/2023 | |
| CN | 116358235 | A | | 6/2023 | |
| CN | 116378522 | A | | 7/2023 | |
| CN | 116412594 | A | | 7/2023 | |
| CN | 116412595 | A | | 7/2023 | |
| CN | 116412596 | A | | 7/2023 | |
| CN | 116412598 | A | | 7/2023 | |
| CN | 116412599 | A | | 7/2023 | |
| CN | 219550952 | U | | 8/2023 | |
| CN | 219589259 | U | | 8/2023 | |
| CN | 219693630 | U | | 9/2023 | |
| CN | 219735700 | U | | 9/2023 | |
| CN | 219735701 | U | | 9/2023 | |
| CN | 219735709 | U | | 9/2023 | |
| CN | 219735710 | U | | 9/2023 | |
| CN | 117804117 | A | | 4/2024 | |
| CN | 117804134 | A | | 4/2024 | |
| CN | 117804135 | A | | 4/2024 | |
| CN | 117804136 | A | | 4/2024 | |
| CN | 117804137 | A | | 4/2024 | |
| CN | 117824269 | A | | 4/2024 | |
| CN | 117847887 | A | | 4/2024 | |
| CN | 117847888 | A | | 4/2024 | |
| CN | 117847898 | A | | 4/2024 | |
| CN | 117847899 | A | | 4/2024 | |
| CN | 117847900 | A | | 4/2024 | |
| CN | 117847901 | A | | 4/2024 | |
| CN | 117847902 | A | | 4/2024 | |
| CN | 117847903 | A | | 4/2024 | |
| CN | 117847904 | A | | 4/2024 | |
| CN | 118009609 | A | | 5/2024 | |
| CN | 118009610 | A | | 5/2024 | |
| CN | 118049788 | A | | 5/2024 | |
| CN | 118049789 | A | | 5/2024 | |
| CN | 118049790 | A | | 5/2024 | |
| CN | 118049791 | A | | 5/2024 | |
| CN | 118049792 | A | | 5/2024 | |
| CN | 118049793 | A | | 5/2024 | |
| CN | 118049794 | A | | 5/2024 | |
| CN | 118049795 | A | | 5/2024 | |
| CN | 118049796 | A | | 5/2024 | |
| CN | 118049797 | A | | 5/2024 | |
| CN | 118049798 | A | | 5/2024 | |
| CN | 118049799 | A | | 5/2024 | |
| CN | 118128385 | A | | 6/2024 | |
| CN | 118128386 | A | | 6/2024 | |
| CN | 118128387 | A | | 6/2024 | |
| CN | 118128388 | A | | 6/2024 | |
| CN | 118128389 | A | | 6/2024 | |
| CN | 118128390 | A | | 6/2024 | |
| CN | 118128391 | A | | 6/2024 | |
| CN | 118128392 | A | | 6/2024 | |
| CN | 118129371 | A | | 6/2024 | |
| CN | 118129372 | A | | 6/2024 | |
| CN | 118129379 | A | | 6/2024 | |
| CN | 118129380 | A | | 6/2024 | |
| CN | 118129381 | A | | 6/2024 | |
| CN | 118129382 | A | | 6/2024 | |
| CN | 118129400 | A | | 6/2024 | |
| CN | 118273605 | A | | 7/2024 | |
| CN | 118273606 | A | | 7/2024 | |
| CN | 118274522 | A | | 7/2024 | |
| CN | 118274523 | A | | 7/2024 | |
| CN | 118274524 | A | | 7/2024 | |
| CN | 118274525 | A | | 7/2024 | |
| CN | 118274561 | A | | 7/2024 | |
| CN | 118274562 | A | | 7/2024 | |
| CN | 118274563 | A | | 7/2024 | |
| CN | 118274564 | A | | 7/2024 | |
| CN | 118274565 | A | | 7/2024 | |
| CN | 118274566 | A | | 7/2024 | |
| CN | 118274567 | A | | 7/2024 | |
| CN | 118274568 | A | | 7/2024 | |
| CN | 118274569 | A | | 7/2024 | |
| CN | 116358235 | B | * | 9/2024 | F25D 23/028 |
| CN | 221666382 | U | | 9/2024 | |
| CN | 221705929 | U | | 9/2024 | |
| CN | 221705930 | U | | 9/2024 | |
| CN | 221705931 | U | | 9/2024 | |
| JP | 2002276232 | A | * | 9/2002 | |
| JP | 2004301457 | A | * | 10/2004 | |
| KR | 100390781 | B1 | * | 7/2003 | |
| KR | 100443983 | B1 | * | 8/2004 | E05D 3/18 |
| WO | WO-2015057020 | A1 | * | 4/2015 | F25D 23/028 |
| WO | WO-2021012657 | A1 | * | 1/2021 | F25D 23/028 |
| WO | WO-2021037103 | A1 | * | 3/2021 | F25D 23/02 |
| WO | WO-2021037119 | A1 | * | 3/2021 | E05D 7/084 |
| WO | WO-2022131678 | A1 | * | 6/2022 | F25D 23/025 |

OTHER PUBLICATIONS

Chinese Notification of the First Office Action dated Sep. 15, 2023 in corresponding Chinese Application No. 202210756351.X, translated, 15 pages.

Chinese Notification of the First Office Action dated Aug. 17, 2024 in corresponding Chinese Application No. 202110994578.3, translated, 14 pages.

International Search Report and Written Opinion dated Mar. 14, 2023 in corresponding International Application No. PCT/CN2022/129650, translated, 14 pages.

International Search Report and Written Opinion dated Mar. 28, 2023 in corresponding International Application No. PCT/CN2023/070699, translated, 19 pages.

Chinese Notification of the Second Office Action dated Apr. 11, 2024 in corresponding Chinese Application No. 202210756591.X, translated, 18 pages.

Chinese Notification of the First Office Action dated Oct. 10, 2023 in corresponding Chinese Application No. 202210464644.0, translated, 15 pages.

Chinese Notification of the First Office Action dated Feb. 1, 2023 in corresponding Chinese Application No. 202210464645.5, translated, 16 pages.

Chinese Notification of the Second Office Action dated May 11, 2023 in corresponding Chinese Application No. 202210464645.5, translated, 15 pages.

Chinese Notification of the First Office Action dated Sep. 26, 2023 in corresponding Chinese Application No. 202210464933.0, translated, 17 pages.

Chinese Notification of the First Office Action dated Sep. 7, 2023 in corresponding Chinese Application No. 202210464947.2, translated, 15 pages.

Chinese Notification of the First Office Action dated Sep. 8, 2023 in corresponding Chinese Application No. 202210756350.5, translated, 15 pages.

Chinese Notification of the First Office Action dated Sep. 23, 2023 in corresponding Chinese Application No. 202210756495.5, translated, 13 pages.

Chinese Notification of the Second Office Action dated Apr. 11, 2024 in corresponding Chinese Application No. 202210756495.5, translated, 15 pages.

Chinese Notification of the First Office Action dated May 7, 2023 in corresponding Chinese Application No. 202210905209.7, translated, 16 pages.

International Search Report and Written Opinion dated Sep. 28, 2022 in corresponding International Application No. PCT/CN2022/101652, translated, 18 pages.

International Search Report and Written Opinion dated Nov. 29, 2022 in corresponding International Application No. PCT/CN2022/118564, translated, 22 pages.

(56) References Cited

OTHER PUBLICATIONS

International Search Report and Written Opinion dated Dec. 21, 2022 in corresponding International Application No. PCT/CN2022/119674, translated, 24 pages.
Extended European Search Report dated Nov. 21, 2025 in corresponding European Application No. 22869223.2, 13 pages.

* cited by examiner

REFRIGERATOR

CROSS-REFERENCE TO RELATED APPLICATIONS

This application is a continuation application of International Application No. PCT/CN2022/118562, filed on Sep. 13, 2022, which claims priority to Chinese Patent application No. 202210464946.8, filed on Apr. 29, 2022, Chinese Patent application No. 202210464670.3, filed on Apr. 29, 2022, Chinese Patent application No. 202210464933.0, filed on Apr. 29, 2022, Chinese Patent application No. 202111104648.X, filed on Sep. 18, 2021, and Chinese Patent application No. 202111098814.X, filed on Sep. 18, 2021, which are incorporated herein by reference in their entireties.

TECHNICAL FIELD

The present disclosure relates to the technical field of household appliances and, in particular, to a refrigerator.

BACKGROUND

In family life, the refrigerator has become one of the necessary household appliances in every family. More and more consumers choose built-in refrigerators due to a demand for a beautiful and concise interior.

The built-in refrigerator includes the refrigerator embedded into a matching cabinet and a heat dissipation cycle formed through a bottom plate, a back plate, and a top plate. Therefore, there may be small gaps between left and right side walls of the refrigerator and an inner wall of the cabinet.

SUMMARY

In an aspect, a refrigerator is provided. The refrigerator includes a box body, a cooling device, a door body, a hinge assembly, a mounting block, and a limiting portion. The box body includes an inner container, an outer shell, and a heat insulation layer. A storage compartment is defined therein. The storage compartment includes a freezing compartment and a refrigerating compartment disposed in a height direction. The cooling device is configured to provide cold air to the storage compartment. The door body is configured to open and close the storage compartment and includes a door side wall and a door front wall. The door side wall is a side wall of the door body proximate to the hinge assembly, and the door front wall is a side wall of the door body away from the box body when the door body is closed. The hinge assembly is configured to connect the door body and the box body and includes a first hinge assembly and a second hinge assembly respectively disposed at an upper portion and a lower portion of the box body. The first hinge assembly and the second hinge assembly are connected to the door body and the box body respectively. The first hinge assembly includes a first hinge plate, a first double-shaft assembly, a first trajectory groove, and a second trajectory groove. The first hinge plate includes a first connecting portion and a first extending portion connected to the first connecting portion. The first connecting portion is connected to an upper end of the box body. The first double-shaft assembly includes a first shaft and a second shaft. The first shaft and the second shaft are both formed on the first extending portion. The first shaft is a main shaft, and the second shaft is a secondary shaft. The first trajectory groove and the second trajectory groove are formed on a first end cover disposed on the upper end of the door body and are disposed on a surface of the first end cover proximate to the first hinge plate. During a rotation of the door body, the first shaft moves in the first trajectory groove, and the second shaft moves in the second trajectory groove. A positioning center point of the first shaft moves along a first trajectory line in the first trajectory groove, and a guiding center point of the second shaft moves along a second trajectory line in the second trajectory groove. The first shaft and the second shaft are both cylindrical. An orthogonal projection of a central axis of the first shaft in the first trajectory groove is referred to as the positioning center point, and an orthogonal projection of a central axis of the second shaft in the second trajectory groove is referred to as the guiding center point. In a case where the door body is in a closed state, the positioning center point of the first shaft is located at an initial positioning point of the first trajectory line, and the initial positioning point is located at a side of a bisecting plane away from the door side wall. A bisecting plane of an included angle formed by the door front wall and the door side wall is referred to as the bisecting plane. In a case where an opening angle of the door body is 0°, the door body is in the closed state, the positioning center point is located at the initial positioning point of the first trajectory line, and the guiding center point is located at the initial guiding point of the second trajectory line. During an opening process of the door body, the positioning center point moves from the initial positioning point to the seventh positioning point in the first trajectory line. The seventh positioning point is an end point of the first trajectory line. The guiding center point moves from the initial guiding point to the ninth guiding point in the second trajectory line. The second hinge assembly includes a second hinge plate, a second double-shaft assembly, a third trajectory groove, and a fourth trajectory groove. The second hinge plate includes a second connecting portion, a second extending portion connected to the second connecting portion, and a blocking portion formed at a side of the second extending portion. The second connecting portion is fixedly connected to the box body through a fastener. The blocking portion extends from the side of the second extending portion in a direction away from the second extending portion, and a second gap is defined between the blocking portion and the second connecting portions. The second double-shaft assembly includes a third shaft and a fourth shaft. The third shaft and the fourth shaft are both formed on the second extending portion. The mounting block is disposed in an accommodating groove at a lower end of the door body, and the mounting block includes a plate body, a protruding portion, and a locking hook formed on the plate body. The plate body extends downward to form the protruding portion, and a third trajectory groove and a fourth trajectory groove are defined in the protruding portion. The plate body and the protruding portion are integrally formed. A free end of the locking hook extends in a direction away from the plate body and is bent in a direction proximate to the plate body, so as to form an opening toward the plate body. In a case where the door body is in the closed state, the blocking portion is located in the opening, and the free end of the locking hook is located in the second gap. During a process from closing to opening of the door body, the locking hook is deformed under force to be disengaged from the blocking portion and unlocked. The limiting portion includes an embedding portion and a limiting bar, and the limiting portion is a sheet metal member. The embedding portion is plate-shaped. The embedding portion is clamped to an inner wall of the accommodating groove through the mounting block and is fixedly installed in the accommodating groove.

The limiting bar and the embedding portion are connected and integrally formed. The limiting bar extends along a width direction of the door body. The second hinge plate further includes a limiting groove, and the limiting groove is located at a side of the second extending portion proximate to the door side wall and proximate to the door front wall. In a case where the door body is rotated to a maximum angle, the limiting bar abuts against the limiting groove, so as to prevent the door body from continuing to rotate. In a case where the door body is opened to a seventh angle, the positioning center point moves to an end point of the first trajectory line proximate to the door side wall and proximate to the door front wall, there is a fifth gap between the first shaft and an end wall of the first trajectory groove proximate to the door side wall and proximate to the door front wall, and the second shaft moves to a middle of the second trajectory groove.

In another aspect, a refrigerator is provided. The refrigerator includes a box body, a door body, and a hinge assembly. The box body defines a storage compartment therein, and the storage compartment includes a freezing compartment and a refrigerating compartment disposed in a height direction. The door body is used to open and close the storage compartment. The door body includes a left side wall, a right side wall, an upper side wall, a lower side wall, a door front wall, and a door rear wall. A side wall of the left side wall and the right side wall of the door body proximate to a hinge assembly is referred to as a door side wall. The door front wall is a side wall of the door body away from the box body when the door body is closed, and the door rear wall is a side wall of the door body proximate to the box body when the door body is closed. And a side edge formed by an intersection of the door front wall and the door side wall is referred to as a first side edge, and a side edge formed by an intersection of the door side wall and the door rear wall is referred to as a second side edge. The hinge assembly is a first hinge assembly or a second hinge assembly. The first hinge assembly is disposed on an upper portion of the box body and fixedly connected to the box body and the door body. The second hinge assembly is disposed on a lower portion of the box body and fixedly connected to the box body and the door body. And the first hinge assembly and the second hinge assembly are disposed along a same axis, so that the door body rotates around the axis to implement opening and closing of the door body. The first hinge assembly includes a first hinge plate, a first double-shaft assembly, a first trajectory groove, and a second trajectory groove. The first hinge plate includes a first connecting portion and a first extending portion connected to the first connecting portion. The first double-shaft assembly includes a first shaft and a second shaft. The first shaft and the second shaft are both formed on the first extending portion. The first shaft is a main shaft, and the second shaft is a secondary shaft. The first hinge assembly further includes a first mounting block, and the first mounting block includes a first plate body and a first protruding portion. The first plate body extends downwards to form the first protruding portion, and the first protruding portion defines the first trajectory groove and the second trajectory groove therein. The second hinge assembly includes a second hinge plate, a second double-shaft assembly, a third trajectory groove, and a fourth trajectory groove. The second hinge plate includes a second connecting portion and a second extending portion connected to the second connecting portion. The second extending portion extends along the second connecting portion towards a direction away from the box body. The second connecting portion is fixedly connected to the box body through a fastener. The second double-shaft assembly includes a third shaft and a fourth shaft. The third shaft and the fourth shaft are both disposed on the second extending portion and extends upwards from an upper surface of the second extending portion. The third shaft is inserted in the third trajectory groove and matched with the third trajectory groove. The fourth shaft is inserted in the four trajectory grooves and matched with the fourth trajectory groove. The second hinge assembly further includes a second mounting block. The second mounting block includes a second plate body and a second protruding portion. The plate body extends upwards to form the second protruding portion, and the second protruding portion defines the third trajectory groove and the fourth trajectory groove therein. The door body includes a second end cover. The second end cover is disposed at a lower end of the door body and corresponding to a position of the second hinge assembly. The second end cover includes a second receiving groove, the second receiving groove is opened downwards, and the second mounting block is embedded in the second receiving groove. The second hinge plate further includes a first fit portion, and the second mounting block further includes a second fit portion matched with the first fit portion. When closing the door body, the first fit portion and the second fit portion are matched and locked, and when opening the door body, the first fit portion and the second fit portion are disengaged from locking. The second fit portion is configured as a locking hook. The locking hook is disposed at a side of the second plate body. A fixed end of the locking hook is fixedly connected to the second plate body, and a free end of the locking hook extends in a direction away from the second plate body and is bent in a direction proximate to the second plate body, so as to form an opening towards the second plate body. And the free end of the locking hook is closer to the box body than the fixed end of the locking hook. The first fit portion is configured as a blocking portion. The blocking portion is disposed at a side of the second extending portion, the blocking portion extends from the side of the second extending portion in a direction away from the second extending portion, and a second gap is defined between the blocking portion and the second connecting portions. In a case where the door body is in a closed state, the blocking portion is located in the opening. The free end of the locking hook is located in the second gap and abutting against a side of the blocking portion proximate to the box body. During a process of the door body being opened, the locking hook is deformed under force to overcome blocking of the blocking portion, so that the locking hook is disengaged from the blocking portion. The locking hook includes a third extending portion and a bending portion. The third extending portion is connected to a side of the second plate body, and the third extending portion is integrally formed with the second plate body. An end of the bending portion is fixedly connected to an end of the third extending portion away from the second plate body, and another end of the bending portion extends in the direction away from the second plate body and is bent in the direction proximate to the second plate body. The third extending portion is fixedly connected to the second end cover disposed at the lower end of the door body through a fastener. During a rotation of the door body, the first shaft moves in the first trajectory groove, and the second shaft moves in the second trajectory groove. A limiting portion includes an embedding portion and a limiting bar. The limiting portion is a sheet metal member. The limiting bar and the embedding portion are integrally formed. The limiting bar extends along a width direction of the door body. The embedding portion is plate-shaped and is embedded in the second receiving groove. The limiting portion is fixedly installed in the second accommodating groove through clamping of the second mounting block and an inner wall of the second accommodating groove. The second hinge plate further includes a limiting groove. The limiting groove is located at a position of the second extending portion proximate to the door side wall and proximate to the door front wall and running through the second extending portion along a thickness direction of the second extending portion. In a case where the door body rotates to a maximum angle, the limiting bar abuts against the limiting groove, thereby blocking the door body from continuing to rotate. The first shaft and the second shaft are both cylindrical. An orthogonal projection of a central axis of the first shaft in the first trajectory groove is referred to as a positioning center point, and an orthogonal projection of a central axis of the second shaft in the second trajectory groove is referred to as a guiding center point. In a case where the door body is opened to different angles, the positioning center point moves along a first trajectory line, and the guiding center point moves along a second trajectory line. In a case where an opening angle of the door body is 0°, the door body is in the closed state, the positioning center point is located at an initial positioning point of the first trajectory line, and the guiding center point is located at an initial guiding point of the second trajectory line. A bisecting plane of an included angle formed by the door front wall and the door side wall is referred to as a bisecting plane. A point located at a side of the bisecting plane away from the door side wall is referred to as a third setting position. In a case where the door body is closed, the initial positioning point is located at the third setting position. During the opening process of the door body, the first trajectory line extends from the initial positioning point to a direction proximate to the door side wall and then extends to a seventh positioning point in a certain arc towards a direction proximate to the door side wall and proximate to the door front wall. The seventh positioning point is an end point of the first trajectory line. The second trajectory line includes the initial guiding point and a ninth guiding point that is closer to the door side wall and further away from the door front wall compared to the initial guiding point. In a case where the door body is opened to a first angle, the positioning center point is located at a first positioning point of the first trajectory line, and the first positioning point is closer to the door side wall than the initial positioning point. The guiding center point is located at a first guiding point of the second trajectory line, and the first guiding point is closer to the door side wall and farther away from the door front wall than the initial guiding point. In a case where the door body is opened to a second angle, the door body is rotated and opened to the second angle, and the locking hook is disengaged from the blocking portion. During a process of the door body being opened from any angle greater than the closed state to any angle less than the second angle, movement trends of the guiding center point and the positioning center point remain unchanged. During a process of the door body being opened from any angle greater than the second angle to any angle less than a seventh angle, the positioning center point of the first shaft moves along a curved trajectory segment of the first trajectory line towards a direction proximate to the door side wall and proximate to the door front wall, and the guiding center point of the second shaft moves along the second trajectory line towards a direction proximate to the door side wall and away from the door front wall. In a case where the door body is opened to the seventh angle, the positioning center point is located at the seventh positioning point on the first trajectory line, and the guiding center point is located at the seventh guiding point on the second trajectory line. The first angle is less than the second angle, the second angle is less than the seventh angle, the seventh angle is less than an eighth angle, and the eighth angle is equal to 90°.

BRIEF DESCRIPTION OF THE DRAWINGS

In order to describe technical solutions in the present disclosure more clearly, the accompanying drawings to be used in some embodiments of the present disclosure will be introduced briefly.

DETAILED DESCRIPTION

Figure 1:
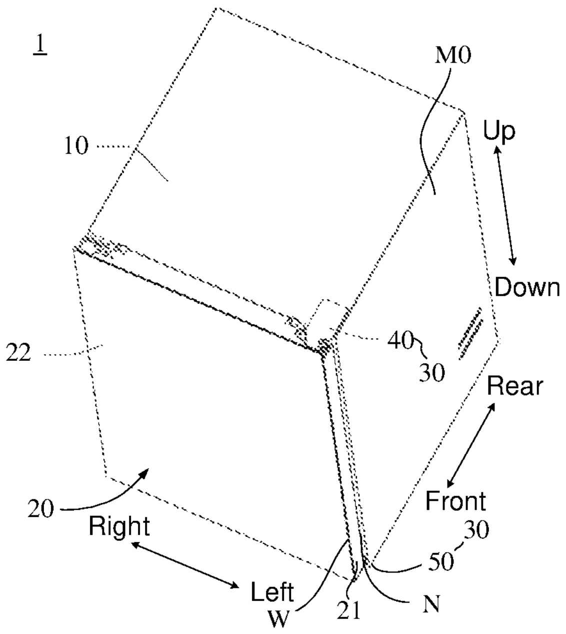
FIG. 1 is a perspective view of a refrigerator, in accordance with some embodiments.

The technical solutions in some embodiments of the present disclosure will be described clearly and completely with reference to the accompanying drawings; obviously, the described embodiments are merely some but not all of embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

The terms "first" and "second" are used for descriptive purposes only, and are not to be construed as indicating or implying a relative importance or implicitly indicating a number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled," "connected," and derivatives thereof may be used. For example, the term "connected" may be used in the description of some embodiments to indicate that two or more elements are in direct physical or electrical contact with each other. For another example, the term "coupled" may be used in the description of some embodiments to indicate that two or more elements are in direct physical or electrical contact. However, the term "coupled" or "communicatively coupled" may also mean that two or more elements are not in direct contact with each other, but still cooperate or interact with each other. The embodiments disclosed herein are not necessarily limited to the contents herein.

The phrase "at least one of A, B, and C" has the same meaning as the phrase "at least one of A, B, or C", both including the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

The use of the phrase "applicable to" or "configured to" herein means an open and inclusive expression, which does not exclude devices that are applicable to or configured to perform additional tasks or steps.

The term such as "about," "substantially," and "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

Hereinafter, for ease of description, unless otherwise specified, the orientation expressions of up, down, left, right, front, and rear in the present disclosure are all referred to a state of a refrigerator when it is in use. A side of a refrigerator facing a user during use is a front side, and a side opposite to the front side is a rear side. A height direction of the refrigerator is an up-down direction. A left-right direction of the refrigerator is opposite to a left-right direction of the user, for example, a left side of the refrigerator is a right side of the user, and a right side of the refrigerator is a left side of the user.

Figure 2:
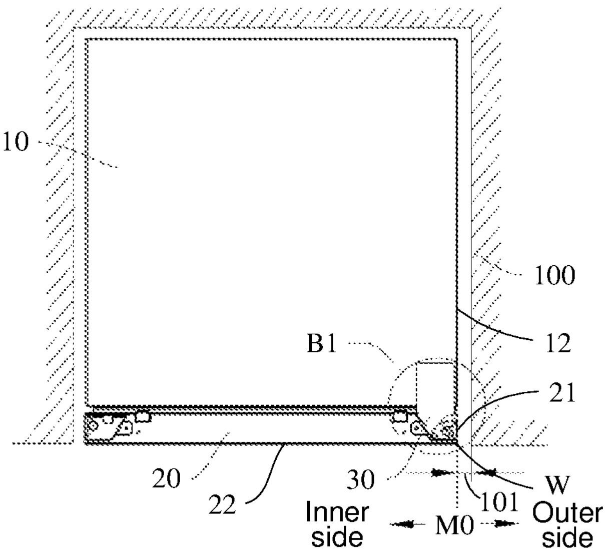
FIG. 2 is a top view of a refrigerator installing in a cabinet, in accordance with some embodiments.

Some embodiments of the present disclosure provide a refrigerator 1. Referring to FIGS. 1 and 2, the refrigerator 1 includes a box body 10, a door body 20, and a hinge assembly 30.

The box body 10 includes an inner container, an outer shell, and a heat insulation layer. The inner container has a substantially rectangular box shape, and a storage compartment is defined therein. A shape of the outer shell matches the shape of the inner container, and the inner container is disposed in the outer shell. The heat insulation layer is disposed between the inner container and the outer shell, so as to block the heat transfer between the storage compartment and the outer space of the box body 10.

In some embodiments, the refrigerator 1 further includes a cooling device, and the cooling device is configured to provide cool air to the storage compartment. A side (e.g., a front side) of the storage compartment is open to form an access opening. The storage compartment is configured to store food, and a user may put food into or take out food from the storage compartment through the access opening.

In some embodiments, the storage compartment may be divided into a refrigerating compartment and a freezing compartment. The refrigerating compartment may maintain the temperature of the air inside the refrigerating compartment at about 0° C. to 5° C. and store food in a refrigerating mode. The freezing compartment may maintain the temperature of the air inside the freezing compartment at about −30° C. to 0° C. and store food in a freezing mode. In addition, the box body 10 may further include other compartments, such as a vacuum compartment and a constant temperature compartment.

In some embodiments, the refrigerating compartment and the freezing compartment are disposed along a height direction of the refrigerator 1. For example, the refrigerating compartment is located below the freezing compartment. It will be noted that, in some embodiments, the refrigerating compartment and the freezing compartment may be disposed in other ways, which is not limited in the present disclosure.

The door body 20 is connected to an end (e.g., a front end) of the box body 10 through the hinge assembly 30. The door body 20 is rotatable, so as to open or close the storage compartment. In a case where the door body 20 is opened, the access opening allows food to be put in or taken out.

Referring to FIG. 1, the hinge assembly 30 is, for example, a first hinge assembly 40 or a second hinge assembly 50. The first hinge assembly 40 is disposed on an upper portion of the box body 10, and is fixedly connected to the box body 10 and the door body 20. The second hinge assembly 50 is disposed at a lower portion of the box body 10 and is fixedly connected to the box body 10 and the door body 20. The first hinge assembly 40 and the second hinge assembly 50 are disposed along a same axis, so that the door body 20 may rotate around the axis to implement the opening and closing of the door body 20.

Generally, the hinge assembly 30 is located at a left side or a right side of the door body 20. Referring to FIGS. 1 and 2, the door body 20 includes a left side wall, a right side wall, an upper wall, a lower wall, and a front side wall. For convenience of description, in the left side wall and the right side wall of the door body 20, the one closer to the hinge assembly 30 is referred to as a door side wall 21.

For example, in FIGS. 1 and 2, the hinge assembly 30 is disposed at the left end of the door body 20 (i.e., the right side of the user), the left side wall of the door body 20 is referred to as the door side wall 21, and the right end of the door body 20 rotates around the lift end of the door body 20 as a rotation center.

Similarly, in a case where the hinge assembly 30 is disposed at the right end of the door body 20, the right side wall of the door body 20 is referred to as the door side wall 21, and the left end of the door body 20 rotates around the right end of the door body 20 as the rotation center.

In some embodiments, in a case where the door body 20 is closed, the door side wall 21 is flush with a side wall of the box body 10 proximate to the hinge assembly 30 (i.e., the box body side wall 12). It will be noted that the term "flush" includes both being completely flush and being approximately flush.

Figure 4:
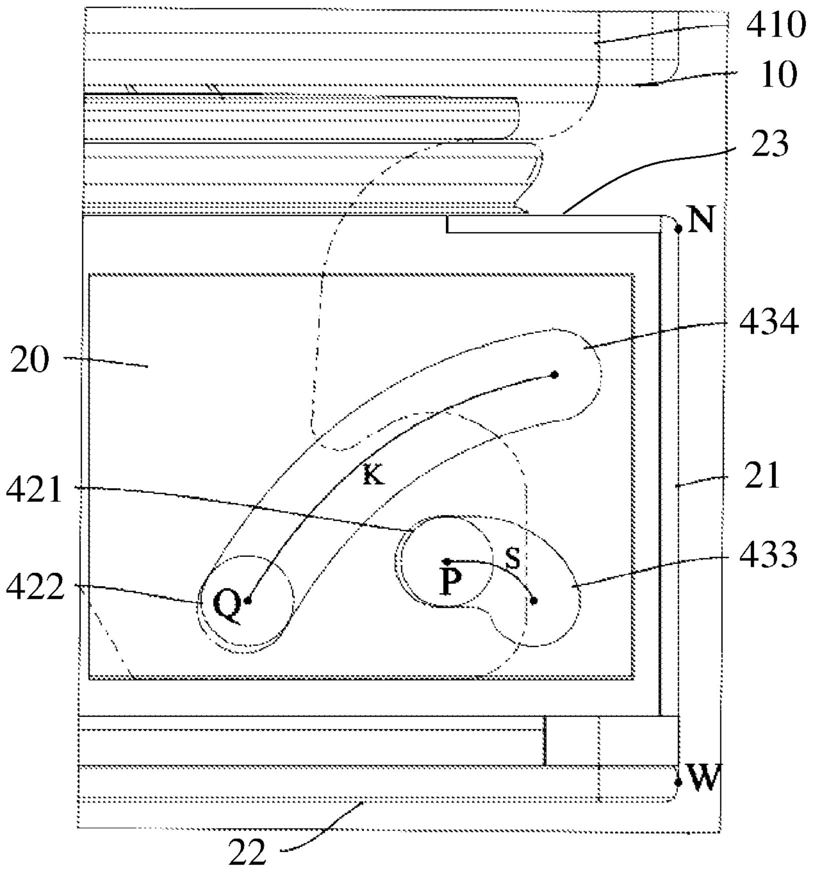
FIG. 4 is a structural diagram of a double-shaft assembly and trajectory grooves of a refrigerator, in accordance with some embodiments.

In some embodiments, referring to FIGS. 1, 2, and 4, a side wall (e.g., a front side wall) of the door body 20 away from the box body 10 in a case where the door body 20 is closed is referred to as the door front wall 22, and a side wall (e.g., a rear side wall) of the door body 20 proximate to the box body 10 in a case where the door body 20 is closed is referred to as the door rear wall 23. An intersection of the door front wall 22 and the door side wall 21 forms a first lateral edge W (i.e., a lateral edge), and an intersection of the door side wall 21 and the door rear wall 23 forms a second lateral edge N. In a case where the door body 20 is closed, the first lateral edge W is located at a side of the second lateral edge N away from the box body 10.

It will be noted that in a case where the door front wall 22 and the door side wall 21 are both planes, an intersection line of the two planes is a theoretical first lateral edge W. In actual processing and production, the intersection of the door front wall 22 and the door side wall 21 is usually rounded to transition. In this way, the intersection of the door front wall 22 and the door side wall 21 forms a curved surface, and any straight line extending along the height direction (i.e., an upper-lower direction) of the refrigerator 1 on the curved surface may represent the first lateral edge W.

The box body 10 includes a left side wall, a right side wall, an upper wall, a lower wall, and a rear side wall. In some embodiments, a plane where a side wall of the left side wall and the right side wall of the box body 10 proximate to the hinge assembly 30 is located is defined as a datum plane M0. Taking the datum plane M0 as a boundary plane, a side where the box body 10 is located is defined as an inner side, and an opposite side is defined as an outer side. In FIGS. 1 and 2, the hinge assembly 30 is disposed at the left end of the box body 10, the left side wall of the box body 10 is defined as the datum plane M0, and the inner side is the right side of the datum plane M0.

It can be understood that in a case where the hinge assembly 30 is disposed at the right end of the box body 10, the right side wall of the box body 10 is defined as the datum plane M0, and the inner side is the left side of the datum plane M0.

Referring to FIG. 2, in a case where the refrigerator 1 is embedded in the cabinet 100, considering factors such as uneven ground or deformation of the cabinet, it is necessary to reserve a first gap 101 between the outer side wall (corresponding to the position of the datum plane M0) of refrigerator 1 and the inner wall of cabinet 100. A width of the first gap 101 is usually any value within a range from 3 mm to 5 mm. For example, the width of the first gap 101 may be 3 mm, 4 mm, or 5 mm.

It can be understood that, in order to ensure the normal opening of the door body 20, during the rotation of the door body 20, a distance (i.e., as the door body 20 rotates, the distance between the first lateral edge W and the datum plane M0 when the first lateral edge W moves from the datum plane M0 to the outer side) between the first lateral edge W and the datum plane M0 should not be too large. For example, the distance should not be greater than 5 mm. Otherwise, the first lateral edge W will collide with the cabinet 100, so that the door body 20 cannot be fully opened, and the door body 20 or the cabinet 100 will be damaged.

In view of this, the hinge assembly 30 is in a form of a double-shaft hinge, so that the first lateral edge W of the door body 20 will move towards the inner side in a case where the door body 20 is rotated, so as to prevent the first lateral edge W from colliding with the cabinet 100.

Figure 3:
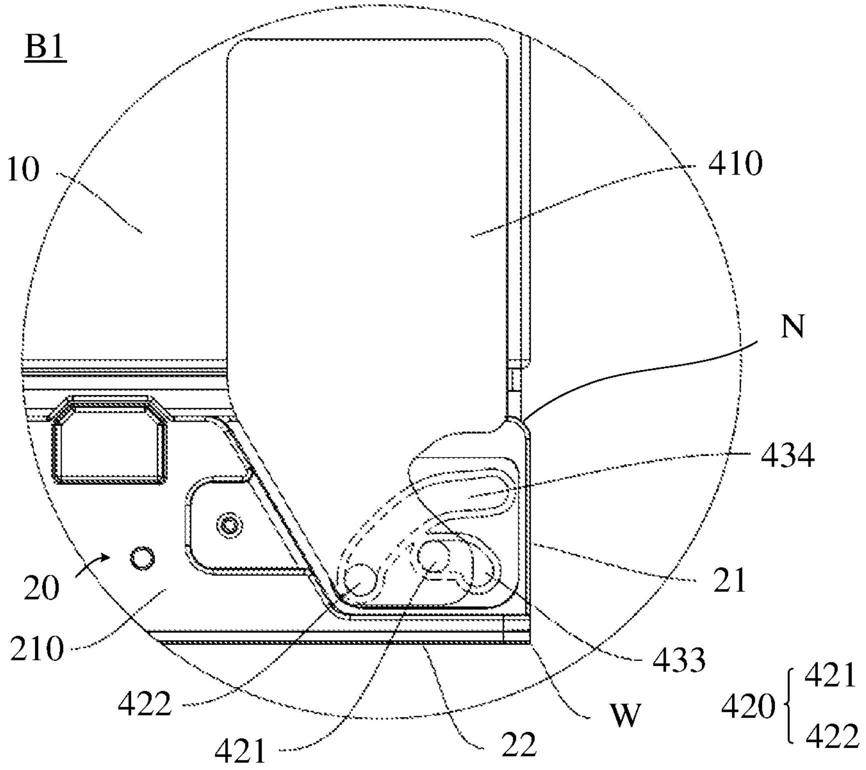
FIG. 3 is a partial enlarged view of the circle B1 in FIG. 2.
Figure 5:
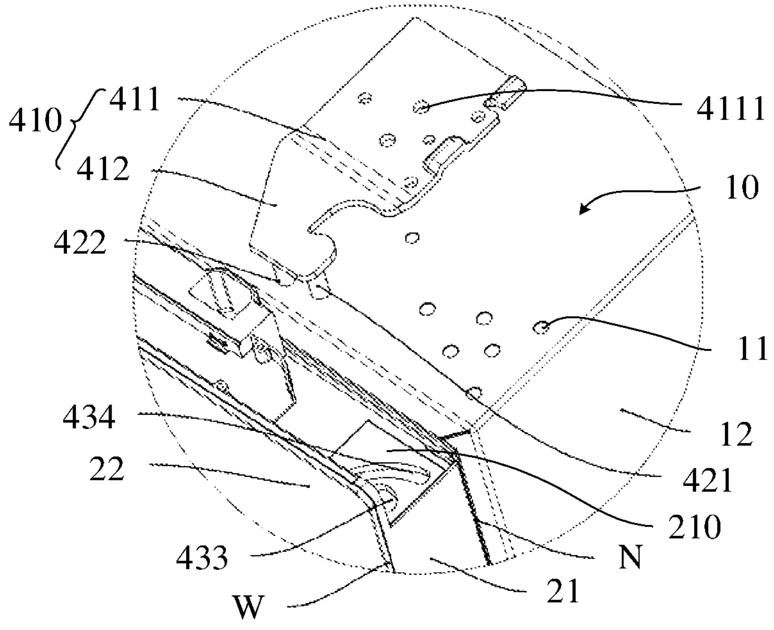
FIG. 5 is an exploded view of a first hinge assembly of a refrigerator, in accordance with some embodiments.

In some embodiments, referring to FIGS. 3 and 5, the first hinge assembly 40 includes a first hinge plate 410, a first double-shaft assembly 420, a first trajectory groove 433, and a second trajectory groove 434. The first hinge plate 410 includes a first connecting portion 411 and a first extending portion 412 connected to the first connecting portion 411, and the first connecting portion 411 and the first extending portion 412 are coplanar. The first double-shaft assembly 420 includes a first shaft 421 and a second shaft 422.

The door body 20 includes a first end cover 210 disposed on the upper end of the door body 20 and corresponding to the position of the first hinge assembly 40. A surface of the first end cover 210 proximate to the first hinge plate 410 is recessed away from the first hinge plate 410 to form the first trajectory groove 433 and the second trajectory groove 434.

In some embodiments, the first end cover 210 is an injection molded member, which is integrally formed by injection molding. Alternatively, in some embodiments, the first end cover 210 may be integrally formed with the door body. In this case, the first end cover 210 may be a portion of the door body.

Both the first shaft 421 and the second shaft 422 of the first double-shaft assembly 420 are disposed on the first extending portion 412 and extend downwards from a lower surface of the first extending portion 412. The first shaft 421 is inserted in the first trajectory groove 433 and matched with the first trajectory groove 433. The second shaft 422 is inserted in the second trajectory groove 434 and matched with the second trajectory groove 434.

It can be understood that, when the door body 20 rotates, the first shaft 421 relatively moves in the first trajectory groove 433, and the second shaft 422 relatively moves in the second trajectory groove 434.

The first connecting portion 411 is fixedly connected to the upper wall of the box body 10. The first connecting portion 411 has a plurality of first through holes 4111, and the box body 10 has a plurality of second through holes 11. The plurality of second through holes 11 are located in the upper wall of the box body 10 and correspond one-to-one with the plurality of first through holes 4111. The first connecting portion 411 may be fixedly connected to the box body 10 by fasteners such as screws.

In this way, the box body 10 and the door body 20 are connected through the first hinge assembly 40, and the door body 20 may rotate relative to the box body 10 through the first hinge assembly 40.

In some embodiments, a diameter of the first shaft 421 is greater than a diameter of the second shaft 422. It can be understood that the first shaft 421 is a main shaft and mainly plays a positioning role, and the second shaft 422 is a secondary shaft and mainly plays a guiding role. When the door body 20 rotates, the door body 20 will exert force on the first shaft 421 and the second shaft 422, and the force is mainly concentrated on the main shaft. Therefore, in a case where the diameter of the first shaft 421 is greater than that of the second shaft 422, the strength of the first shaft 421 may be improved.

In some embodiments, the first connecting portion 411 is integrally formed with the first extending portion 412, and the first hinge plate 410, the first shaft 421, and the second shaft 422 are integrally formed. Alternatively, the first hinge plate 410, the first shaft 421, and the second shaft 422 may be independent members, and the first shaft 421 and the second shaft 422 may be fixedly connected to the first hinge plate 410 by welding or screwing.

Figure 6:
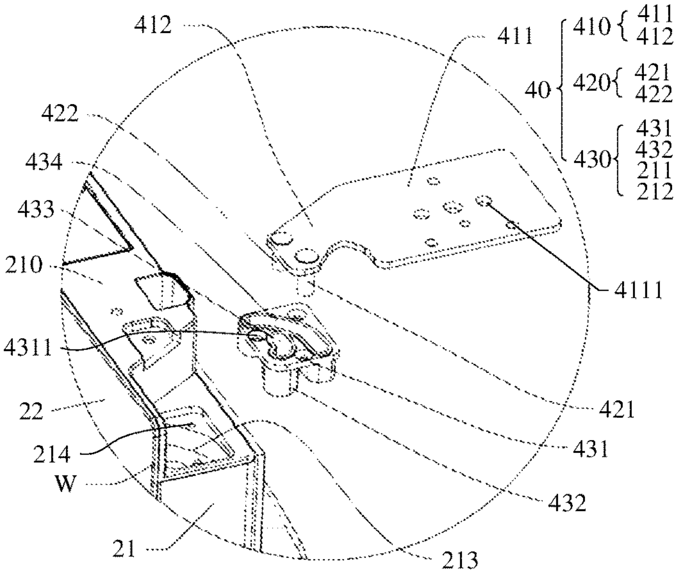
FIG. 6 is an exploded view of another first hinge assembly of a refrigerator, in accordance with some embodiments.

In some embodiments, referring to FIG. 6, the first hinge assembly 40 further includes a first mounting block 430, and the first mounting block 430 includes a first board body 431 and a first protruding portion 432. The first board body 431 extends downwards to form a first protruding portion 432, and the first protruding portion 432 opens upwards to define the first trajectory groove 433 and the second trajectory groove 434.

For example, the first trajectory groove 433 includes a groove bottom and a circumferential groove wall surrounding the edge of the groove bottom. The circumferential groove wall encloses a groove opening opposite to the groove bottom. A structure of the second trajectory groove 434 is similar to that of the first trajectory groove 433 except for length and shape of the groove.

In some embodiments, as shown in FIG. 6, the first end cover 210 includes a first accommodating groove 213, and the first accommodating groove 213 is open upwards. The first mounting block 430 is embedded in the first accommodating groove 213. The first board body 431 is parallel to the upper wall of the door body 20. The first board body 431 has a plurality of third through holes 4311, the first end cover 210 has a plurality of fourth through holes 214, and the plurality of fourth through holes 214 are in one-to-one correspondence with the plurality of third through holes 4311. The first board body 431 and the first end cover 210 may be fixedly connected by fasteners such as screws.

In some embodiments, the first board body 431 includes a first clamping notch. The first accommodating groove 213 includes a first clamping portion. In a case where the first mounting block 430 is embedded in the first accommodating groove 213, the first clamping portion is installed in the first clamping notch, so that the relative position of the first mounting block 430 and the door body 20 may be limited.

In some embodiments, the first board body 431 and the first protruding portion 432 are integrally formed, so that the structural accuracy and the strength of the first mounting block 430 may be improved.

For example, the first board body 431 and the first protruding portion 432 may be integrally formed by injection molding.

In some embodiments, as shown in FIGS. 7A to 10B, the second hinge assembly 50 includes a second hinge plate 510, a second double-shaft assembly 520, a third trajectory groove 533, and a fourth trajectory groove 534. The second hinge plate 510 includes a second connecting portion 511 and a second extending portion 512 connected to the second connecting portion 511. The second double-shaft assembly 520 includes a third shaft 521 and a fourth shaft 522.

The door body 20 further includes a second end cover 220, and the second end cover 220 is disposed on the lower end of the door body 20 and corresponds to the position of the second hinge assembly 50. A surface of the second end cover 220 proximate to the second hinge plate 510 is recessed away from the second extending portion 512 to form the third trajectory groove 533 and the fourth trajectory groove 534.

In some embodiments, the second end cover 220 is an injection molded member, which is integrally formed by injection molding. Alternatively, in some embodiments, the second end cover 220 may be integrally formed with the door body, in this case, the second end cover 220 may be a portion of the door body.

The second connecting portion 511 is connected to a side of the lower end of the box body 10 proximate to the door body 20. The second extending portion 512 extends from the second connecting portion 511 towards a direction away from the box body 10. The second connecting portion 511 has a plurality of fifth through holes 5111, and the box body 10 has a plurality of sixth through holes. The plurality of sixth through holes are located in the lower wall of the box body 10 and are in one-to-one correspondence with the plurality of fifth through holes 5111. The second connecting portion 511 may be fixedly connected to the box body 10 by fasteners such as screws.

Both the third shaft 521 and the fourth shaft 522 of the second double-shaft assembly 520 are disposed on the second extending portion 512 and extend upwards from the upper surface of the second extending portion 512.

The third shaft 521 is inserted in the third trajectory groove 533 and matched with the third trajectory groove 533. The fourth shaft 522 is inserted in the fourth trajectory groove 534 and matched with the fourth trajectory groove 534. In this way, the box body 10 and the door body 20 are connected through the second hinge assembly 50, and the door body 20 may rotate relative to the box body 10 through the second hinge assembly 50.

In some embodiments, a diameter of the third shaft 521 is greater than a diameter of the fourth shaft 522. It can be understood that the third shaft 521 is a main shaft, which mainly plays a positioning role, and the fourth shaft 522 is a secondary shaft, which mainly plays a guiding role. When the door body 20 rotates, the door body 20 exerts force on the third shaft 521 and the fourth shaft 522, and the force is mainly concentrated on the main shaft. Therefore, in a case where the diameter of the third shaft 521 is greater than that of the fourth shaft 522, the strength of the third shaft 521 may be improved.

In some embodiments, the second connecting portion 511 is integrally formed with the second extending portion 512, and the second hinge plate 510, the third shaft 521, and the fourth shaft 522 are integrally formed. Alternatively, the second hinge plate 510, the third shaft 521, and the fourth shaft 522 may be independent members, and the third shaft 521 and the fourth shaft 522 may be fixedly connected to the second hinge plate 510 by welding or screwing.

Figure 11:
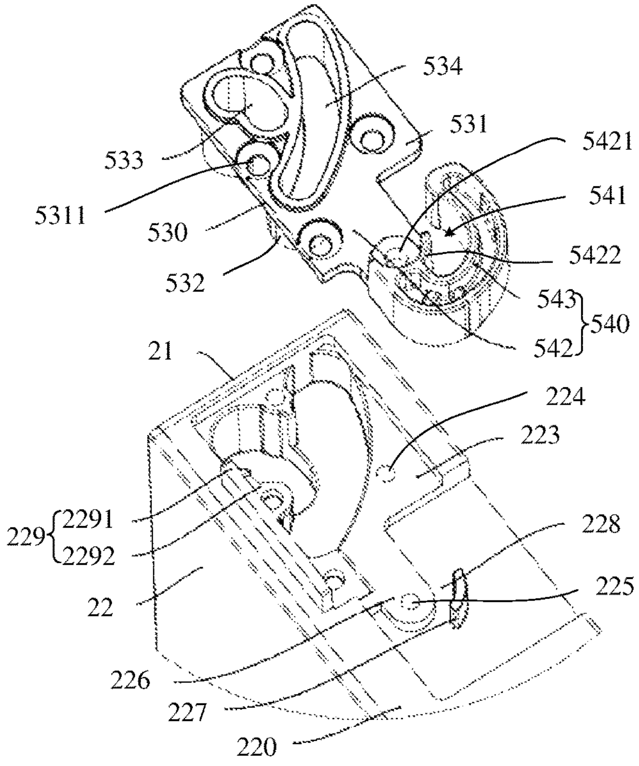
FIG. 11 is an exploded view of a second mounting block of a refrigerator, in accordance with some embodiments.
Figure 12:
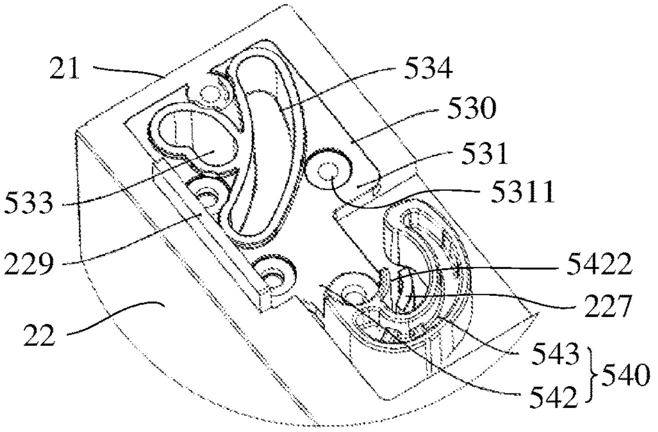
FIG. 12 is a perspective view of a second mounting block of a refrigerator, in accordance with some embodiments.

In some embodiments, referring to FIGS. 11 and 12, the second hinge assembly 50 further includes a second mounting block 530, and the second mounting block 530 includes a second board body 531 and a second protruding portion 532. The second board body 531 extends upwards to form the second protruding portion 532, and the second protruding portion 532 opens downwards to define the third trajectory groove 533 and the fourth trajectory groove 534.

For example, the third trajectory groove 533 includes a groove bottom and a circumferential groove wall surrounding the edge of the groove bottom. The circumferential groove wall encloses a groove opening opposite to the groove bottom. A structure of the fourth trajectory groove 534 is similar to that of the third trajectory groove 533 except for length and shape of the groove.

In some embodiments, as shown in FIG. 11, the second end cover 220 includes a second accommodating groove 223, and the second accommodating groove 223 is open downwards. The second mounting block 530 is embedded in the second accommodating groove 223. The second board body 531 is parallel to the lower wall of the door body 20. The second board body 531 has a plurality of seventh through holes 5311, the second end cover 220 has a plurality of eighth through holes 224, and the plurality of eighth through holes 224 are in one-to-one correspondence with the plurality of seventh through holes 5311. The second board body 531 and the second end cover 220 may be fixedly connected by fasteners such as screws.

In some embodiments, the second board body 531 includes a second clamping notch. The second accommodating groove 223 includes a second clamping portion. In a case where the second mounting block 530 is embedded in the second accommodating groove 223, the second clamping portion is installed in the second clamping notch, so that the relative position of the second mounting block 530 and the door body 20 may be limited.

In some embodiments, the second board body 531 and the second protruding portion 532 are integrally formed, so that the structural accuracy and the strength of the second mounting block 530 may be improved.

For example, the second board body 531 and the second protruding portion 532 may be integrally formed by injection molding.

In some embodiments, the second hinge plate 510 further includes a first fit portion, and the second mounting block 530 further includes a second fit portion matched with the first fit portion. In a case where the user closes the door body 20, the first fit portion is matched with the second fit portion to limit the door body 20. In a case where the user opens the door body 20, the first fit portion is disengaged from the second fit portion, so that the door body 20 rotates away from the box body 10.

For example, referring to FIGS. 11 and 12, the second fit portion is configured as a locking hook 540. The locking hook 540 is disposed on a side (e.g., the left side or the right side) of the second board body 531. A fixed end of the locking hook 540 is fixedly connected to the second board body 531, and a free end of the locking hook 540 extends away from the second board body 531 and bends towards a direction proximate to the second board body 531, thereby forming an opening 541 facing towards the second board body 531. The free end of the locking hook 540 is closer to the box body 10 than the fixed end of the locking hook 540.

Figure 7A:
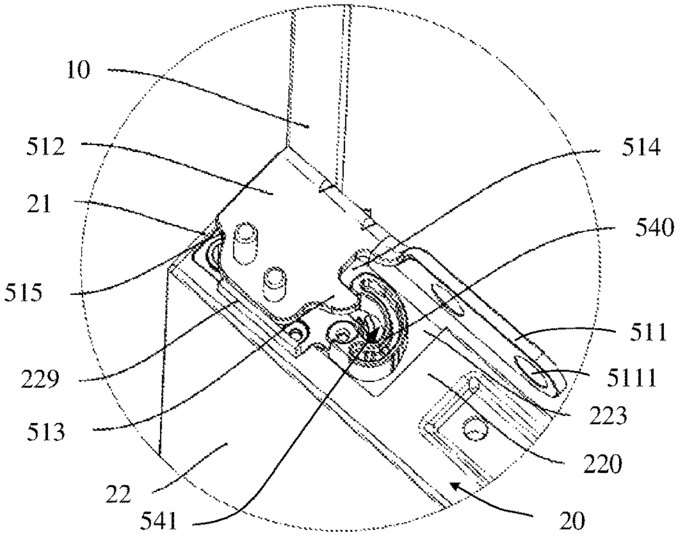
FIG. 7A is a perspective view of a second hinge assembly of a refrigerator when a door body is closed, in accordance with some embodiments.
Figure 7B:
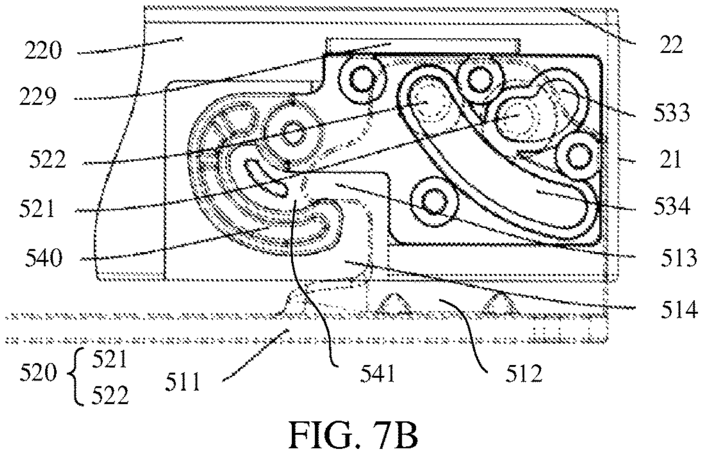
FIG. 7B is a structural diagram of a second hinge assembly of a refrigerator when a door body is closed, in accordance with some embodiments.

Referring to FIGS. 7A and 7B, the first fit portion is configured as a blocking portion 513. The blocking portion 513 is disposed on a side (e.g., left or right) of the second extending portion 512, and the blocking portion 513 extends from the side of the second extending portion 512 towards a direction away from the second extending portion 512. A second gap 514 is defined between the blocking portion 513 and the second connecting portion 511.

It will be noted that a position of the blocking portion 513 corresponds to a position of the opening 541. That is, in a case where the locking hook 540 is disposed at the left side of the second board body 531, the blocking portion 513 is disposed at the left side of the second extending portion 512. Conversely, in a case where the locking hook 540 is disposed at the right side of the second board body 531, the blocking portion 513 is disposed at the right side of the second extending portion 512.

In this way, referring to FIGS. 7A and 7B, in a case where the door body 20 is in the closed state, the blocking portion 513 is located in the opening 541. The free end of the locking hook 540 is located in the second gap 514 and abuts against a side of the blocking portion 513 proximate to the box body 10, thereby improving the tightness of the fit between the door body 20 and the box body 10 and preventing the effect of refrigeration and freezing of the refrigerator from being affected due to the lax closing of the door body 20.

Figure 8A:
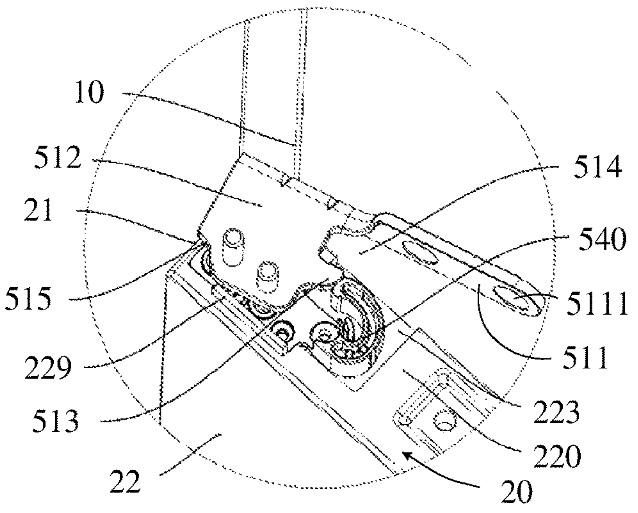
FIG. 8A is a perspective view of a second hinge assembly of a refrigerator when a door body is opened to any angle less than 90°, in accordance with some embodiments.
Figure 10A:
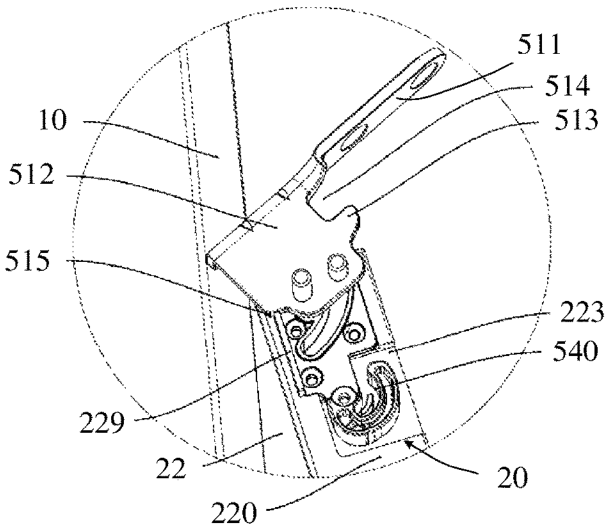
FIG. 10A is a perspective view of a second hinge assembly of a refrigerator when a door body is opened to a maximum angle, in accordance with some embodiments.
Figure 10B:
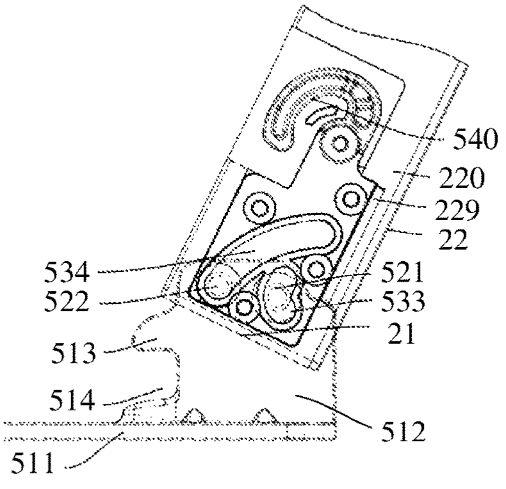
FIG. 10B is a structural diagram of a second hinge assembly of a refrigerator when a door body is opened to the maximum angle, in accordance with some embodiments.

Referring to FIGS. 8A and 10B, during an opening process of the door body 20, the locking hook 540 will be deformed under force to overcome the blocking of the blocking portion 513, so that the locking hook 540 is disengaged from the blocking portion 513.

In some embodiments, as shown in FIGS. 11 and 12, the locking hook 540 includes a third extending portion 542 and a bending portion 543. The third extending portion 542 is connected to a side (e.g., the left side or the right side) of the second board body 531, and the third extending portion 542 is integrally formed with the second board body 531. An end of the bending portion 543 is fixedly connected to an end of the third extending portion 542 away from the second board body 531, and another end of the bending portion 543 extends away from the second board body 531 and is bent towards a direction proximate to the second plate body 531.

The third extending portion 542 has a ninth through hole 5421, and the second end cover 220 has a tenth through hole 225 at a position corresponding to the ninth through hole 5421. The third extending portion 542 may be connected to the second end cover 220 by a fastener such as a screw, which is conducive to improving the connection strength between the third extending portion 542 and the second end cover 220, so that only the bending portion 543 is deformed when the locking hook 540 is disengaged from the blocking portion 513.

In some embodiments, as shown in FIGS. 11 and 12, free ends of the bending portion 543 and the blocking portion 513 are arc-shaped, which is conducive to improving the smoothness of the engagement or disengagement of the bending portion 543 and the blocking portion 513.

In some embodiments, in a case where the door body 20 is closed to a preset closing angle from an open state, the door body 20 is closed under the action of the bending portion 543 and the blocking portion 513. For example, the preset closing angle is less than 7°.

In some embodiments, as shown in FIGS. 11 and 12, the second end cover 220 further includes a first protrusion 226 and a second protrusion 227. A gap groove 228 is formed between the first protrusion 226 and the second protrusion 227. The first protrusion 226 is closer to the door front wall 22 and closer to the door side wall 21 than the second protrusion 227. The third extending portion 542 further includes an inserting plate 5422. The inserting plate 5422 is located at an end of the third extending portion 542 proximate to the bending portion 543, and a shape of the inserting plate 5422 matches a shape of the gap groove 228. In a case where the second mounting block 530 is embedded in the second accommodating groove 223, the inserting plate 5422 is inserted into the gap groove 228, so that the third extending portion 542 may be limited, and the third extending portion 542 may be prevented from deforming in a thickness direction of the door body 20.

For example, referring to FIG. 11, the gap groove 228 is an arc-shaped groove, and correspondingly, the inserting plate 5422 is an arc-shaped plate matched with the gap groove 228, so that the contact area between the gap groove 228 and the third extending portion 542 may be increased, which is conducive to improving the connection strength between the second mounting block 530 and the second end cover 220.

In some embodiments, as shown in FIG. 11, the tenth through hole 225 is formed in the first protrusion 226.

It will be noted that the locking hook 540 may be disposed on at least one of the first mounting block 430 and the second mounting block 530, and the blocking portion 513 is disposed on at least one of the first hinge plate 410 and the second hinge plate 510 corresponding to the locking hook 540.

It can be understood that in a case where the structure of any mounting block (including at least one of the first mounting block 430 and the second mounting block 530) is changed, the shape of the corresponding accommodating groove (including at least one of the first accommodating groove 213 and the second accommodating groove 223) is also changed to accommodate the mounting block.

The mounting block is made of Polyformaldehyde (POM). POM has strong friction resistance, which may extend the service life of the mounting block.

In some embodiments, referring to FIGS. 11 and 12, the second end cover 220 further includes a limiting portion 229. The limiting portion 229 is disposed in the second end cover 220 and protrudes downwards from the lower surface of the second end cover 220. The limiting portion 229 extends along the width direction of the door body 20. The limiting portion 229 is located at the front end of the second mounting block 530. For example, the limiting portion 229 is a sheet metal member.

Referring to FIGS. 7A and 7B, the second hinge plate 510 further includes a limiting groove 515. In a case where the door body 20 is in the closed state, the limiting groove 515 is located at a position of the second extending portion 512 proximate to the door side wall 21 and proximate to the door front wall 22 and runs through the second extending portion 512 along a thickness direction of the second extending portion 512.

Referring to FIGS. 10A and 10B, in a case where the door body 20 is rotated to a maximum angle (i.e., a ninth angle), the limiting portion 229 is against the limiting groove 515 to prevent the door body 20 from continuing to rotate, thereby preventing the fourth shaft 522 from rubbing against an end of the fourth trajectory groove 534 proximate to the door side wall 21, which is conducive to improving the durability of the fourth shaft 522.

In some embodiments, as shown in FIG. 11, the limiting portion 229 includes an embedding portion 2291 and a limiting bar 2292.

The embedding portion 2291 is plate-shaped and is embedded between the second mounting block 530 and the groove wall of the second accommodating groove 223. That is to say, in a case where the second mounting block 530 is embedded in the second accommodating groove 223, a side of the second board body 531 proximate to the door front wall abuts against the embedding portion 2291, so as to fix the embedding portion 2291 in the second accommodating groove 223.

The limiting bar 2292 is connected to the embedding portion 2291 and is located at a lower side of the embedding portion 2291. The limiting bar 2292 extends along the width direction of the door body 20. In a case where the door body 20 is rotated to the maximum angle, the limiting bar 2292 abuts against the limiting groove 515, thereby preventing the door body 20 from continuing to rotate.

In some embodiments, the limiting bar 2292 is integrally formed with the embedding portion 2291.

It can be understood that the limiting portion 229 is fixedly installed in the second accommodating groove 223 through the clamping of the second mounting block 530 and an inner side wall of the second accommodating groove 223, so that the connection structure between the limiting portion 229 and the second end cover 220 may be simplified.

In some embodiments, the limiting portion 229 may also be disposed in the first end cover 210, which will not be repeated here.

In some embodiments, the first shaft 421 is in clearance fit with the first trajectory groove 433, and the second shaft 422 is in clearance fit with the second trajectory groove 434, so that the deformation caused by manufacturing errors may be released. The third shaft 521 is interference fit with the third trajectory groove 533, and the fourth shaft 522 is interference fit with the fourth trajectory groove 534, so as to prevent abnormal noise when the locking hook 540 and the blocking portion 513 are disengaged and implement silent opening of door body 20. It can be understood that, in order to ensure that in a case where the door body 20 is in the open state, the first lateral edge W exceeds the datum plane M0 and moves to the outer side by no more than 5 mm, it is necessary to make the first edge W move towards the inner side of the datum plane M0 during the rotation of the door body 20, so as to satisfy the requirement of inserting the refrigerator 1 into the cabinet 100 for use.

The process of opening or closing the door body 20 relative to the box body 10 will be introduced below mainly by taking the first hinge assembly 40 disposed on the upper portion of the box body 10 as an example. It can be understood that the working principle of the second hinge assembly 50 is the same as that of the first hinge assembly 40, which will not be repeated in this disclosure.

After the first hinge plate 410 is fixedly connected to the box body 10, and the first shaft 421 and the second shaft 422 are fixedly connected to the first hinge plate 410, during the rotation of the door body 20 relative to the box body 10, the box body 10 remains stationary, and therefore, the first hinge plate 410, the first shaft 421 and the second shaft 422 also remain stationary. In this case, the first trajectory groove 433 will move relative to the first shaft 421, and the second trajectory groove 434 will move relative to the second shaft 422.

It can be understood that there is a relative motion relationship between the first trajectory groove 433 and the first shaft 421 and between the second trajectory groove 434 and the second shaft 422. For convenience of description, some embodiments of the present disclosure sometimes use the first trajectory groove 433 and the second trajectory groove 434 as stationary reference objects, describing a manner in which the first shaft 421 moves in the first trajectory groove 433 and the second shaft 422 moves in the second trajectory groove 434. However, this should not be construed as a limitation of the present disclosure.

As shown in FIG. 4, the first trajectory groove 433 includes a straight groove segment and a curved groove segment connecting the straight groove segment. The straight groove segment is farther away from the door side wall 21 than the curved groove segment.

In some embodiments, an end of the straight groove segment is farther from the door side wall 21 than another end of the straight groove segment. That is, the straight groove segment is parallel to the door front wall 22. An end of the curved groove segment communicates with the other end of the straight groove segment, and another end of the curved groove segment extends towards the door side wall 21 and the door front wall 22. The curved groove segment protrudes towards a direction proximate to the door side wall 21 and proximate to the door rear wall 23. In this case, the second lateral edge N is located at a convex side of the curved groove segment.

A center trajectory line of the first trajectory groove 433 is referred to as a first trajectory line S. It can be understood that the first trajectory line S is defined by the shape of the first trajectory groove 433. Corresponding to the straight groove segment and the curved groove segment, the first trajectory line S includes a straight trajectory segment and a curved trajectory segment connected to the straight trajectory segment.

An end of the straight trajectory segment is farther away from the door side wall 21 than another end of the straight trajectory segment, an end of the curved trajectory segment is connected to the other end of the straight trajectory segment, and another end of the curved trajectory segment extends in a direction proximate to the door side wall 21 and proximate to the door front wall 22. The second lateral edge N is located at a convex side of the curved trajectory segment.

In some embodiments, a connection point of the straight trajectory segment and the curved trajectory segment is referred to as a second positioning point $P_2$ (see FIG. 15B), and the straight trajectory segment is tangent to the curved trajectory segment at the point $P_2$. During the opening process of the door body 20, the first shaft 421 moves in the first trajectory groove 433 from the one end of the straight trajectory segment to the second positioning point $P_2$ along the straight trajectory segment, and then moves along the curved trajectory segment.

As shown in FIG. 4, the second trajectory groove 434 is a quasi elliptical arc groove. An end of the second trajectory groove 434 is farther away from the door side wall 21 and closer to the door front wall 22 than another end of the second trajectory groove 434. In some embodiments, the second trajectory groove 434 protrudes towards a direction away from the door side wall 21 and away from the door front wall 22. In this case, the first lateral edge W is located at a concave side of the second trajectory groove 434.

A center trajectory line of the second trajectory groove 434 is referred to as a second trajectory line K. It can be understood that, defined by the shape of the second trajectory groove 434, the second trajectory line K is in a shape of a quasi elliptical arc. An end of the second trajectory line K is farther from the door side wall 21 and closer to the door front wall 22 than another end of the second trajectory line K, and the first lateral edge W is located at a concave side of the second trajectory line K. The first trajectory groove 433 is located at the concave side of the second trajectory groove 434.

It can be understood that, during the opening process of the door body 20, the first shaft 421 relatively moves in a straight line in the straight groove segment, and the second shaft 422 relatively moves in a curve in the second trajectory groove 434, so that the door body 20 may move a certain distance to the inner side of the datum plane M0 while rotating. In this way, the door body 20 may be prevented from colliding with the cabinet 100 when opened.

It will be noted that the quasi elliptical arc groove is a groove having a center trajectory line (e.g., the second trajectory line K) of a quasi elliptical. The arc of the quasi elliptical includes a standard elliptical arc (i.e., a portion of a standard ellipse) and a non-standard elliptical arc that is different from the standard elliptical arc but still has elliptical arc trajectory characteristics due to manufacturing, assembly errors, or slight deformation.

In some embodiments, referring to FIG. 4, both the first shaft 421 and the second shaft 422 are cylindrical. An orthogonal projection of a central axis of the first shaft 421 on the first trajectory groove 433 is referred to as a positioning center point P, and an orthogonal projection of a central axis of the second shaft 422 on the second trajectory groove 434 is referred to as a guiding center point Q.

During the opening process of the door body 20, the door body 20 rotates around a change point (X, Y), and the trajectory of the change point is $(X=(X_1+X_2)/2, Y=(Y_1+Y_2)/2)$.

X represents a distance between the change point and the door side wall 21, and Y represents a distance between the change point and the door front wall 22. $X_1$ represents a distance between the positioning center point P and the door side wall 21, and $Y_1$ represents a distance between the positioning center point P and the door front wall 22. $X_2$ represents a distance from the guiding center point Q to the door side wall 21, and $Y_2$ represents a distance from the guiding center point Q to the door front wall 22.

In a case where the second trajectory groove 434 is an elliptical groove, the second trajectory line K is an elliptical arc. From the parametric equation of the positive ellipse ($x=f\cos t$, $y=g\sin t$), the parametric equation of the oblique ellipse is deduced as $X_2=f\times\cos t\times\cos\theta-g\times\sin t\times\sin\theta+c$, $Y_2=f\times\cos t\times\sin\theta+g\times\sin t\times\cos\theta+d$.

In the above equation, c is a distance between a center of an ellipse O and the door side wall 21, d is a distance between the center of the ellipse O and the door front wall 22, θ is an inclination angle of the ellipse, t is a parameter, f is a major half axis of the ellipse, and g is a minor half axis of the ellipse.

Figure 13A:
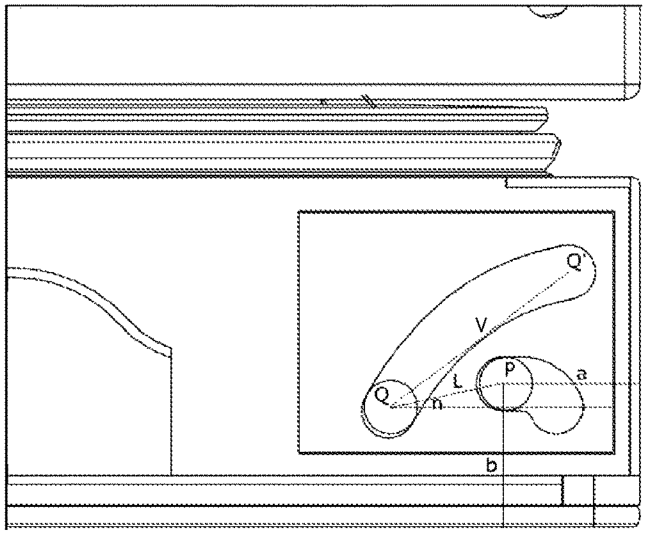
FIG. 13A is a structural diagram of a door body of a refrigerator in a closed state, in accordance with some embodiments.

As shown in FIG. 13A, in a case where the door body 20 is in the closed state, the distance between the positioning center point P and the door side wall 21 is a, the distance between the positioning center point P and the door front wall 22 is b, and the distance between the positioning center point P and the guiding center point Q is L. The included angle formed by a line connecting the positioning center point P and the guiding center point Q (axis line segment PQ) and the plane where the door front wall 22 is located is n.

Figure 13B:
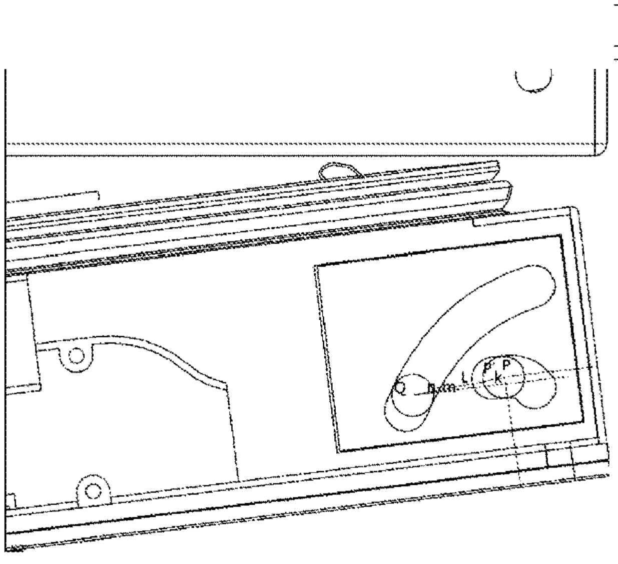
FIG. 13B is a structural diagram of a door body of a refrigerator when an opening angle of the door body is greater than 0° and less than or equal to n, in accordance with some embodiments.

(1) As shown in FIG. 13B, in a case where the rotation angle of the door body 20 is m, and m is greater than or equal to 0 and less than or equal to n (i.e., $0 \le m \le n$), the first shaft 421 moves a distance k towards a direction proximate to the door side wall 21. A point Q' is an end point of the second trajectory line K. A distance between the point Q and the point Q' is V, and a formula of the straight line Q-Q' determined by the guiding center point Q and the point Q' is $y=hx+e$, where h is a slope of the straight line Q-Q'.

Then there are:

$V=\sqrt{[(1+h^2)[(X_Q+X_{Q'})^2-4*X_Q*X_{Q'}]}$, where $X_Q$ can be obtained.

$X_Q$ represents a distance from the guiding center point Q to the door side wall 21, and $X_{Q'}$ represents a distance from an end point Q' of the second trajectory line K to the door side wall 21.

In this case:

- the distance between the positioning center point P and the door side wall 21 is $X_1=a-k=X_2-L*\sin(n-m)$;
- the distance between the positioning center point P and the door front wall 22 is $Y_1=b=Y_2+L\times\cos(n-m)$;
- the distance between the guiding center point Q and the door side wall 21 is $X_2=X_1+L\times\sin(n-m)=X_Q$; and
- the distance between the guiding center point Q to the door front wall 22 is $Y_2=Y_1-L\times\cos(n-m)=\sqrt{1-X_2^2/c^2}$.

Figure 13C:
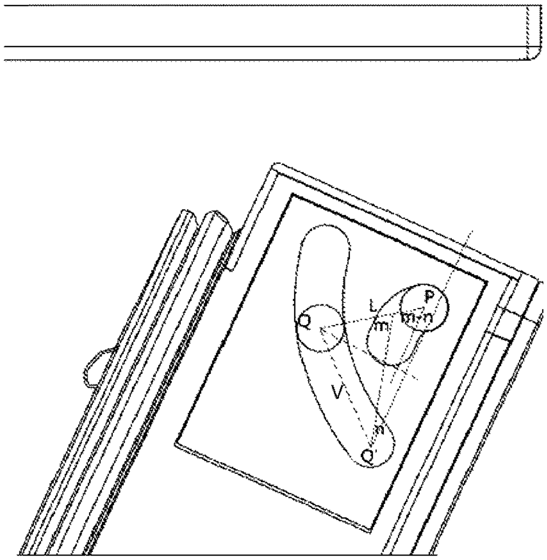
FIG. 13C is a structural diagram of a door body of a refrigerator when an opening angle of the door body is greater than n and less than or equal to (n+90°), in accordance with some embodiments.

(2) As shown in FIG. 13C, in a case where the rotation angle of the door body 20 is m, and m is greater than or equal to n and less than or equal to n+90° (i.e., $n \le m \le n+90°$):

- the distance between the positioning center point P and the door side wall 21 is $X_1=X_2-L\times\cos(m-n)$;
- the distance between the positioning center point P and the door front wall 22 is $Y_1=Y_2-L\times\sin(m-n)$;
- the distance between the guiding center point Q and the door side wall 21 is $X_2=X_Q$; and
- the distance between the guiding center point Q to the door front wall 22 is $Y_2=\sqrt{1-X_2^2/c^2}$.

Figure 13D:
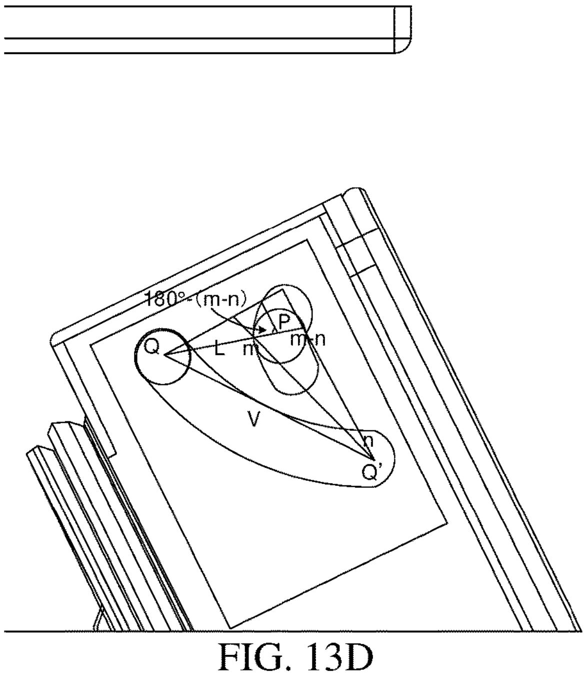
FIG. 13D is a structural diagram of a door body of a refrigerator when an opening angle of the door body is greater than (n+90°), in accordance with some embodiments.

(3) As shown in FIG. 13D, in a case where the rotation angle of the door body 20 is m, and m is greater than or equal to n+90° (i.e., $m \ge n+90°$):

- the distance between the positioning center point P and the door side wall 21 is $X_1=X_2+L\times\cos(180°-m+n)=X_2-L\times\cos(m-n)$;
- the distance between the positioning center point P and the door front wall 22 is $Y_1=Y_2-L\times\sin(180°-m+n)=Y_2-L\times\sin(m-n)$;
- the distance between the guiding center point Q and the door side wall 21 is $X_2=X_Q$; and
- the distance between the guiding center point Q to the door front wall 22 is $Y_2=\sqrt{1-X_2^2/c^2}$.

Combining (2) and (3), it can be concluded that in a case where the rotation angle of the door body 20 is m, and m is greater than or equal to n (i.e., $m \ge n$):

- the distance between the positioning center point P and the door side wall 21 is $X_1=X_2-L\times\cos(m-n)$;
- the distance between the positioning center point P and the door front wall 22 is $Y_1=Y_2-L\times\sin(m-n)$;
- the distance between the guiding center point Q and the door side wall 21 is $X_2=X_Q$; and
- the distance between the guiding center point Q to the door front wall 22 is $Y_2=\sqrt{1-X_2^2/c^2}$.

The trajectory of the change point around which the door body 20 rotates ($X=(X_1+X_2)/2$, $Y=(Y_1+Y_2)/2$) can be obtained through the above calculation.

FIGS. 14A to 14J show structural diagrams of the first hinge assembly 40 when the door body 20 is opened to different angles. It can be understood that the first shaft 421 moves along the first trajectory groove 433, which is equivalent to the positioning center point P moving along the first trajectory line S. In addition, the second shaft 422 moves along the second trajectory groove 434, which is equivalent to the guiding center point Q moving along the second trajectory line K.

Figure 14A:
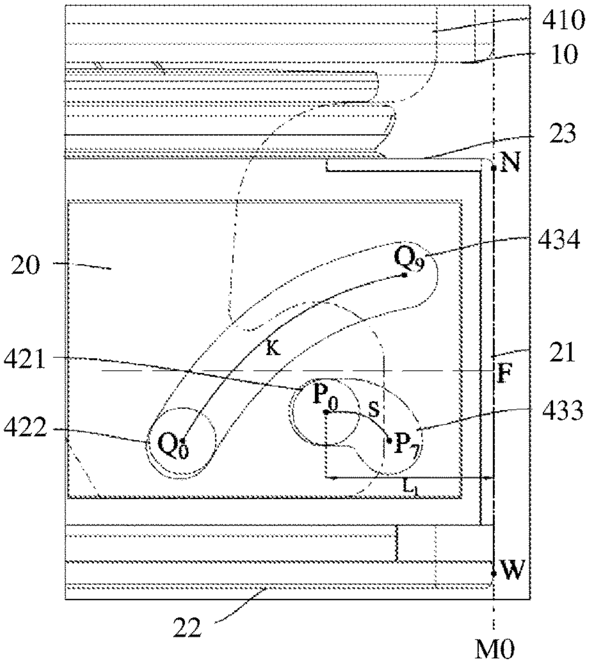
FIG. 14A is another structural diagram of a door body of a refrigerator in a closed state, in accordance with some embodiments.

In some embodiments, as shown in FIG. 14A, the first trajectory line S includes an initial positioning point $P_0$ and a seventh positioning point $P_7$ that is closer to the door side wall 21 and closer to the door front wall 22 than the initial positioning point $P_0$. During the opening process of the door body 20, the first trajectory line S extends from the initial positioning point $P_0$ towards a direction proximate to the door side wall 21, and then extends in a certain arc towards a direction proximate to the door side wall 21 and proximate to the door front wall 22 to the seventh positioning point $P_7$. The seventh positioning point $P_7$ is the other end of the first trajectory line S.

The second trajectory line K includes an initial guiding point $Q_0$ and a ninth guiding point $Q_9$ that is closer to the door side wall 21 and farther from the door front wall 22 than the initial guiding point $Q_0$. The second trajectory line K extends from the initial guiding point $Q_0$ to the ninth guiding point $Q_9$ in a direction proximate to the door side wall 21 and away from the door front wall 22, and the second trajectory line K is substantially in the shape of a quasi elliptical. The first trajectory line S is closer to the door front wall 22 and closer to the door side wall 21 than the second trajectory line K. That is, the first trajectory line S is located at the concave side of the second trajectory line K.

In this way, the second trajectory groove 434 may effectively limit the movement of the second shaft 422 and cooperate with the movement of the first shaft 421 in the first trajectory groove 433. Therefore, during the opening process of the door body 20, the first shaft 421 is driven by the second shaft 422 to move, and the door body 20 moves a certain distance to the inner side while rotating, so as to ensure the stability of the door body 20 when opened.

The following will take the maximum opening angle $G_9$ of the door body being greater than 90° (i.e., $G_9>90°$) as an example, providing a detailed description of the positions of the first shaft 421 relative to the first trajectory groove 433 and the second shaft 422 relative to the second trajectory groove 434 when the door body 20 rotates and opens to different angles during the process of the door body 20 being opened from the closed state to the maximum angle $G_9$.

In addition, a plane passing through the centroid of the door body 20 and parallel to the door front wall 22 is referred to as a centroid plane F. During the opening process of the door body 20, the centroid plane F moves with the door body 20.

As shown in FIG. 14A, in a case where the opening angle of the door body 20 is 0°, the door body 20 is in the closed state, the positioning center point P is located at the initial positioning point $P_0$ of the first trajectory line S, and the guiding center point Q is located at the initial guiding point $Q_0$ of the second trajectory line K. In this case, the guiding center point Q and the positioning center point P are located at the same side of the centroid plane F, and the guiding center point Q is farther away from the centroid plane F than the positioning center point P.

Figure 14B:
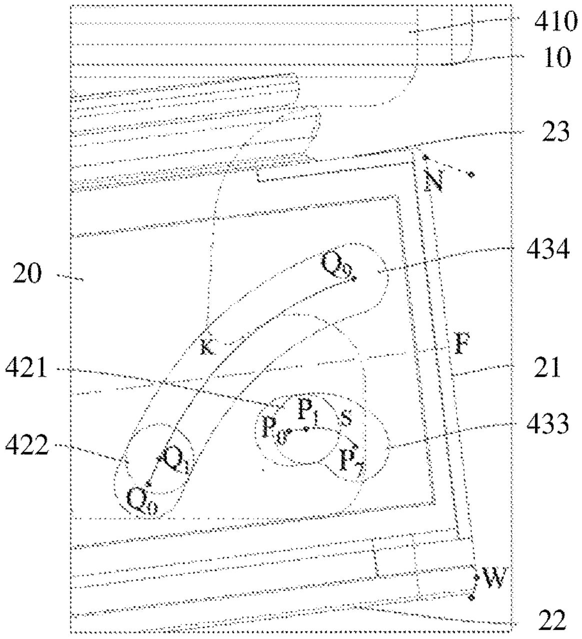
FIG. 14B is a structural diagram of a door body of a refrigerator opened to a first angle $G_1$, in accordance with some embodiments.

As shown in FIG. 14B, during the process of the door body 20 being opened from any angle greater than the closed state to any angle less than $G_2$, the first shaft 421 moves along the straight trajectory segment of the first trajectory line S towards the direction proximate to the door side wall 21, and the second shaft 422 moves along the second trajectory line K towards the direction proximate to the door side wall 21 and away from the door front wall 22. In this case, the guiding center point Q and the positioning center point P are located at the same side of the centroid plane F, and the guiding center point Q is farther away from the centroid plane F than the positioning center point P.

It will be noted that during the process of the door body 20 being opened from any angle greater than the closed state to any angle less than $G_2$, the movement trends of the guiding center point Q and the positioning center point P remain unchanged. When the door body 20 is opened to different angles (the angles are between 0° and $G_2$), the positions of the first shaft 421 relative to the straight trajectory segment of the first trajectory line S are different, and the positions of the second shaft 422 relative to the second trajectory line K are different.

In this way, in a case where the opening angle of the door body 20 is greater than 0° and less than $G_2$, any opening angle greater than 0° and less than $G_2$ is chosen to represent the relative positions of the first shaft 421 with respect to the first trajectory groove 433 and the second shaft 422 with respect to the second trajectory groove 434 when the door body 20 is opened to the corresponding range.

Figure 15A:
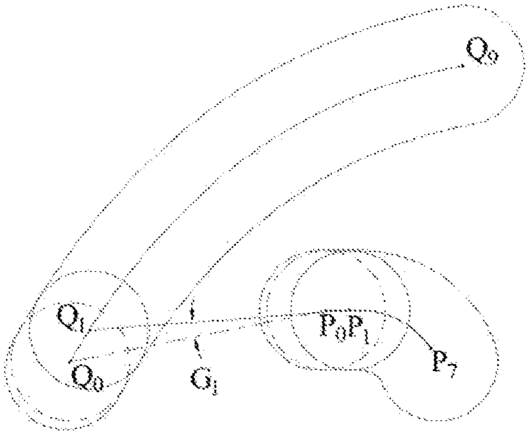
FIG. 15A is a schematic diagram showing relative positions of a first shaft, a second shaft, a first trajectory groove and a second trajectory groove when a door body of a refrigerator is opened to a first angle $G_1$, in accordance with some embodiments.

For example, as shown in FIGS. 14B and 15A, the opening angle of the door body 20 is $G_1$ (for example, $G_1$ is greater than 0° and less than $G_2$) to represent the positions within the opening angle range, so as to compare with the positions when the door body 20 is opened to other angles.

In a case where the door body 20 is opened to $G_1$, the positioning center point P is located at the first positioning point $P_1$ of the first trajectory line S, and the first positioning point $P_1$ is closer to the door side wall 21 than the initial positioning point $P_0$. The guiding center point Q is located at the first guiding point $Q_1$ of the second trajectory line K, and the first guiding point $Q_1$ is closer to the door side wall 21 and farther away from the door front wall 22 than the initial guiding point $Q_0$.

Figure 14C:
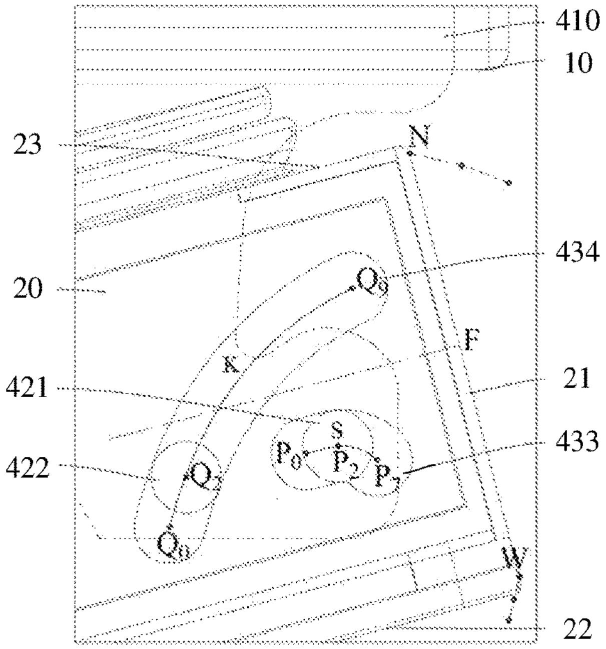
FIG. 14C is a structural diagram of a door body of a refrigerator opened to a first angle $G_2$, in accordance with some embodiments.
Figure 14D:
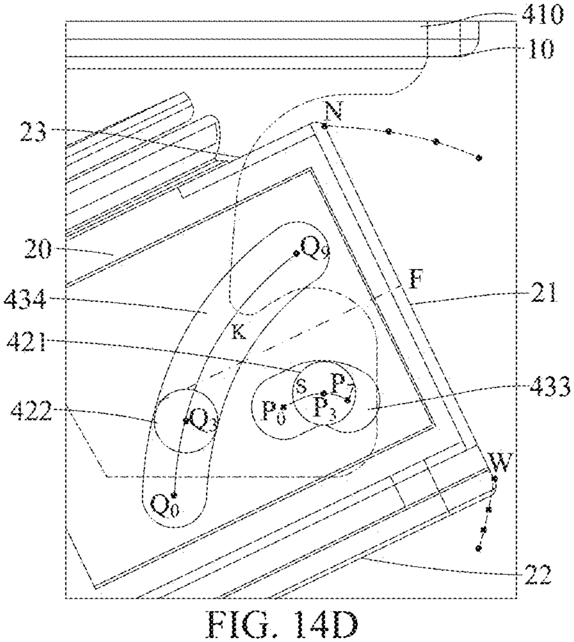
FIG. 14D is a structural diagram of a door body of a refrigerator opened to a first angle $G_3$, in accordance with some embodiments.
Figure 15B:
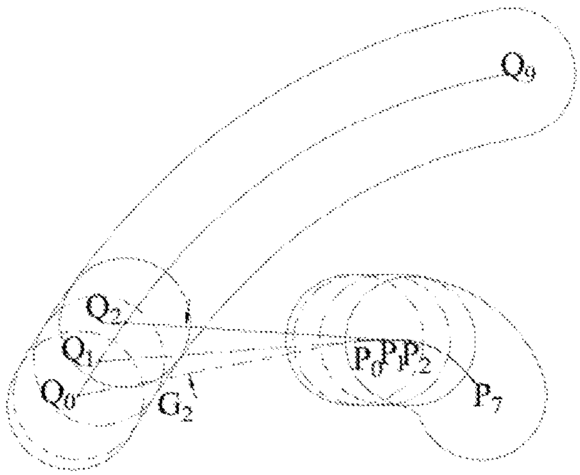
FIG. 15B is a schematic diagram showing relative positions of a first shaft, a second shaft, a first trajectory groove and a second trajectory groove when a door body of a refrigerator is opened to a first angle $G_2$, in accordance with some embodiments.
Figure 15C:
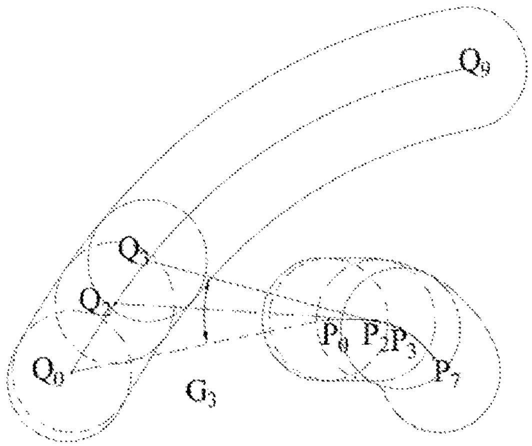
FIG. 15C is a schematic diagram showing relative positions of a first shaft, a second shaft, a first trajectory groove and a second trajectory groove when a door body of a refrigerator is opened to a first angle $G_3$, in accordance with some embodiments.

As shown in FIGS. 14C and 15B, in a case where the opening angle of the door body 20 is $G_2$, the door body 20 is rotated to open to $G_2$. The positioning center point P is located at the second positioning point $P_2$ on the straight trajectory segment of the first trajectory line S, and the second positioning point $P_2$ is closer to the door side wall 21 than the first positioning point $P_1$. The second positioning point $P_2$ is an end point of the straight trajectory segment proximate to the door side wall 21. The guiding center point Q is located at the second guiding point $Q_2$ of the second trajectory line K, and the second guiding point $Q_2$ is closer to the door side wall 21 and farther away from the door front wall 22 than the first guiding point $Q_1$.

It can be understood that during the process of the door body 20 being opened from the closed state to $G_2$, the first shaft 421 moves along the straight groove segment towards the direction proximate to the door side wall 21, and the second shaft 422 moves along the second trajectory groove 434 towards the direction proximate to the door side wall 21 and away from the door front wall 22.

In some embodiments, $G_2$ may be set to any value from 13° to 17°. For example, $G_2$ may be 13°, 14°, 15°, or 17°.

In addition, in a case where the opening angle of the door body 20 is $G_2$, the guiding center point Q and the positioning center point P are located at the same side of the centroid plane F, and the guiding center point Q is closer to the centroid plane F than the positioning center point P.

In some embodiments, in a case where the door body 20 is opened to a preset unlocking angle, the first fit portion is disengaged from the second fit portion.

Figure 8B:
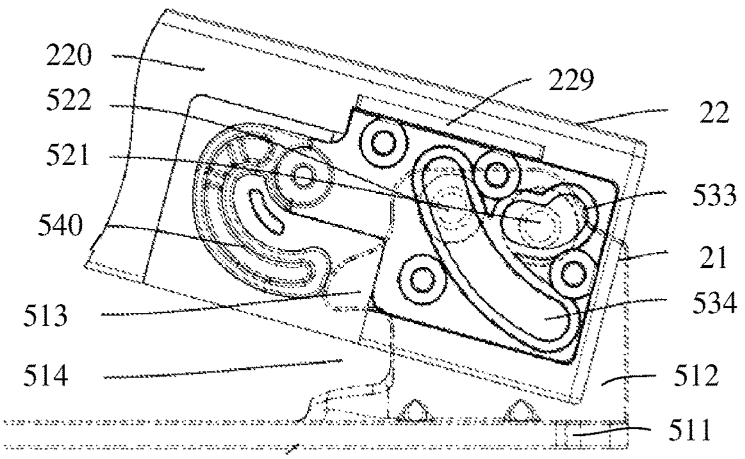
FIG. 8B is a structural diagram of a second hinge assembly of a refrigerator when a door body is opened to any angle less than 90°, in accordance with some embodiments.
Figure 9A:
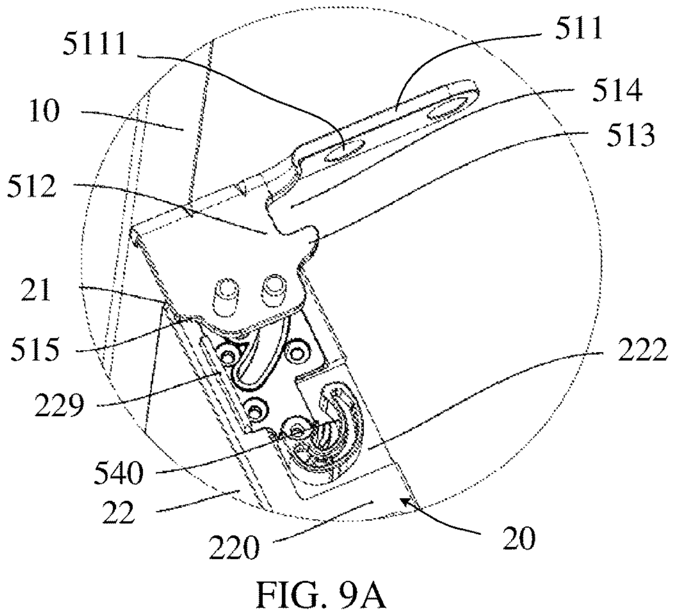
FIG. 9A is a perspective view of a second hinge assembly of a refrigerator when a door body is opened to 90°, in accordance with some embodiments.
Figure 9B:
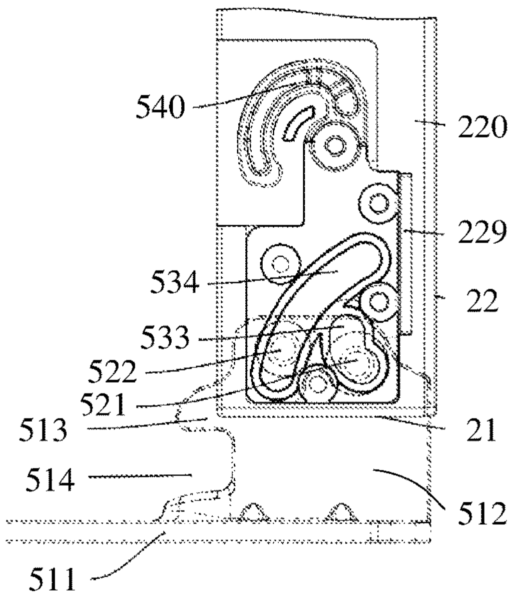
FIG. 9B is a structural diagram of a second hinge assembly of a refrigerator when a door body is opened to 90°, in accordance with some embodiments.

For example, referring to FIGS. 8A and 8B, in a case where the door body 20 is opened to the unlocking angle, the locking hook 540 is disengaged from the blocking portion 513.

In some embodiments, the unlocking angle is set to $G_1$. That is, in a case where the door body 20 is opened to $G_1$, the locking hook 540 is disengaged from the blocking portion 513.

In some embodiments, the unlocking angle is set to $G_2$. That is, in a case where the door body 20 is opened to $G_2$, the locking hook 540 is disengaged from the blocking portion 513.

It can be understood that during the process of the door body 20 being opened from the closed state to $G_2$, the door body 20 moves a short distance towards the inner side for each unit of rotational angle, which is conducive to implementing rapid separation between the locking hook 540 and the blocking portion 513 and improving the smoothness of opening the door body 20.

As shown in FIGS. 14D to 14G, during the process of the door body 20 being opened from any angle greater than $G_2$ to any angle less than $G_7$, the first shaft 421 moves along the curved trajectory segment of the first trajectory line S towards the direction proximate to the door side wall 21 and proximate to the door front wall 22, and the second shaft 422 moves along the second trajectory line K towards a direction proximate to the door side wall 21 and away from the door front wall 22.

It will be noted that during the process of the door body 20 being opened from any angle greater than $G_2$ to any angle less than $G_7$, the movement trends of the guiding center point Q and the positioning center point P remain unchanged. When the door body 20 is opened to different angles (the angle is between $G_2$ and $G_7$), positions of the first shaft 421 relative to the straight trajectory segment of the first trajectory line S are different, and positions of the second shaft 422 relative to the second trajectory line K are different.

In this way, in a case where the opening angle of the door body 20 is greater than $G_2$ and less than $G_7$, any opening angle greater than $G_2$ and less than $G_7$ is chosen to represent the relative positions of the first shaft 421 with respect to the first trajectory groove 433 and the second shaft 422 with respect to the second trajectory groove 434 when the door body 20 is opened to the corresponding range.

For example, as shown in FIGS. 14D to 14G, $G_3$, $G_4$, $G_5$, and $G_6$ are used to represent the positions in the opening angle range, so as to compare with the positions when the door body 20 is opened to other angles. $G_2<G_3<G_4<G_5<G_6<G_7$.

Referring to FIGS. 14D to 14G and 15C to 15F, during the process of the door body 20 being opened from any angle greater than $G_2$ and less than $G_3$ to $G_3$, $G_4$, $G_5$, and $G_6$, the positioning center point P moves along the first trajectory line S towards the direction proximate to the door side wall 21 and proximate to the door front wall 22 to reach a positioning point $P_3$, a fourth positioning point $P_4$, a fifth positioning point $P_5$, and a sixth positioning point $P_6$. Correspondingly, the guiding center point Q moves along the second trajectory line K towards a direction proximate to the door side wall 21 and away from the door front wall 22 to reach a third guiding point $Q_3$, a fourth guiding point $Q_4$, a fifth guiding point $Q_5$, and a sixth guiding point Q.

In some embodiments, $G_3$ is any value in a range from 22° to 30°. For example, the third angle $G_3$ is 22°, 25°, 28°, or 30°.

Figure 14E:
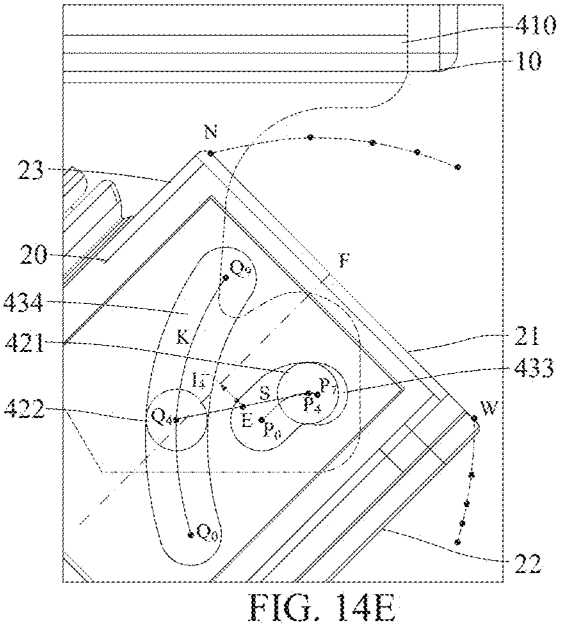
FIG. 14E is a structural diagram of a door body of a refrigerator opened to a first angle $G_4$, in accordance with some embodiments.
Figure 15D:
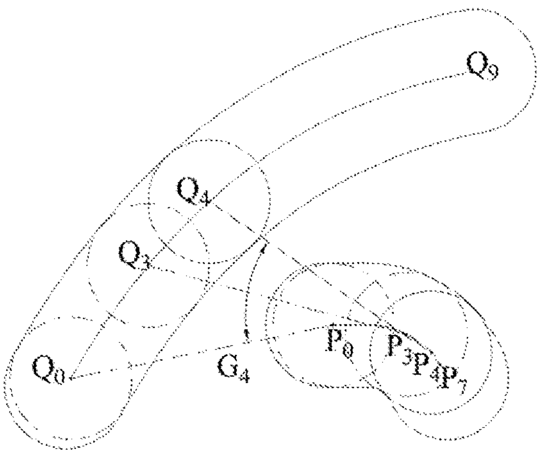
FIG. 15D is a schematic diagram showing relative positions of a first shaft, a second shaft, a first trajectory groove and a second trajectory groove when a door body of a refrigerator is opened to a first angle $G_4$, in accordance with some embodiments.

In some embodiments, as shown in FIGS. 14E and 15D, in a case where the door body 20 is opened to $G_4$, the centroid plane F of the door body 20 moves between the positioning center point P and the guiding center point Q. $G_4$ is any value in a range from 43° to 47°. For example, $G_4$ is 43°, 45°, or 47°.

Figure 14F:
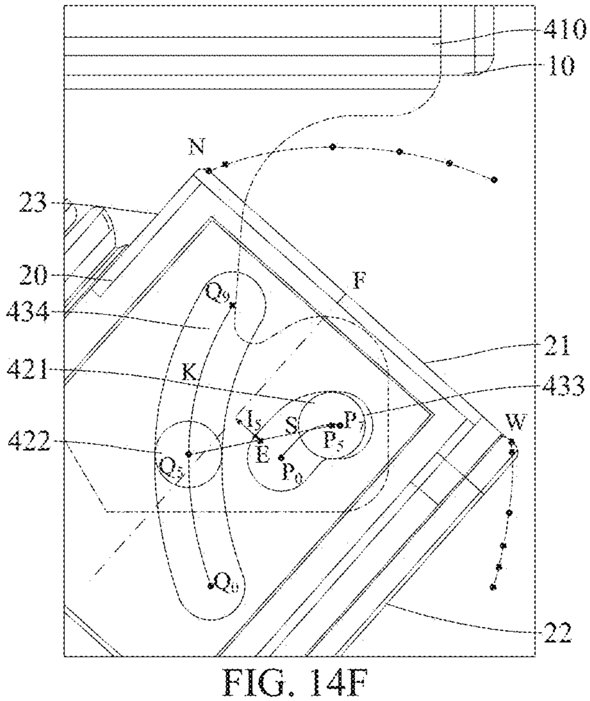
FIG. 14F is a structural diagram of a door body of a refrigerator opened to a first angle $G_5$, in accordance with some embodiments.
Figure 15E:
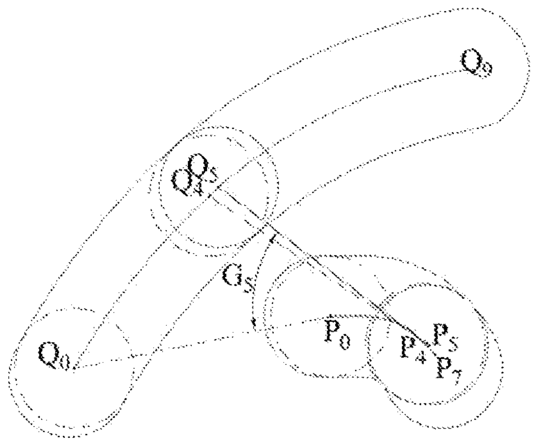
FIG. 15E is a schematic diagram showing relative positions of a first shaft, a second shaft, a first trajectory groove and a second trajectory groove when a door body of a refrigerator is opened to a first angle $G_5$, in accordance with some embodiments.

In some embodiments, as shown in FIGS. 14F and 15E, in a case where the door body 20 is opened to $G_5$, the distance between the first lateral edge W and the datum plane M0 reaches a maximum value. In this case, the distance between the first lateral edge W and the datum plane M0 is less than the width of the first gap 101, thereby effectively preventing the door body 20 from colliding with the cabinet 100 during opening.

In some embodiments, $G_5$ is any value in a range from 46° to 50°. For example, $G_5$ is 46°, 48°, or 50°, that is, in a case where the door body 20 is opened to about 48°, the distance between the first lateral edge W and the datum plane M0 reaches the maximum.

Figure 14G:
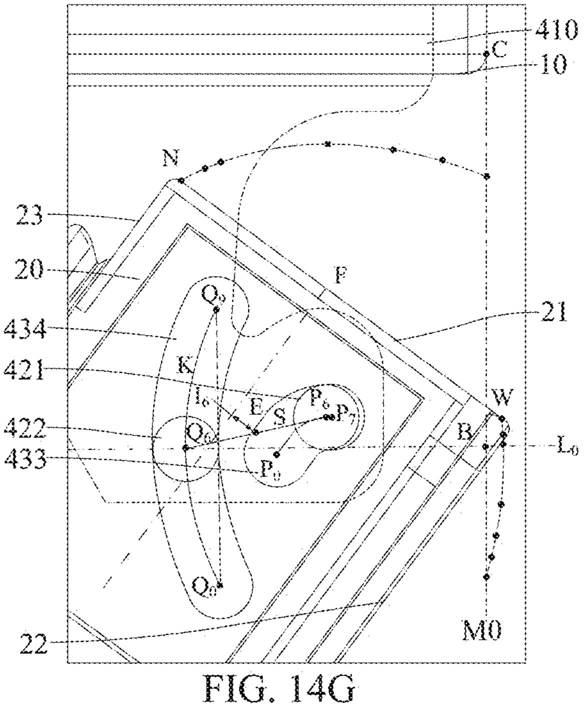
FIG. 14G is a structural diagram of a door body of a refrigerator opened to a first angle $G_6$, in accordance with some embodiments.
Figure 15F:
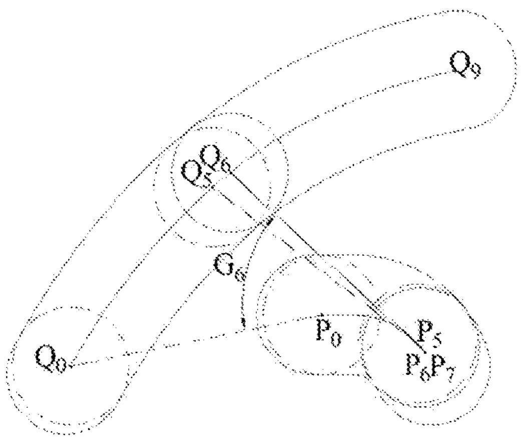
FIG. 15F is a schematic diagram showing relative positions of a first shaft, a second shaft, a first trajectory groove and a second trajectory groove when a door body of a refrigerator is opened to a first angle $G_6$, in accordance with some embodiments.

As shown in FIGS. 14G and 15F, in a case where the door body 20 is opened to $G_6$, the guiding center point Q moves to a midpoint $Q_6$ of the second trajectory line K. In this case, a straight line $Q_0$-$Q_9$ (the straight line where the two ends of the second trajectory line K are located) where the initial guiding point $Q_0$ and the ninth guiding point $Q_9$ are located is substantially parallel to the datum plane M0. That is, a perpendicular bisector line $L_0$ of a line segment $Q_0Q_9$ is approximately perpendicular to the datum plane M0.

It will be noted that "approximately perpendicular" is defined as an angle between the perpendicular bisector line $L_0$ and the datum plane M0 that is any value in a range from 88° to 92°.

The above setting defines the extension direction of the second trajectory groove 434, so that, during the opening process of the door body 20, the synchronous movement of the first shaft 421 relative to the first trajectory groove 433 and the second shaft 422 relative to the second trajectory groove 434 is smoother, which is conducive to improving the fluency and stability of opening the door body 20.

In some embodiments, in a case where the door body 20 is in the closed state, the included angle between a straight line containing the major axis of the ellipse where the second trajectory line K is located and the datum plane M0 is $G_6$, which is conducive to improving the smoothness of opening the door body 20.

In some embodiments, the straight line where the line segment $Q_0Q_9$ is located is parallel to the major axis of the ellipse where the second trajectory line K is located, so that the curvature of the second trajectory line K changes more gently, which is conducive to improving the smoothness of the movement of the second shaft 422 along the second trajectory groove 434.

In some embodiments, $G_6$ is equal to or proximate to $G_9/2$. For example, $G_6$ E $[G_9/2\text{-}6°, G_9/2]$. In addition, in a case where the door body 20 is opened to $G_6$, the guiding center point Q moves to the midpoint of the second trajectory line K. In this way, during the opening process of the door body 20, the movement trajectory of the second shaft 422 relative to the second trajectory groove 434 is more stable, which is conducive to improving the smoothness of opening the door body 20.

In some embodiments, $G_9$ is any value in a range from 112° to 120°. For example, $G_9$ is 112°, 115°, 118°, or 120°. $G_6$ is any value in a range from 50° to 60°. For example, $G_6$ is 50°, 53°, 56°, or 60°.

It will be noted that in a case where the door body 20 is opened to $G_6$, the centroid plane F of the door body 20 is located between the positioning center point P and the guiding center point Q.

Figure 14H:
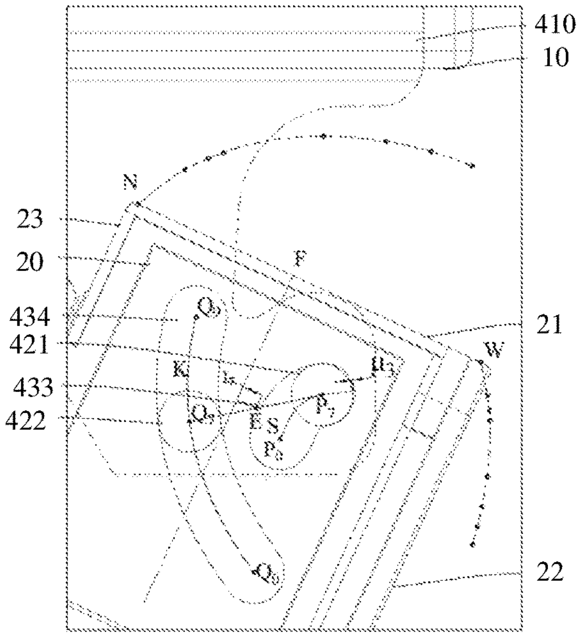
FIG. 14H is a structural diagram of a door body of a refrigerator opened to a first angle $G_7$, in accordance with some embodiments.
Figure 15G:
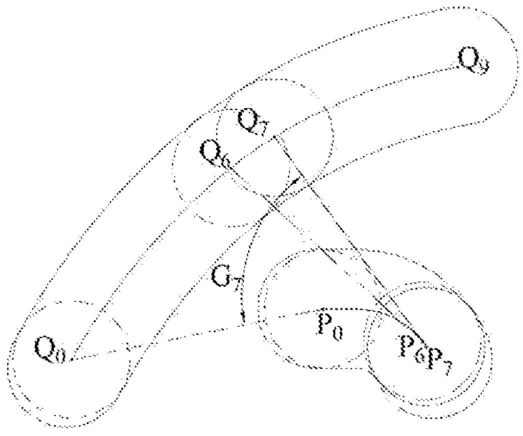
FIG. 15G is a schematic diagram showing relative positions of a first shaft, a second shaft, a first trajectory groove and a second trajectory groove when a door body of a refrigerator is opened to a first angle $G_7$, in accordance with some embodiments.

As shown in FIGS. 14H and 15G, in a case where the door body 20 is opened to $G_7$, the positioning center point P is located at the seventh positioning point $P_7$ on the first trajectory line S, and the guiding center point Q is located at the seventh guiding point $Q_7$ on the second trajectory line K. The seventh positioning point $P_7$ is closer to the door side wall 21 and closer to the door front wall 22 than the sixth positioning point $P_6$, and the seventh guiding point $Q_7$ is closer to the door side wall 21 and farther from the door front wall 22 than the sixth guiding point $Q_6$. In this case, the positioning center point P moves to the other end of the curved trajectory segment of the first trajectory line S. The centroid plane F of the door body 20 is located between the positioning center point P and the guiding center point Q.

In some embodiments, $G_7$ may be set to any value in a range from 63° to 67°. For example, $G_7$ may be 63°, 64°, 65°, or 67°.

In some embodiments, as shown in FIGS. 14I, 14J, 15H, and 15I, during the process of the door body 20 being opened from any value greater than $G_7$ to $G_9$ (about 116°), the first shaft 421 moves along the curved trajectory segment of the first trajectory line S towards the direction proximate to the door side wall 21 and proximate to the door front wall 22, and the second shaft 422 moves along the second trajectory line K towards a direction proximate to the door side wall 21 and away from the door front wall 22.

It will be noted that during the process of the door body 20 being opened from any angle greater than $G_7$ to $G_9$, the trend of the guiding center point Q is consistent with the trend of the positioning center point P. The only difference is that when the door body 20 is opened to different angles (the angles are between $G_7$ and $G_9$), positions of the first shaft 421 relative to the curved trajectory segment of the first trajectory line S are different, and positions of the second shaft 422 relative to the second trajectory line K are different.

In this way, in a case where the opening angle of the door body 20 is greater than $G_7$ and less than or equal to $G_9$, any opening angle greater than $G_7$ and less than or equal to $G_9$ is chosen to represent the relative positions of the first shaft 421 with respect to the first trajectory groove 433 and the second shaft 422 with respect to the second trajectory groove 434 when the door body 20 is opened to the range.

Figure 14I:
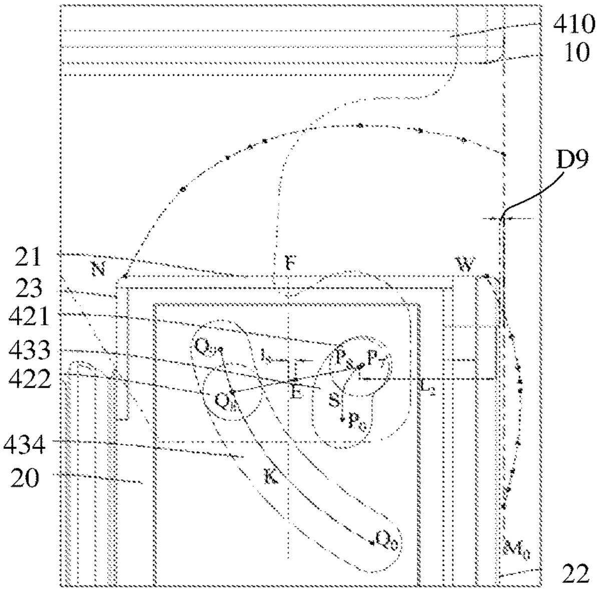
FIG. 14I is a structural diagram of a door body of a refrigerator opened to a first angle $G_8$, in accordance with some embodiments.
Figure 14J:
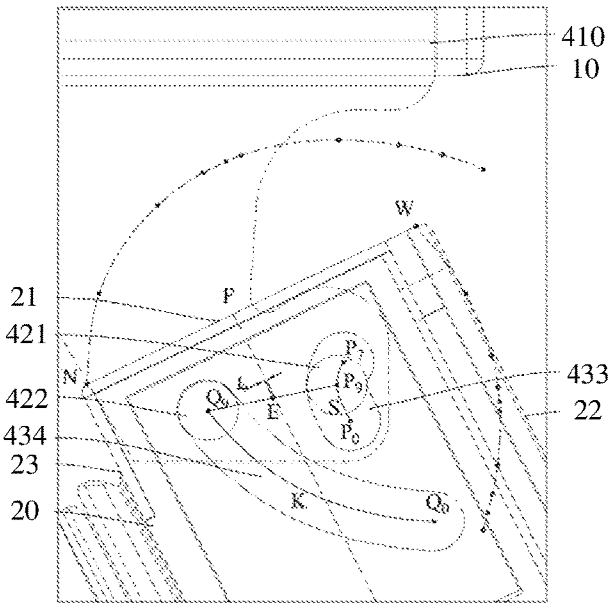
FIG. 14J is a structural diagram of a door body of a refrigerator opened to a first angle $G_9$, in accordance with some embodiments.

For example, as shown in FIGS. 14I and 14J, $G_8$ and $G_9$ are used to represent the positions within the opening angle range, for comparison with the positions when the door body 20 is opened to other states. For example, $G_7<G_8=90°<G_9$.

Figure 15H:
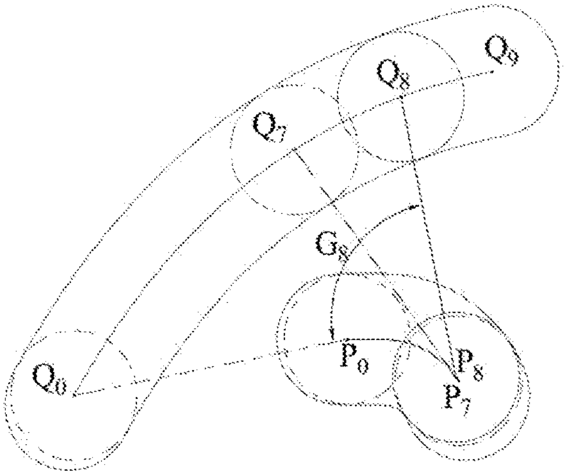
FIG. 15H is a schematic diagram showing relative positions of a first shaft, a second shaft, a first trajectory groove and a second trajectory groove when a door body of a refrigerator is opened to a first angle $G_8$, in accordance with some embodiments.

As shown in FIGS. 14I and 15H, in a case where the door body is opened to $G_8$, the positioning center point P is located at the eighth positioning point $P_8$ on the first trajectory line S, and the guiding center point Q is located at the eighth guiding point $Q_8$ on the second trajectory line K. The eighth positioning point $P_8$ is farther away from the door side wall 21 and away from the door front wall 22 than the seventh positioning point $P_7$, and the eighth guiding point $Q_8$ is closer to the door side wall 21 and farther away from the door front wall 22 than the seventh guiding point $Q_7$. In this case, the centroid plane F is located between the positioning center point P and the guiding center point Q.

Figure 15I:
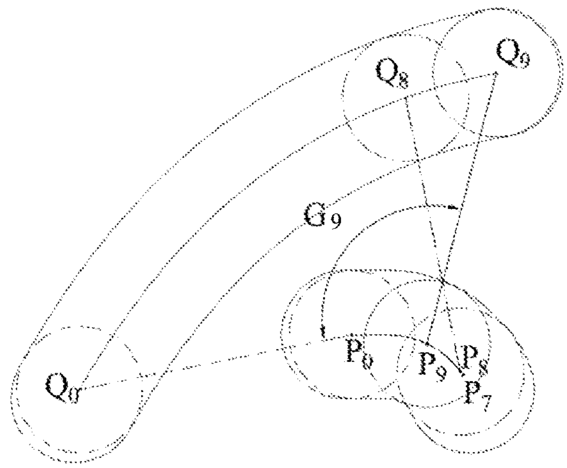
FIG. 15I is a schematic diagram showing relative positions of a first shaft, a second shaft, a first trajectory groove and a second trajectory groove when a door body of a refrigerator is opened to a first angle $G_9$, in accordance with some embodiments.

As shown in FIGS. 14J and 15I, in a case where the door body is opened to $G_9$, the positioning center point P is located at the ninth positioning point $P_9$ on the first trajectory line S, and the guiding center point Q is located at the ninth guiding point $Q_9$ on the second trajectory line K. The ninth positioning point $P_9$ is farther away from the door side wall 21 and the door front wall 22 than the eighth positioning point $P_8$, and the ninth guiding point $Q_9$ is closer to the door side wall 21 and farther away from the door front wall 22 than the eighth guiding point $Q_8$. In this case, the centroid plane F is located between the positioning center point P and the guiding center point Q.

In some embodiments, $G_1$, $G_2$, $G_3$, $G_4$, $G_5$, $G_6$, $G_7$, $G_8$, and $G_9$ are sequentially referred to as a first angle $G_1$, a second angle $G_2$, a third angle $G_3$, a fourth angle $G_4$, a fifth angle $G_5$, a sixth angle $G_6$, a seventh angle $G_7$, an eighth angle $G_8$ and a maximum angle $G_9$.

The initial positioning point $P_0$, the first positioning point $P_1$ and the second positioning point $P_2$ are distributed along the straight trajectory segment towards the direction proximate to the door side wall 21, the third positioning point $P_3$, the fourth positioning point $P_4$, the fifth positioning point $P_5$, the sixth positioning point $P_6$, and the seventh positioning point $P_7$ are distributed along the curved trajectory segment towards the direction proximate to the door side wall 21 and proximate to the door front wall 22. The seventh positioning point $P_7$, the eighth positioning point $P_8$, and the ninth positioning point $P_9$ are distributed along the curved trajectory segment towards the direction away from the door side wall 21 and away from the door front wall 22.

It will be noted that the present disclosure does not limit the relative positions of the ninth positioning point $P_9$ and the eighth positioning point $P_8$ with the third positioning point $P_3$, the fourth positioning point $P_4$, the fifth positioning point $P_5$, and the sixth positioning point $P_6$. In some embodiments, the eighth positioning point $P_8$ is located between the sixth positioning point $P_6$ and the seventh positioning point $P_7$, and the ninth positioning point $P_9$ is proximate to the third positioning point $P_3$.

The initial guiding point $Q_0$, the first guiding point $Q_1$, the second guiding point $Q_2$, the third guiding point $Q_3$, the fourth guiding point $Q_4$, the fifth guiding point $Q_5$, the sixth guiding point $Q_6$, the seventh guiding point $Q_7$, the eighth guiding point $Q_8$, and the ninth guiding point $Q_9$ are distributed along the first trajectory line S towards the direction proximate to the door side wall 21 and away from the door front wall 22 in sequence.

In summary, during the process of the door body 20 being opened to any angle less than the second angle $G_2$, the first shaft 421 moves towards the door side wall 21 along the straight groove segment of the first trajectory groove 433.

During the process of the door body 20 being continued to be opened to the second angle $G_2$, the first shaft 421 moves along the first trajectory groove 433 in the direction proximate to the door side wall 21 to the other end (the second positioning point $P_2$) of the straight groove segment.

During the process of the door body 20 being continued to be opened to any angle less than the sixth angle $G_6$, the first shaft 421 moves along the curved groove segment of the first trajectory groove 433 towards the direction proximate to the door side wall 21 and proximate to the door front wall 22.

During the process of the door body 20 being continued to be opened to the sixth angle $G_6$, the first shaft 421 moves along the first trajectory groove 433 towards the direction proximate to the door side wall 21 and proximate to the door front wall 22 to the other end (the seventh positioning point $P_7$) of the curved groove segment.

During the process of the door body 20 being continued to be opened to any angle greater than the seventh angle $G_7$, the first shaft 421 moves along the curved groove segment of the first trajectory groove 433 towards the direction away from the door side wall 21 and away from the door front wall 22.

During the whole process (the process of the door body 20 being opened from 0° to the maximum angle $G_9$) of opening the door body 20, the second shaft 422 moves along the second trajectory groove 434 towards the direction proximate to the door side wall 21 and away from the door front wall 22.

In some embodiments, the first shaft 421 and the second shaft 422 are fixed on the first hinge plate 410 and are stationary relative to the first hinge plate 410. The first trajectory groove 433 and the second trajectory groove 434 are disposed on the door body 20 and are stationary relative to the door body. Therefore, the movement of the axis line segment PQ relative to the trajectory groove (including the first trajectory groove 433 and the second trajectory groove 434) is equivalent to the movement of the first hinge plate 410 relative to the door body 20.

Since the first hinge plate 410 is stationary relative to the box body 10, the movement of the axis line segment PQ relative to the trajectory groove is also equivalent to the movement of the box body 10 relative to the door body 20. According to the relativity of the movement, the movement of the door body 20 relative to the box body 10 may be obtained from the movement of the box body 10 relative to the door body 20.

For convenience of description, the movement of the box body 10 relative to the door body 20 will be represented by the movement of the axis line segment PQ relative to the door body 20 in the following description, and the movement of the door body 20 relative to the box body 10 is derived based on the principle of relative motion.

It can be understood that, taking the opening angles $G_2$ and $G_7$ of the door body 20 as the dividing angles, the whole process of opening the door body 20 may be divided into three stages. Hereinafter, the three stages will be described in detail with reference to the cooperation relationship between the first double-shaft assembly 420 and the trajectory grooves and the movement trajectory of the axis line segment PQ.

[The First Stage]

In the first stage, as shown in FIG. 15B, the door body 20 is opened from 0° to the second angle $G_2$ through the first angle $G_1$. In this process, the positioning center point P moves from the initial positioning point $P_0$ along the straight trajectory segment of the first trajectory line S towards the direction proximate to the door side wall 21, and the guiding center point Q moves from the initial guiding point $Q_0$ along the second trajectory line K towards the direction proximate to the door side wall 21 and away from the door front wall 22.

The positioning center point P moves from the initial positioning point $P_0$ to the second positioning point $P_2$ through the first positioning point $P_1$ along the straight trajectory segment of the first trajectory line S. The guiding center point Q moves from the initial guiding point $Q_0$ to the second guiding point $Q_2$ through the first guiding point $Q_1$ along the second trajectory line K.

In the first stage, the first trajectory groove 433 and the second trajectory groove 434 are taken as reference objects, the axis line segment PQ moves towards the outer side while rotating. For example, the axis line segment PQ rotates clockwise from $P_0Q_0$ and moves towards the outer side to $P_1Q_1$ and $P_2Q_2$ in sequence.

It can be understood that the first trajectory groove 433 and the second trajectory groove 434 are stationary relative to the door body 20, the axis line segment PQ is stationary relative to the box body 10, and the movement of the axis line segment PQ may represent the movement of the box body 10. Therefore, in a case where the door body 20 is taken as a reference object, during the process of the door body 20 being opened from the closed state to the second angle $G_2$, the box body 10 rotates clockwise relative to the door body 20 and moves towards the outer side for a certain distance. According to the relativity of motion, in a case where the box body 10 is taken as a reference object, during the process of the door body 20 being opened from the closed state to the second angle $G_2$, the door body 20 rotates counterclockwise relative to the box body 10 and moves towards the inner side for a certain distance.

In this way, in a case where the first lateral edge W moves to the outer side due to the rotation of the door body 20, the first lateral edge W further moves to the inner side due to the movement of the door body 20 to the inner side, thereby preventing the door body 20 from interfering with the cabinet 100.

[Second Stage]

In the second stage, as shown in FIGS. 15B to 15G and 16, the door body 20 is opened from the second angle $G_2$ to the seventh angle $G_7$ through the third angle $G_3$, the fourth angle $G_4$, the fifth angle $G_5$, and the sixth angle $G_6$ in sequence.

In this process, the positioning center point P moves from the second positioning point $P_2$ to the seventh positioning point $P_7$ through the third positioning point $P_3$, the fourth positioning point $P_4$, the fifth positioning point $P_5$, and the sixth positioning point $P_6$. And the positioning center point P moves along the curved trajectory segment of the first trajectory line S towards the direction proximate to the door side wall 21 and proximate to the door front wall 22. The guiding center point Q moves from the second guiding point $Q_2$ to the seventh guiding point $Q_7$ through the third guiding point $Q_3$, the fourth guiding point $Q_4$, the fifth guiding point $Q_5$, and the sixth guiding point $Q_6$. And the guiding center point Q moves along the second trajectory line K towards the direction proximate to the door side wall 21 and away from the door front wall 22.

In the second stage, the first trajectory groove 433 and the second trajectory groove 434 are taken as reference objects, the axis line segment PQ moves towards the outer side while rotating. For example, the axis line segment PQ rotates clockwise from $P_2Q_2$ and moves towards the outer side to $P_3Q_3$, $P_4Q_4$, $P_5Q_5$, $P_6Q_6$, and $P_7Q_7$ in sequence.

It can be understood that the first trajectory groove 433 and the second trajectory groove 434 are stationary relative to the door body 20, the axis line segment PQ is stationary relative to the box body 10, and the movement of the axis line segment PQ may represent the movement of the box body 10. Therefore, in a case where the door body 20 is taken as a reference object, during the process of the door body 20 being opened from the second angle $G_2$ to the seventh angle $G_7$, the box body 10 rotates clockwise relative to the door body 20 and moves along the curved trajectory segment towards the outer side and the front side (the direction proximate to the door body 20). According to the relativity of motion, in a case where the box body 10 is taken as a reference object, during the process of the door body 20 being opened from the second angle $G_2$ to the seventh angle $G_7$, the door body 20 rotates counterclockwise relative to the box body 10 and moves along the curved trajectory segment towards the inner side and the rear side (the direction proximate to the box body 10).

In this way, in a case where the first lateral edge W moves to the outer side due to the rotation of the door body 20, the first lateral edge W further moves to the inner side due to the movement of the door body 20 to the inner side, thereby preventing the door body 20 from interfering with the cabinet 100. In addition, the door body 20 further moves towards the direction proximate to the box body 10 while rotating, so that the door body 20 may be prevented from moving too much in the direction away from the box body 10 due to rotation, which is conducive to improving the integrity of door body 20 and box body 10.

[The Third Stage]

Figure 17:
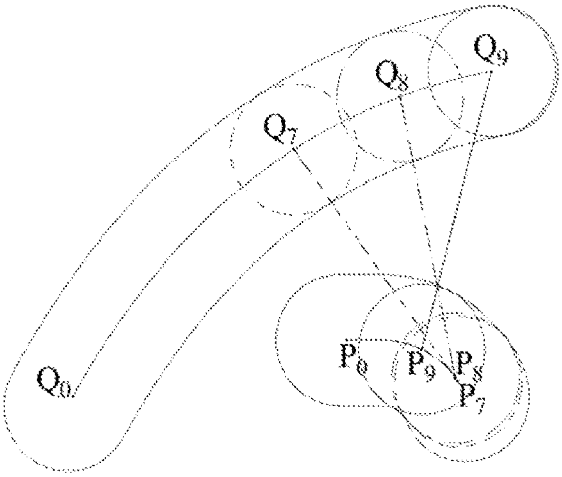
FIG. 17 is a schematic diagram showing relative positions of a first shaft, a second shaft, a first trajectory groove and a second trajectory groove when a door body of a refrigerator is opened from a seventh angle $G_7$ to a ninth angle $G_9$ (corresponding to a third stage), in accordance with some embodiments.

In the third stage, as shown in FIGS. 15H, 15I, and 17, the door body 20 is opened from the seventh angle $G_7$ (about 90°) to the maximum angle $G_9$ through the eighth angle $G_8$.

In this process, the positioning center point P moves from the seventh positioning point $P_7$ to the ninth positioning point $P_9$ through the eighth positioning point $P_8$. And the positioning center point P moves along the curved trajectory segment of the first trajectory line S towards the direction away from the door side wall 21 and away from the door front wall 22. The guiding center point Q moves from the seventh guiding point $Q_7$ to the ninth guiding point $Q_9$ through the eighth guiding point $Q_8$. And the guiding center point Q moves along the second trajectory line K towards the direction proximate to the door side wall 21 and away from the door front wall 22.

In the third stage, the first trajectory groove 433 and the second trajectory groove 434 are taken as reference objects, and during the process of the door body 20 being opened from the seventh angle $G_7$ to the maximum angle $G_9$, the axis line segment PQ moves towards the inner side while rotating clockwise. For example, the axis line segment PQ rotates clockwise from $P_7Q_7$ and moves towards the inner side to $P_8Q_8$ and $P_9Q_9$ in sequence.

It can be understood that the first trajectory groove 433 and the second trajectory groove 434 are stationary relative to the door body 20, the axis line segment PQ is stationary relative to the box body 10, and the movement of the axis line segment PQ may represent the movement of the box body 10.

Therefore, in a case where the door body 20 is taken as a reference object, during the process of the door body 20 being opened from the seventh angle $G_7$ to the maximum angle $G_9$, the box body 10 rotates clockwise relative to the door body 20 and moves towards the inner side and the rear side (the direction away from the door body 20). According to the relativity of motion, in a case where the box body 10 is taken as a reference object, during the process of the door body 20 being opened from the seventh angle $G_7$ to the maximum angle $G_9$, the door body 20 rotates counterclockwise relative to the box body 10 and moves towards the outer side and the front side (the direction away from the box body 10).

It can be understood that the door body 20 is opened from 90° to a greater angle (i.e., the maximum angle $G_9$) in the third stage. Therefore, the first lateral edge W will not interfere with the cabinet 100, but there is still a possibility of interference with box body 10.

Therefore, in the third stage, the door body 20 is set to rotate counterclockwise relative to the box body 10 and move towards the outer side and the front side (the direction away from the box body 10), so that the first lateral edge W is driven by the door body 20 and moves towards the direction away from the box body 10, so as to prevent the first lateral edge W from interfering with the box body 10. In addition, since the door body 20 moves towards the outer side, the door body 20 may be opened to a greater angle in the third stage, and the door body 20 may be prevented from blocking the access opening.

Combining the first stage and the second stage, during the process of the door body 20 being opened from the closed state to the seventh angle $G_7$, the door body 20 maintains a tendency to move towards the inner side. Relative to the closed state of the door body 20, when the door body 20 is opened to the seventh angle $G_7$, the distance that the door body 20 moves to the inner side is referred to as a first distance D1.

In the third stage, relative to the state when the door body 20 is opened to the seventh angle $G_7$, when the door body 20 is opened to the maximum angle $G_9$, the distance that the door body 20 moves to the outer side is referred to as a second distance D2.

In some embodiments, the first distance D1 is greater than the second distance D2. That is, a lateral displacement of the door body 20 moving to the inner side first is greater than a lateral displacement of the door body 20 moving to the outer side afterwards.

In summary, during the process of the door body 20 being opened from the closed state to the maximum angle $G_9$, the door body 20 rotates around a dynamically changing axis. The dynamically changing axis first moves to the inner side for the first distance D1, and then moves to the outer side for the second distance D2, so that the door body 20 first moves to the inner side for the first distance D1, and then moves to the outer side for the second distance D2. The first shaft 421 moves relative to the first trajectory groove 433, and the second shaft 422 moves relative to the second trajectory groove 434.

In some embodiments, during the process of the door body 20 being opened from the closed state to the maximum angle $G_9$, the relative positional relationship between the centroid plane F and the first shaft 421 and the second shaft 422 changes constantly.

Referring to FIGS. 14A to 14D, in a case where the door body 20 is opened to the third angle $G_3$ from the closed state, the first shaft 421 and the second shaft 422 are located at the same side of the centroid plane F.

Referring to FIGS. 14E to 14J, during the process of the door body 20 being opened from the fourth angle $G_4$ to the maximum angle $G_9$, the centroid plane F is located between the first shaft 421 and the second shaft 422.

It can be understood that, during most of the opening process of the door body 20 (the opening angle is in a range from about 45° to about 116°), the centroid plane F is located between the first shaft 421 and the second shaft 422, which is conducive to improving the stability of the door body 20 during the opening process.

Hereinafter, the relative positional relationship between the centroid plane F and the first shaft 421 and the second shaft 422 will be introduced in detail with reference to a changing trend of a distance between a midpoint of the axis line segment PQ and the centroid plane F during the opening process of the door body 20.

Referring to FIGS. 14E to 14J, the midpoint of the axis line segment PQ is referred to as an axis center midpoint E. A distance between the axis center midpoint E and the centroid plane F is referred to as an offset distance I. In a case where the axis center midpoint E is located at a side of the centroid plane F proximate to the door front wall 22, the offset distance I is a positive number. In a case where the axis center midpoint E is located at a side of the centroid plane F away from the door front wall 22, the offset distance I is a negative number. In a case where the axis center midpoint E is located on the centroid plane F, the offset distance I is 0.

During the process of the door body 20 being opened from the fourth angle $G_4$ to the maximum angle $G_9$, the offset distance I between the axis center midpoint E and the centroid plane F is decreasing. For example, in a case where the door body 20 is opened to the fourth angle $G_4$, the fifth angle $G_5$, the sixth angle $G_6$, the seventh angle $G_7$, the eighth angle $G_8$, and the maximum angle $G_9$ in sequence, the offset distances are referred to as $I_4$, $I_5$, $I_6$, $I_7$, $I_8$, and $I_9$ in sequence. For example, $I_4>I_5>I_6>I_7>I_8>0\geq I_9$.

It can be understood that, during the opening process of the door body 20, as the opening angle increases, the moment of the door body 20 will increase accordingly, which results in a deterioration of the stability of the door body 20 and is prone to shaking.

Therefore, in some embodiments of the present disclosure, the offset distance I between the axis center midpoint E and the centroid plane F is set such that as the opening angle of the door body 20 increases, the offset distance I decreases. That is, as the opening angle of the door body 20 increases, the centroid plane F moves accordingly and approaches the midpoint of the axis line segment PQ, thereby improving the stability of the door body 20 during opening.

In some embodiments, in a case where the opening angle of the door body 20 is Ga, the axis center midpoint E is located on the centroid plane F, and the offset distance I is 0. For example, the angle Ga is any value in a range from 110° to 116° (e.g., 110°, 113° or 116°). In this way, referring to FIG. 14J, in a case where the door body 20 is opened to the maximum angle $G_9$, the centroid plane F is proximate to the axis center midpoint E (e.g., $I_9$ is any value in a range from −1 mm to 1 mm), which is conducive to improving the stability of the door body 20 when the door body 20 is opened to the maximum angle $G_9$.

In some embodiments, during the process of the door body 20 being opened from the eighth angle $G_8$ (about 90°) to the maximum angle $G_9$, the offset distance I is any value in a range from −4 mm to 4 mm (e.g., −4 mm, 0, or 4 mm), so as to effectively improve the stability of the door body 20 when the door body 20 is opened to a relatively large angle (e.g., when the door body is opened to an angle between the eighth angle $G_8$ and the maximum angle $G_9$).

Figure 16:
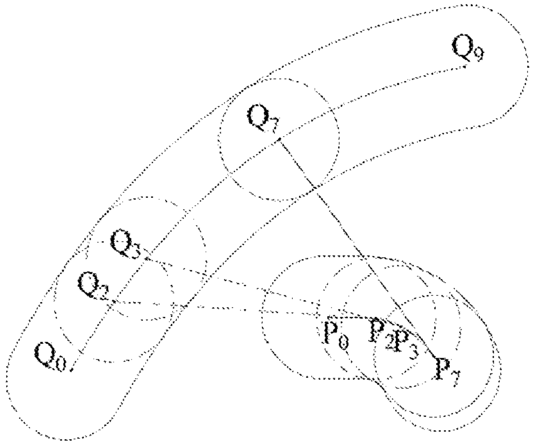
FIG. 16 is a schematic diagram showing relative positions of a first shaft, a second shaft, a first trajectory groove and a second trajectory groove when a door body of a refrigerator is opened from a second angle $G_2$ to a seventh angle $G_7$ (corresponding to a second stage), in accordance with some embodiments.

In some embodiments, as shown in FIGS. 15B and 16, during the process (i.e., the first stage of the opening of the door body) of the door body 20 being opened from the closed state to the second angle $G_2$, the first shaft 421 moves in a straight line along the straight groove segment of the first trajectory groove 433, and the door body 20 moves a third distance D3 (i.e., a first marginal distance) towards the inner side when the door body 20 is opened for a unit angle. During the process (e.g., the second stage the opening of the door body) of the door body 20 being opened from the second angle $G_2$ to the seventh angle $G_7$, the first shaft 421 moves along the curved groove segment of the first trajectory groove 433, and the door body 20 moves a fourth distance D4 (i.e., a second marginal distance) towards the inner side when the door body 20 is opened for a unit angle. In addition, the third distance D3 is greater than the fourth distance D4 (i.e., D3>D4).

It can be understood that, in the first stage of the opening of the door body, the distance that the door body 20 moves towards the inner side is large when the door body 20 is opened for a unit angle, so that the door body 20 drives the first lateral edge W to move a greater distance towards the inner side. Therefore, the distance between the first lateral edge W and the datum plane M0 is less than the width of the first gap 101, so as to prevent the first lateral edge W from colliding with the cabinet 100.

In some embodiments, as shown in FIG. 17, during the process of the door body 20 being opened from the seventh angle $G_7$ to the maximum angle $G_9$, the first shaft 421 retreats along the first trajectory line S towards the direction away from the door side wall 21 and away from the door front wall 22. A stage in which the door body 20 is opened from the seventh angle $G_7$ to the eighth angle $G_8$ is referred to as a first retreat stage, and a stage in which the door body 20 is opened from the eighth angle $G_8$ to the maximum angle $G_9$ is referred to as a second retreat stage.

In the first retreat stage, the door body 20 moves a fifth distance D5 towards the outer side when the door body 20 is opened for a unit angle. In the second retreat stage, the door body 20 moves a sixth distance D6 towards the outer side when the door body 20 is opened for a unit angle, and the sixth distance D6 is greater than the fifth distance D5. For example, the fifth distance D5: the sixth distance D6∈[0.05, 0.1].

It can be understood that, in the first retreat stage, the door body 20 is opened from the seventh angle $G_7$ (about 65°) to the eighth angle $G_8$ (about 90°), and the distance that the door body 20 moves towards the outer side when the door body 20 is opened for a unit angle is short, so as to prevent the door body 20 from exceeding the datum plane M0 too much in a case where the door body 20 is opened to 90°, so that the door body 20 may continue to open to a greater angle.

In the second retreat stage, the door body 20 is opened from 90° to the maximum angle $G_9$, and the distance that the door body 20 moves towards the outer side when the door body 20 is opened for a unit angle is long, thereby preventing the door body 20 from blocking the access opening, which is conducive to improving the user experience when picking and placing foods.

Figure 18:
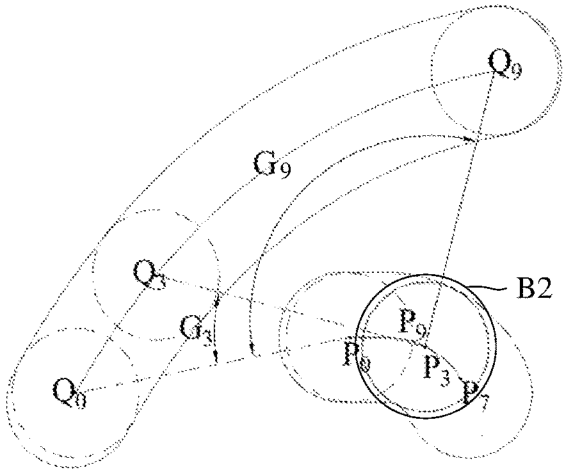
FIG. 18 is another schematic diagram showing relative positions of a first shaft, a second shaft, a first trajectory groove and a second trajectory groove when a door body of a refrigerator is opened to a first angle $G_9$, in accordance with some embodiments.
Figure 19:
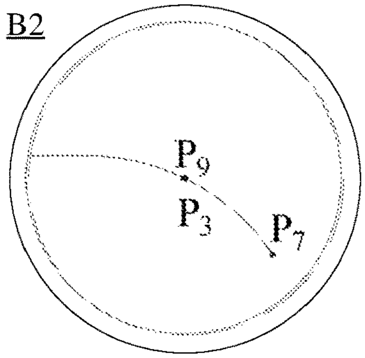
FIG. 19 is a partial enlarged view of the circle B2 in FIG. 18.

In some embodiments, as shown in FIGS. 18 and 19, in a case where the door body 20 is opened to the maximum angle $G_9$, the positioning center point P is located at the ninth positioning point $P_9$. In a case where the door body 20 is opened to the third angle $G_3$, the positioning center point P is located at the third positioning point $P_3$. A difference between the maximum angle $G_9$ and the third angle $G_3$ is approximately 90°, and the ninth positioning point $P_9$ is proximate to the third positioning point $P_3$.

For example, the difference between the maximum angle $G_9$ and the third angle $G_3$ is any value in a range from 88° to 92° (e.g., 88°, 90°, or 92°). A distance between the ninth positioning point $P_9$ and the third positioning point $P_3$ is less than or equal to 1 mm.

In this way, during the process of the door body 20 being opened from the third angle $G_3$ to the maximum angle $G_9$, the first shaft 421 first moves from the third positioning point $P_3$ towards the direction proximate to the door side wall 21 and proximate to the door front wall to the seventh positioning point $P_7$, and then moves towards the direction away from the door side wall 21 and away from the door front wall 22 to the ninth positioning point $P_9$ proximate to the third positioning point $P_3$. That is, during the process of the door body 20 is opened from the third angle $G_3$ to the maximum angle $G_9$, the first shaft 421 approximately performs a back-and-forth motion.

It can be understood that by setting the ninth positioning point $P_9$ proximate to the third positioning point $P_3$, the first shaft 421 may perform the back-and-forth motion in the first trajectory groove 433, which is beneficial to lower the dimension of the first trajectory groove 433 in the thickness direction of the door body 20, thereby reducing the thickness of the door body 20.

In some embodiments, the second trajectory groove 434 includes a first curved groove and a second curved groove, and correspondingly, the second trajectory line K includes a first curved segment and a second curved segment. An end of the first curved segment is closer to the door front wall 22 and farther away from the door side wall 21 than another end of the first curved segment. An end of the second curved segment is connected to the other end of the first curved segment, and another end of the second curved segment extends towards the direction proximate to the door side wall 21 and away from the door front wall 22.

The first lateral edge W is located at a concave side of the first curve segment and is located at a convex side of the second curve segment.

During the process of the door body 20 being opened from the eighth angle $G_8$ to the ninth angle $G_9$, the second shaft 422 moves in the second curved groove, and the guiding center point Q moves from the one end of the second curved segment to the other end of the second curved segment. The first shaft 421 moves in the first trajectory groove 433 simultaneously.

In some embodiments, the second trajectory groove 434 includes a third curved groove and a fourth curved groove, and correspondingly, the second trajectory line K includes a third curved segment and a fourth curved segment. An end of the third curved segment is closer to the door front wall 22 and farther away from the door side wall 21 than another end of the third curved segment. An end of the fourth curved segment is connected to the other end of the third curved segment, and another end of the fourth curved segment extends towards the direction proximate to the door side wall 21 and proximate to the door front wall 22.

The first lateral edge W is located at a concave side of the third curve segment and is located at a concave side of the fourth curve segment.

During the process of the door body 20 being opened from the eighth angle $G_8$ to the ninth angle $G_9$, the second shaft 422 moves in the second curved groove, and the guiding center point Q moves from the one end of the fourth curved segment to the other end of the fourth curved segment. The first shaft 421 moves in the first trajectory groove 433 simultaneously.

In some embodiments, as shown in FIG. 14A, in a case where the door body 20 is closed, the positioning center point P of the first shaft 421 is located at the initial positioning point $P_0$ of the first trajectory line S, and a distance between the initial positioning point $P_0$ and the datum plane M0 is $L_1$ (i.e., a first preset distance). The door front wall 22 is approximately parallel to the plane where the access opening is located and is approximately perpendicular to the datum plane M0.

As shown in FIG. 14I, in a case where the door body 20 is opened to about 90°, the door front wall 22 is approximately parallel to the box body side wall 12. The positioning center point P of the first shaft 421 is located at the eighth positioning point $P_8$ of the first trajectory line S, and a distance between the positioning center point P and the door front wall 22 is $L_2$ (i.e., a second preset distance).

It can be understood that in a case where the door body 20 is opened to about 90°, if $L_1$ and $L_2$ are approximately equal (i.e., a difference between $L_1$ and $L_2$ is less than or equal to 1 mm), the door front wall 22 is approximately located in the datum plane M0. If $L_1$ is greater than $L_2$, the door front wall 22 is located at the inner side of the datum plane M0. If $L_1$ is less than $L_2$, the door front wall 22 is located at the outer side of the datum plane M0.

Therefore, in some embodiments of the present disclosure, $L_1$ and $L_2$ are set to be approximately equal, or $L_1$ is set to be greater than $L_2$. In this way, the door body 20 may be opened from 90° to a greater angle. In some embodiments, $L_1$ and $L_2$ may further be set such that $L_1$ is less than $L_2$, and the difference between $L_2$ and $L_1$ is less than 0.2 times the width of the first gap 101, so that the stability when the door body 20 is opened from 90° to a greater angle is improved.

Figure 20:
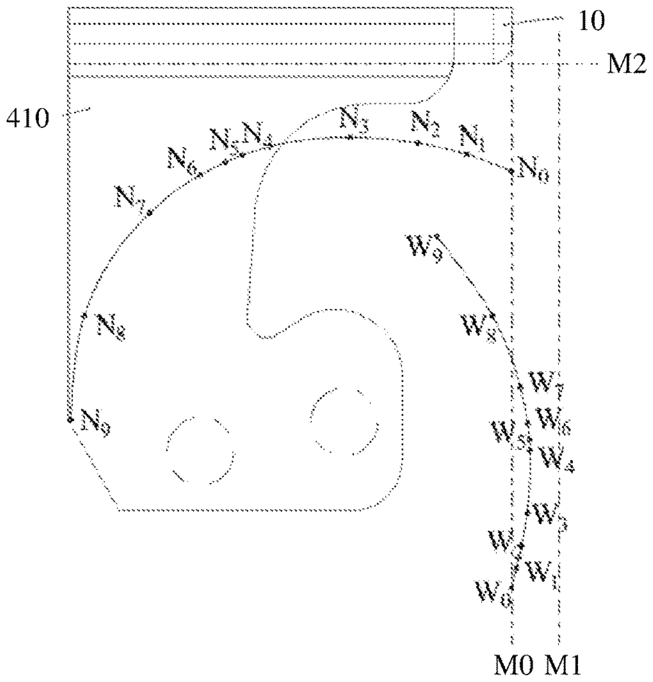
FIG. 20 is a schematic diagram showing a movement trajectory of a first lateral edge and a second lateral edge of a refrigerator during a door body opening process, in accordance with some embodiments.

In some embodiments, as shown in FIG. 20, a plane located at the outer side of the datum plane M0 is defined as a first reference plane M1. The first reference plane M1 is parallel to the datum plane M0, and a distance between the first reference plane M1 and the datum plane M0 is the width (i.e., 3 mm to 5 mm) of the first gap 101.

In some embodiments, the first reference plane M1 is a plane where the inner wall of the cabinet 100 proximate to the datum plane M0 is located.

A plane where the access opening is located is defined as a second reference plane M2, and the second reference plane M2 is perpendicular to the first reference plane M1. The first reference plane M1 and the second reference plane M2 remain stationary relative to the box body 10. That is, during the opening process of the door body 20 relative to the box body 10, the first reference plane M1 and the second reference plane M2 will not move with the movement of the door body 20.

A plane where atop wall of the box body 10 is located is defined as a horizontal reference plane. The horizontal reference plane is perpendicular to the first reference plane M1 and the second reference plane M2, and the first lateral edge W and the second lateral edge N are perpendicular to the horizontal reference plane. An orthogonal projection of the first lateral edge W on the horizontal reference plane is a first projection point W', and an orthogonal projection of the second lateral edge N on the horizontal reference plane is a second projection point N'.

It will be noted that the second reference plane M2 is the plane where the access opening defined by the box body 10 is located, and the second reference plane M2 does not move forward due to a deformable door seal or other components disposed at the access opening of the box body.

Referring to FIG. 20, during the process of the door body 20 being opened from the closed state to the fifth angle $G_5$, the first projection point W' moves along a first lateral edge trajectory $W_0W_5$ towards a direction proximate to the first reference plane M1 and proximate to the second reference plane M2. That is, during the process of the door body 20 being opened from the closed state to the fifth angle $G_5$, the distance between the first lateral edge W and the first reference plane M1 tends to decrease, and the distance of the first lateral edge W beyond the datum plane M0 tends to increase. In a case where the door body 20 is opened to the fifth angle $G_5$, the distance of the first lateral edge W beyond the datum plane M0 is the largest, and the distance between the first lateral edge W and the first reference plane M1 is the smallest.

In this way, the first lateral edge W may be prevented from colliding with the cabinet 100 during the opening process of the door body 20.

During the process of the door body 20 being opened from the closed state to the fifth angle $G_5$, the second projection point N' first moves along a second lateral edge trajectory $N_0N_3$ towards a direction away from the first reference plane M1 and proximate to the second reference plane M2, and then moves along a second lateral edge trajectory $N_3N_5$ towards a direction away from the first reference plane M1 and away from the second reference plane M2.

That is, during the process of the door body 20 being opened from the closed state to the third angle $G_3$, a distance between the second lateral edge N and the second reference plane M2 tends to decrease. During the process of the door body 20 being opened from the third angle $G_3$ to the fifth angle $G_5$, a distance between the second lateral edge N and the second reference plane M2 tends to increase. In a case where the door body 20 is opened to the third angle $G_3$, the distance between the second lateral edge N and the second reference plane M2 is the smallest. With this arrangement, the interference between the second lateral edge N and the box body 10 during the opening process of the door body 20 may be effectively avoided.

In some embodiments, both the first lateral edge trajectory $W_0W_5$ and the second lateral edge trajectory $N_0N_5$ are smooth curves.

In some embodiments, a distance between the first lateral edge trajectory $W_0W_5$ and the first reference plane M1 is greater than a seventh distance D7. That is, a distance between the first lateral edge trajectory point $W_5$ closest to the first reference plane M1 in the first lateral edge trajectory $W_0W_5$ and the first reference plane M1 is greater than the seventh distance D7. A distance between the second lateral edge trajectory $N_0N_5$ and the second reference plane M2 is greater than an eighth distance D8.

In some embodiments, the thickness of the door body is Da, the seventh distance D7 is greater than or equal to a product of 0.5 and Da (i.e., 0.5×Da) and less than or equal to a product of 0.75 and Da (i.e., 0.75×Da). The eighth distance D8 is greater than or equal to a product of 0.12 and Da (i.e., 0.12×Da) and less than or equal to a product of 0.2 and Da (i.e., 0.2×Da).

For example, in a case where the thickness Da of the door body 20 is any value of a range from 2 cm to 4 cm, the seventh distance D7 may be a product of 0.676 and Da (i.e., 0.676×Da), and the eighth distance D8 may be a product of 0.165 and Da (i.e., 0.165×Da).

With this arrangement, the second lateral edge N may maintain an appropriate distance from the box body 10 during the process of the door body 20 being opened from the closed state to the fifth angle $G_5$. For example, the second lateral edge N will not press the box body 10, nor will it be too far away from the box body 10, resulting in a decrease in the integrity of the door body 20 and the box body 10.

In addition, during the process of the door body 20 being opened from the closed state to the fifth angle $G_5$, the distance between the first lateral edge W and the datum plane M0 is relatively small, so that the first lateral edge W will not collide with the inner wall of the cabinet 100, which is conducive to improving the stability of the door body 20.

In some embodiments, as shown in FIG. 20, during the process of the door body 20 being opened from the closed state to the fifth angle $G_5$, an included angle between a moving direction of the first lateral edge W and the first reference plane M1 is referred to as a first direction included angle, and the first direction included angle is less than 15°. An included angle between a moving direction of the second lateral edge N and the second reference plane M2 is referred to as a second direction included angle, and the second direction included angle is less than 25°. In this way, during the opening process of the door body 20, the first lateral edge W will not collide with the cabinet 100, and the second lateral edge N will not press the box body 10.

It will be noted that the moving direction of the first lateral edge W is a tangent direction of the first lateral edge trajectory $W_0W_5$, where the first projection point W' is located on the first lateral edge trajectory $W_0W_5$. The moving direction of the second lateral edge N is a tangent direction of the second lateral edge trajectory $N_0N_5$, where the second projection point N' is located on the second lateral edge trajectory $N_0N_5$.

During the process of the door body 20 being opened from the closed state to the fifth angle $G_5$, the first direction included angle between the moving direction of the first lateral edge W and the first reference plane M1 tends to decrease. The second direction included angle between the moving direction of the second lateral edge N and the second reference plane M2 tends to decrease. In addition, the second direction included angle first decreases to 0°, and then continues to decrease to a negative angle. Therefore, during the opening process of the door body 20, the second lateral edge N first approaches the second reference plane M2 and then moves away from the second reference plane M2. With this arrangement, it is conducive to improving the fluency of opening the door body 20 and avoiding jamming.

In some embodiments, during the process of the door body 20 being opened from the closed state to the fifth angle $G_5$, an orthogonal projection of the first lateral edge trajectory $W_0W_5$ on the first reference plane M1 is a line segment $W_{0'}W_{5'}$, and an orthogonal projection of the second lateral edge trajectory $N_0N_5$ on the second reference plane M2 is a line segment $N_{0'}N_{5'}$. A ratio of a length of the line segment $W_{0'}W_{5'}$ to a length of the line segment $N_{0'}N_{5'}$ is in a range from 0.3 to 0.7. For example, the ratio of the length of the line segment $W_{0'}W_{5'}$ to the length of the line segment $N_{0'}N_{5'}$ is 0.3, 0.4, 0.5, or 0.7.

Referring to FIG. 20, during the process of the door body 20 being opened from the fifth angle $G_5$ to the maximum angle $G_9$, the first projection point W' moves along the first lateral edge trajectory $W_5W_9$ towards the direction away from the first reference plane M1 and proximate to the second reference plane M2, and the distance between the first lateral edge W and the first reference plane M1 tends to increase. The second projection point N' moves along the second lateral edge trajectory $N_8N_9$ towards the direction away from the second reference plane M2 and away from the first reference plane M1, and the distance between the second lateral edge N and the second reference plane M2 tends to increase.

In some embodiments, the first lateral edge trajectory $W_5W_9$ and the second lateral edge trajectory $N_5N_9$ are both smooth curves. The first lateral edge trajectory $W_0W_5$ is connected to the third lateral edge trajectory $W_5W_9$ in a smooth transition, and the second lateral edge trajectory $N_0N_5$ is connected to the second lateral edge trajectory $N_5N_9$ in a smooth transition.

In some embodiments, during the process of the door body 20 being opened from the fifth angle $G_5$ to the maximum angle $G_9$, an included angle between a moving direction of the first lateral edge W and the first reference plane M1 is referred to as a third direction included angle, and the third direction included angle is less than 40°. The included angle between a moving direction of the second lateral edge N and the second reference plane M2 is referred to as a fourth direction included angle, and the fourth direction included angle is less than 90°.

It will be noted that the moving direction of the first lateral edge W is a tangent direction of the first lateral edge trajectory $W_5W_9$, where the first projection point W' is located on the first lateral edge trajectory $W_5W_9$. The moving direction of the second lateral edge N is a tangent direction of the second lateral edge trajectory $N_5N_9$, where the second projection point N' is located on the second side-edge trajectory $N_5N_9$. In this way, the door body 20 will not exceed the datum plane M0 too much during the opening process.

During the process of the door body 20 being opened from the fifth angle $G_5$ to the maximum angle $G_9$, the third direction included angle tends to increase, and the fourth direction included angle also tends to increase. In addition, in a case where the door body 20 is opened for a unit angle, the increments of the third direction included angle and the fourth direction included angle remain substantially unchanged.

For example, during the process of the door body 20 being opened from the fifth angle $G_5$ to the maximum angle $G_9$, when the door body 20 is opened for a unit angle, the increment of the third direction included angle is maintained at any value in a range from 0.7° to 1.5° (e.g., 0.7, 0.9°, 1.2°, or 1.5°), and the increment of the fourth direction included angle is maintained at any value in a range from 0.4° to 1° (e.g., 0.4°, 0.6°, 0.8°, or 1°).

With this arrangement, the changing trends of the first lateral edge trajectory $W_5W_9$ and the second lateral edge trajectory $N_5N_9$ is stable and gentle, which is beneficial to improve the smoothness of the door body 20 rotation.

In some embodiments, during the process of the door body 20 being opened from the fifth angle $G_5$ to the maximum angle $G_9$, when the door body 20 is opened for a unit angle, the increment of the third direction included angle may be any value in a range from 0.7° to 1.5° (e.g., 0.7, 0.9°, 1.2°, or 1.5°), and the increment of the fourth direction included angle may be any value in a range from 0.4° to 1° (e.g., 0.4°, 0.6°, 0.8°, or 1°).

Figure 21:
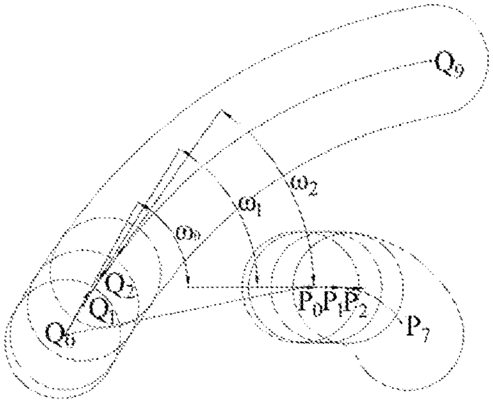
FIG. 21 is a structural diagram of a first shaft, a second shaft, a first trajectory groove and a second trajectory groove when a door body of a refrigerator is opened from a closed state to a second angle $G_2$, in accordance with some embodiments.

As shown in FIG. 21, a direction in which the positioning center point P moves along the first trajectory line S is referred to as a first displacement direction, and a direction in which the guiding center point Q moves along the second trajectory line K is referred to as a second displacement direction. An included angle formed by the first displacement direction and the second displacement direction is referred to as a displacement included angle ω.

During the process of the door body 20 being opened from the closed state to the second angle $G_2$, the door body 20 will rotate to a first intermediate angle Gi and a second intermediate angle Gii. The first intermediate angle Gi and the second intermediate angle Gii are both any value in a range from 0° to the second angle $G_2$, and the first intermediate angle Gi is not equal to the second intermediate angle Gii (i.e., Gi≠Gii).

In some embodiments, the displacement included angle ω formed by the first displacement direction and the second displacement direction is substantially unchanged. It will be noted that the "substantially unchanged" means that the displacement included angle ω changes within a small range to keep relatively constant.

For example, in a case where the door body 20 is opened to the first intermediate angle Gi, the displacement included angle formed by the first displacement direction and the second displacement direction is a first displacement included angle ωGi. In a case where the door body 20 is opened to the second intermediate angle Gii, the displacement included angle formed by the first displacement direction and the second displacement direction is a second displacement included angle ωGii. Then, a difference between the first displacement included angle ωGi and the second displacement included angle ωGii is less than or equal to a preset angle. For example, the preset angle is 8°.

In some embodiments, as shown in FIG. 21, in a case where the door body 20 is closed, the displacement included angle is $\omega_0$. In a case where the door body 20 is opened to the first angle $G_1$, the displacement included angle is $\omega_1$. In a case where the door body 20 is opened to the second angle $G_2$, the displacement included angle is $\omega_2$. A difference Δω between the displacement included angle co and the displacement included angle $\omega_2$ is in a range from 0° to 4°.

For example, Δω may be 0°, 2°, or 4°. The displacement included angle Co and the displacement included angle $\omega_2$ are both any value in a range from 56° to 60°.

In some embodiments, during the process of the door body 20 being opened from the closed state to the second angle $G_2$, the first shaft 421 moves in a straight line along the straight groove segment of the first trajectory groove 433 and, therefore, the included angle between the first displacement direction and the first reference plane M1 remains unchanged. During the process of the door body 20 being opened from the second angle $G_2$ to the seventh angle $G_7$, the first shaft 421 moves along the curved groove segment of the first trajectory groove 433. Therefore, the included angle between the first displacement direction and the first reference plane M1 tends to decrease.

In some embodiments, the curved groove segment of the first trajectory groove 433 is a quasi circular arc groove. That is, the curved trajectory segment of the first trajectory line S is a quasi circle arc. During the process of the door body 20 being opened from the second angle $G_2$ to the seventh angle $G_7$, the first shaft 421 moves in a circular arc with equal radius relative to the first trajectory groove 433. The included angle between the first displacement direction and the first reference plane M1 is in a range from 32° to 35° (e.g., 32°, 33°, 34°, or 35°).

It will be noted that the arc of the quasi circle groove is a groove having a center trajectory line of an arc of the quasi circle. The arc of the quasi circle includes a standard arc (i.e., a portion of a standard circle) and a non-standard circular arc that is different from a standard circular arc but still has circular arc trajectory characteristics due to manufacturing, assembly errors, or slight deformation.

During the process of the door body 20 being opened from the closed state to the maximum angle $G_9$, the included angle between the second displacement direction and the second reference plane M2 tends to decrease, and the included angle is in a range from 12° to 15° (e.g., 12°, 13°, or 15°).

With this arrangement, the change of the displacement included angle ω is small during the process of the door body 20 being opened from the closed state to the maximum angle $G_9$. Therefore, in a case where the user opens the door body 20 with a constant force (about 5N), the force exerted on the first double-shaft assembly 420 does not change much, which is conducive to improving the smoothness of the movement in a case where the door is opened, reducing the wear of the first double-shaft assembly on the trajectory grooves during the opening process of the door, and improving the service life of the hinge assembly 30.

Figure 22:
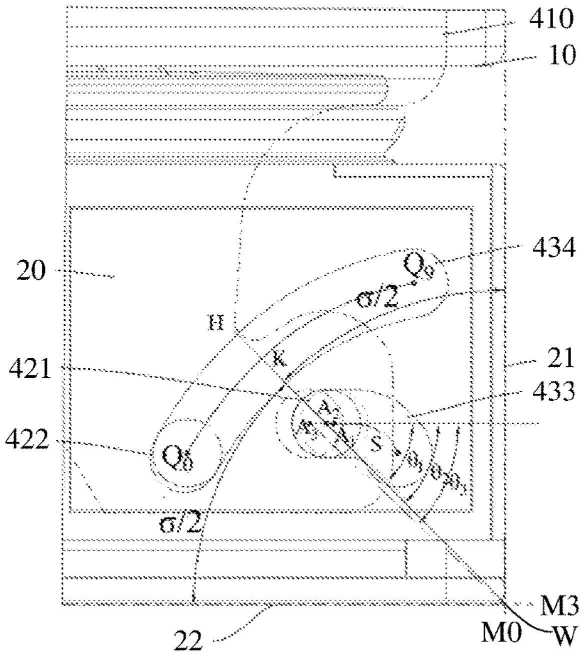
FIG. 22 is yet another structural diagram of a door body of a refrigerator in a closed state, in accordance with some embodiments.

In some embodiments, as shown in FIG. 22, a plane where the door front wall 22 is located when the door body 20 is closed is referred to as a third reference plane M3. The third reference plane M3 intersects the datum plane M0 at a theoretical first lateral edge W when the door body 20 is closed.

An angle bisecting plane of an included angle formed by the door front wall 22 and the door side wall 21 is referred to as an angle bisecting plane H (i.e., a fourth reference plane). A portion of the third reference plane M3 located at the inner side of the datum plane M0 and a portion of the datum plane M0 located at a side of the third reference plane M3 proximate to the box body 10 form a dihedral angle, which is referred to as a first included angle σ, and σ is approximately 90°. In a case where the door body 20 is in the closed state, the angle bisecting plane H bisects the first included angle σ.

It will be noted that only when the door body 20 is in the closed state, the angle bisecting plane H bisects the first included angle σ. During the opening process of the door body 20 relative to the box body 10, the angle bisecting plane H moves with the door body 20 relative to the box body 10, and the first included angle σ remains stationary.

In a case where the door body 20 is in the closed state, the first lateral edge W is located on the datum plane M0. That is, the first lateral edge W is an intersection line of the third reference plane M3 and the datum plane M0.

In a case where the door body 20 is closed, the positioning central point P is located at the initial positioning point $P_0$ of the first trajectory line S. A shortest line segment between the initial positioning point $P_0$ and the first lateral edge W is referred to as $WP_0$, and an included angle between the line segment $WP_0$ and the straight trajectory segment of the first trajectory line S is referred to as θ, and θ is greater than 0° and less than 90° (i.e., $0° < \theta < 90°$). A distance between the first lateral edge W and the straight line where the straight trajectory segment of the first trajectory line S is located is R, and R is a constant value.

It can be understood that, by setting the distance between the initial positioning point $P_0$ and the door side wall 21, a size of the included angle θ may be changed. For example, in a case where the initial positioning point $P_0$ is set to be proximate to the door side wall 21, the included angle θ will become greater and will approach 90°. In a case where the initial positioning point $P_0$ is set to be away from the door side wall 21, the included angle θ will decrease and will approach 0°.

In a case where the door body 20 rotates to open with only the first shaft 421 (the positioning center point P is located at the initial positioning point $P_0$) as the rotation axis, it can be understood that a distance D between the first lateral edge W and the datum plane M0 is the largest when the door body 20 rotates to a position where line segment $WP_0$ is parallel to the second reference plane M2, and a maximum value of the distance D is $D_{max} = R/\sin\theta - R\cot\theta = R(1/\sin\theta - \cot\theta)$. In a case where the door body 20 rotates from the closed state until the line segment $WP_0$ is parallel to the second reference plane M2, the door body 20 rotates around the first shaft 421 by an angle of θ.

Therefore, by taking a derivative (with respect to θ) on Dmax, it is obtained that:

$$\begin{aligned} D'\max &= R[(1/\sin\theta)' - \cot'\theta] \\ &= R[-\cos\theta/\sin 2\theta + 1/\sin 2\theta] \\ &= (R/\sin 2\theta) \times (1 - \cos\theta). \end{aligned}$$

Because $\theta \in (0°, 90°)$, it follows that $(R/\sin 2\theta)\times(1-\cos\theta)>0$. That is, $D_{max}=R/\sin\theta - R\cot\theta = R(1/\sin\theta - \cot\theta)$ is an increasing function with respect to $\theta$.

As shown in FIG. 22, any point on the first trajectory line S located at a side of the angle bisecting plane H proximate to the door side wall 21 is referred to as a first setting position $A_1$, an intersection point of the straight trajectory segment and the angle bisecting plane H is referred to as a second setting position $A_2$, and any point on the straight trajectory segment located at a side of the angle bisecting plane H away from the door side wall 21 is referred to as a third setting position $A_3$. A shortest line segment from the first setting position $A_1$ to the first lateral edge W is referred to as a line segment $WA_1$, and an included angle between the line segment $WA_1$ and the straight trajectory segment is referred to as $\theta_1$. A shortest line segment from the second setting position $A_2$ to the first lateral edge W is referred to as line segment $WA_2$, and an included angle between the line segment $WA_2$ and the straight trajectory segment of the first trajectory line is referred to as $\theta_2$. A shortest line segment from the third setting position $A_3$ to the first lateral edge W is referred to as line segment $WA_3$, and an included angle between $WA_3$ and the straight trajectory segment of the first trajectory line is referred to as $\theta_3$. For example, $\theta_1$ is greater than $\theta_2$, and $\theta_2$ is greater than $\theta_3$.

Since $D_{max}=R/\sin\theta - R\cot\theta$ is an increasing function with respect to $\theta$, it can be known that $D_{max}(\theta_1)>D_{max}(\theta_2)>D_{max}(\theta_3)$.

Therefore, in a case where the door body 20 is closed, if the initial positioning point $P_0$ is set to be located at the first setting position $A_1$, a distance by which the first edge W exceeds the datum plane M0 is relatively large during the process of the door body 20 rotating to open with only the first shaft 421 as the rotation shaft.

In a case where the door body 20 is closed, if the initial positioning point $P_0$ is set to be at the third setting position $A_3$, a distance by which the first edge W exceeds the datum plane M0 is relatively small during the process of the door body 20 rotating to open with only the first shaft 421 as the rotation shaft.

It can be understood that, in a case where the refrigerator 1 adopts the double-shaft hinge, in order to avoid collision between the door body 20 and the cabinet 100 during the opening process of the door body 20, the door body 20 needs to move a certain distance towards the inner side while rotating. Therefore, in a case where the position between the initial positioning point $P_0$ and the door side wall 21 is set to be large, the maximum distance Dmax that the first lateral edge W exceeds the datum plane M0 during the rotation of the door body 20 is small, so that the door body 20 needs to move a small distance towards the inner side while rotating.

However, in a case where the position between the initial positioning point $P_0$ and the door side wall 21 is set to be too large, the fluency and stability of the door body 20 will decrease when the door body 20 is opened. Therefore, in some embodiments, the initial positioning point $P_0$ is set on the angle bisecting plane H. That is, the angle bisecting plane H substantially bisects the first shaft 421.

It can be known from the above that by changing the position of the initial positioning point $P_0$ relative to the angle bisecting plane H, the distance between the door body 20 and the first reference plane M1 may be changed in a case where the door body 20 is rotated to be opened to 90°.

For example, if the distance between the initial positioning point $P_0$ and the door side wall 21 increases, the distance between the door body 20 and the first reference plane M1 will also increase in a case where the door body 20 is rotated to be opened to 90°, thereby increasing the maximum angle at which the door body 20 is capable of being opened.

In some embodiments, referring to FIG. 14I, in a case where the door body 20 is opened to 90°, a distance between the door front wall 22 and the datum plane M0 is referred to as a ninth distance D9. In a case where the door front wall 22 is located at the inner side of the datum plane M0, the ninth distance D9 is referred to as a positive number, and in a case where the door front wall 22 is located at the outer side of the datum plane M0, the ninth distance D9 is referred to as a negative number.

Figure 23:
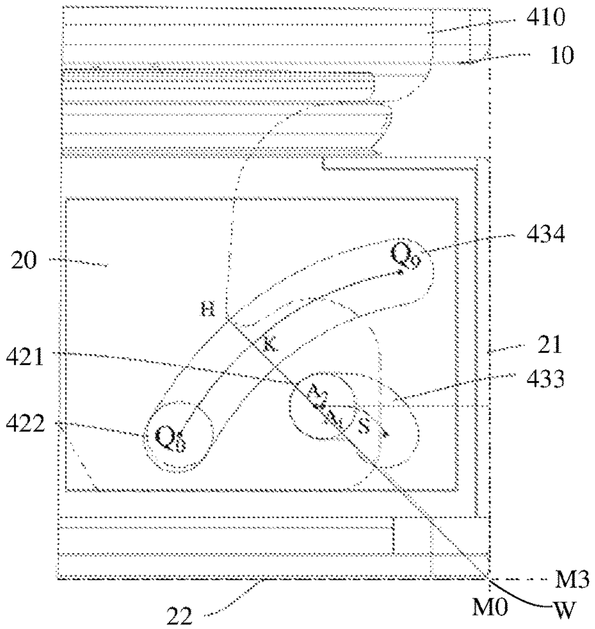
FIG. 23 is a structural diagram of another first hinge assembly when a door body of a refrigerator is in a closed state, in accordance with some embodiments.

In some embodiments, as shown in FIG. 23, in a case where the door body 20 is closed, the initial positioning point $P_0$ is located at the first setting position $A_1$, and in a case where the door body 20 is opened to 90°, the ninth distance D9 is 0. That is, the door front wall 22 is substantially located in the datum plane M0. A distance $A_1A_2$ between the first setting position $A_1$ and the second setting position $A_2$ is greater than 0 and less than or equal to 2 mm.

With this arrangement, the initial positioning point $P_0$ is set to be proximate to the angle bisecting plane H, so that the stability of the first shaft 421 when the first shaft 421 moves relative to the door body 20 is ensured. In addition, in a case where the door body 20 is opened to 90°, the door front wall 22 does not exceed the datum plane M0, so that the door body 20 is capable of being opened to a greater angle in a case where the refrigerator 1 is embedded in the cabinet 100 for use.

Figure 24:
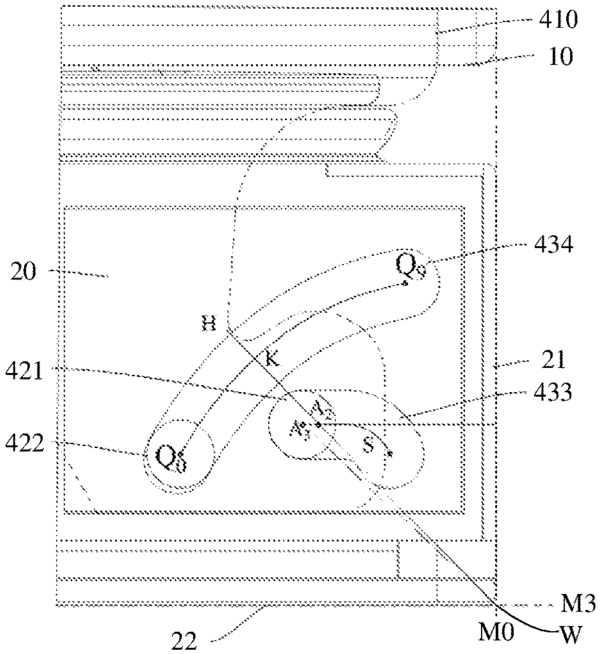
FIG. 24 is a structural diagram of yet another first hinge assembly when a door body of a refrigerator is in a closed state, in accordance with some embodiments.

In some embodiments, as shown in FIG. 24, the initial positioning point $P_0$ is located at the third setting position $A_3$ at the side of the angle bisecting plane H away from the door side wall 21. In this case, in a case where the door body 20 is opened to 90°, the ninth distance D9 is greater than 0 (i.e., D9>0). That is, the door front wall 22 is located at the inner side of the datum plane M0. For example, the ninth distance D9 is any value in a range from 0.5 mm to 2 mm. A distance $A_2A_3$ between the second setting position $A_2$ and the third setting position $A_3$ is greater than 0 and less than or equal to 2 mm.

With this arrangement, the initial positioning point $P_0$ is set to be proximate to the angle bisecting plane H, so that the stability of the first shaft 421 when the first shaft 421 moves relative to the door body 20 is ensured. In addition, in a case where the door body 20 is opened to 90°, the door body 20 is located at the inner side of the datum plane M0, so that the door body 20 is capable of being opened to a greater angle in a case where the refrigerator 1 is embedded in the cabinet 100 for use.

In some embodiments, during the opening process of the door body 20, in a case where the positioning center point P of the first shaft 421 moves to the end of the straight trajectory segment proximate to the door side wall 21 (i.e., the second positioning point $P_2$), the opening angle of the door body 20 is between 43° and 47°. That is, the second angle $G_2$ is any value in a range from 43° to 47° (i.e., $G_2 \in [43°, 47°]$).

Figure 25:
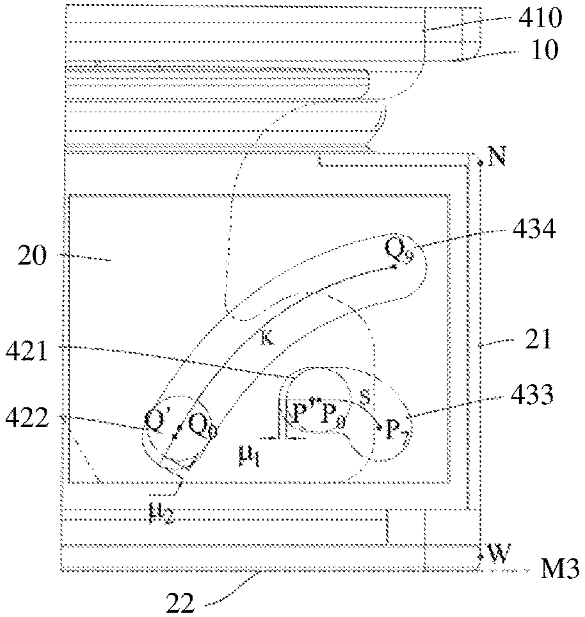
FIG. 25 is a structural diagram of yet another first hinge assembly when a door body of a refrigerator is in a closed state, in accordance with some embodiments.

In some embodiments, as shown in FIG. 25, in a case where the door body 20 is in the closed state, there is a third gap $\mu_1$ between the first shaft 421 and an end wall of the first trajectory groove 433 away from the door side wall 21. There is a fourth gap $\mu_2$ between the second shaft 422 and an end wall of the second trajectory groove 434 away from the door side wall 21 and proximate to the door front wall 22.

It can be understood that, by providing the third gap $\mu_1$ between the first shaft 421 and the end wall of the first trajectory groove 433 away from the door side wall 21, and the fourth gap $\mu_2$ between the second shaft 422 and end wall of the second trajectory groove 434 away from the door side wall 21 and proximate to the door front wall 22, the door body 20 is prevented from springing away from the box body 10 when the door body 20 is closed by a user with a relatively large force.

It will be noted that a side of the door body 20 proximate to the box body 10 has a door seal, and the door seal is a magnetic elastic body. Generally, in a case where the door body 20 is closed, the door front wall 22 is located in the third reference plane M3.

Figure 26:
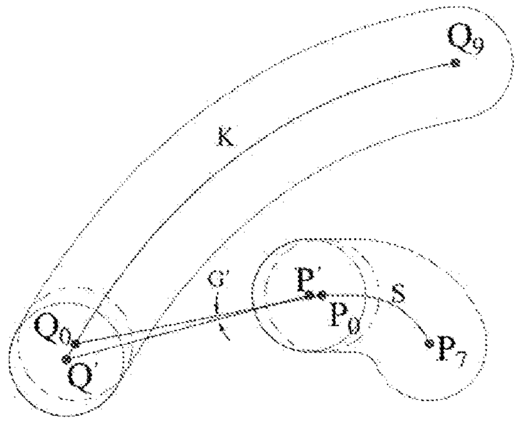
FIG. 26 is a schematic diagram showing relative positions of a first shaft, a second shaft, a first trajectory groove and a second trajectory groove when a door body of a refrigerator continues to move from a closed state to a negative angle, in accordance with some embodiments.
Figure 27:
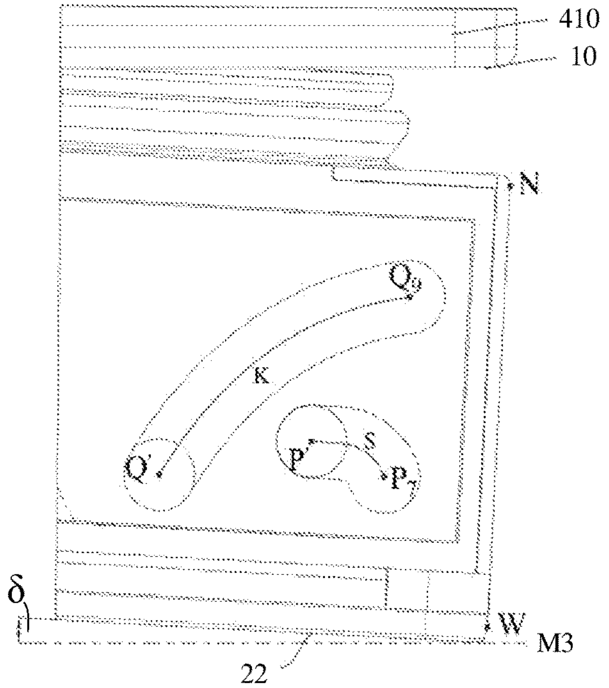
FIG. 27 is a structural diagram of a door body of a refrigerator that continues to move from a closed state to a negative angle, in accordance with some embodiments.

In some cases, as shown in FIGS. 26 and 27, in a case where the door body 20 is pushed to close by a relatively large force, the door body 20 will continue to move from the closed state to a first preset angle along the closing direction and squeeze the door seal, so that the door front wall 22 is located at a side of the third reference plane M3 proximate to the box body 10 and a second preset angle δ is formed between the door front wall 22 and the third reference plane M3.

For example, the second preset angle δ is greater than 0° and less than or equal to 3° (e.g., the second preset angle δ is 3°, 2° or 1°). That is, in a case where the first shaft 421 is in contact with the end wall of the first trajectory groove 433 away from the door side wall 21, the second preset angle δ between the door front wall 22 and the third reference plane M3 is any value in a range from 0° to 3°.

It will be noted that in a case where the first shaft 421 is in contact with the end wall of the first trajectory groove 433 away from the door side wall 21, the second shaft 422 and the end wall of the second trajectory groove 434 away from the door side wall 21 may be set to be in contact or to have a gap.

In some embodiments, as shown in FIG. 27, the first trajectory line S further has a reserved positioning point P', and the reserved positioning point P is located at a side of the initial positioning point $P_0$ away from the door side wall 21. During the process of the door body 20 moving from the closed state to the first preset angle along the closing direction, the positioning center point P moves from the initial positioning point $P_0$ to the reserved positioning point P'.

A trajectory segment between the reserved positioning point P' and the initial positioning point $P_0$ is referred to as a reserved trajectory segment $P'P_0$, and the first reserved trajectory segment $P'P_0$ is located on a straight line where the straight trajectory segment is located.

In some embodiments, as shown in FIG. 27, the second trajectory line K has a reserved guiding point Q'. During the process of the door body 20 moving from the closed state to the first preset angle along the closing direction, the guiding center point Q moves from the initial guiding point $Q_0$ to the reserved guiding point Q'.

A trajectory segment between the reserved guiding point Q' and the initial guiding point $Q_0$ is referred to as a reserved trajectory segment $Q'Q_0$, and the trend of the second reserved trajectory segment $Q'Q_0$ is consistent with the trend of the second trajectory line K.

In a case where the door body 20 is pushed and closed by a relatively large force, the first shaft 421 first moves to the initial positioning point $P_0$, and the second shaft 422 first moves to the initial guiding point $Q_0$. Then, the positioning center point P continues to move along the first trajectory line S from the initial positioning point $P_0$ to the reserved positioning point P', and the guiding center point Q continues to move from the initial guiding point $Q_0$ to the reserved guiding point Q'. In this case, the door body 20 continues to rotate towards a direction proximate to the box body 10 by a first preset angle G', and G' is greater than 0° and less than or equal to δ (i.e., 0°<G'≤δ), so that the door body 20 is prevented from springing away from the box body 10 in a case where the door body 20 is closed by the user with a relatively large force.

In some embodiments, as shown in FIG. 14H, in a case where the door body 20 is opened to the seventh angle $G_7$, the positioning center point P moves to the end point of the first trajectory line S proximate to the door side wall 21 and proximate to the door front wall 22. There is a fifth gap 3 between the first shaft 421 and the end wall of the first trajectory groove 433 proximate to the door side wall 21 and proximate to the door front wall 22. In this case, the second shaft 422 moves to the middle of the second trajectory groove 434. With this arrangement, the movement interference between the first shaft 421 and the first trajectory groove 433 due to manufacturing, assembly errors, or slight deformation may be prevented.

A person skilled in the art will understand that the scope of disclosure in the present disclosure is not limited to specific embodiments discussed above and may modify and substitute some elements of the embodiments without departing from the spirits of this application. The scope of this application is limited by the appended claims.

What is claimed is:

1. A refrigerator, comprising: a box body, a cooling device, a door body, a hinge assembly, a mounting block, and a limiting portion;

the box body including an inner container, an outer shell, and a heat insulation layer; a storage compartment being defined therein; the storage compartment including a freezing compartment and a refrigerating compartment disposed in a height direction;

the cooling device being configured to provide cold air to the storage compartment;

the door body being configured to open and close the storage compartment and including a door side wall and a door front wall; wherein the door side wall is a side wall of the door body proximate to the hinge assembly, and the door front wall is a side wall of the door body away from the box body when the door body is closed;

the hinge assembly being configured to connect the door body and the box body and including a first hinge assembly and a second hinge assembly respectively disposed at an upper portion and a lower portion of the box body; wherein the first hinge assembly and the second hinge assembly are connected to the door body and the box body respectively;

the first hinge assembly including a first hinge plate, a first double-shaft assembly, a first trajectory groove, and a second trajectory groove;

the first hinge plate including a first connecting portion and a first extending portion connected to the first connecting portion; the first connecting portion being connected to an upper end of the box body;

the first double-shaft assembly including a first shaft and a second shaft; the first shaft and the second shaft being both formed on the first extending portion; wherein the first shaft is a main shaft, and the second shaft is a secondary shaft;

the first trajectory groove and the second trajectory groove being formed on a first end cover disposed on the upper end of the door body and being disposed on a surface of the first end cover proximate to the first hinge plate;

wherein during a rotation of the door body, the first shaft moves in the first trajectory groove, and the second shaft moves in the second trajectory groove;

a positioning center point of the first shaft moving along a first trajectory line in the first trajectory groove, and a guiding center point of the second shaft moving along a second trajectory line in the second trajectory groove;

the first shaft and the second shaft both being cylindrical; an orthogonal projection of a central axis of the first shaft in the first trajectory groove being referred to as the positioning center point, and an orthogonal projection of a central axis of the second shaft in the second trajectory groove being referred to as the guiding center point;

in a case where the door body is in a closed state, the positioning center point of the first shaft being located at an initial positioning point of the first trajectory line, and the initial positioning point being located at a side of a bisecting plane away from the door side wall; wherein a bisecting plane of an included angle formed by the door front wall and the door side wall is referred to as the bisecting plane;

wherein in a case where an opening angle of the door body is 0°, the door body is in the closed state, the positioning center point is located at the initial positioning point of the first trajectory line, and the guiding center point is located at the initial guiding point of the second trajectory line;

during an opening process of the door body, the positioning center point moving from the initial positioning point to a seventh positioning point in the first trajectory line; wherein the seventh positioning point is an end point of the first trajectory line; the guiding center point moving from the initial guiding point to a ninth guiding point in the second trajectory line;

the second hinge assembly including a second hinge plate, a second double-shaft assembly, a third trajectory groove, and a fourth trajectory groove;

the second hinge plate including a second connecting portion, a second extending portion connected to the second connecting portion, and a blocking portion formed at a side of the second extending portion; wherein the second connecting portion is fixedly connected to the box body through a fastener; wherein the blocking portion extends from the side of the second extending portion in a direction away from the second extending portion, and a second gap is defined between the blocking portion and the second connecting portion;

the second double-shaft assembly including a third shaft and a fourth shaft; the third shaft and the fourth shaft both being formed on the second extending portion;

the mounting block being disposed in an accommodating groove at a lower end of the door body, and the mounting block including a plate body, a protruding portion, and a locking hook formed on the plate body; wherein the plate body extends downward to form the protruding portion, and the third trajectory groove and the fourth trajectory groove are defined in the protruding portion; and the plate body and the protruding portion are integrally formed;

a free end of the locking hook extending in a direction away from the plate body and being bent in a direction proximate to the plate body, so as to form an opening toward the plate body;

wherein in a case where the door body is in the closed state, the blocking portion is located in the opening, and the free end of the locking hook is located in the second gap;

during a process from closing to opening of the door body, the locking hook is deformed under force to be disengaged from the blocking portion and unlocked;

the limiting portion including an embedding portion and a limiting bar, and the limiting portion being a sheet metal member; wherein the embedding portion is plate-shaped; the embedding portion is clamped to an inner wall of the accommodating groove through the mounting block and is fixedly installed in the accommodating groove;

the limiting bar and the embedding portion are connected and integrally formed; the limiting bar extends along a width direction of the door body;

the second hinge plate further including a limiting groove, and the limiting groove being located at a side of the second extending portion proximate to the door side wall and proximate to the door front wall;

wherein in a case where the door body is rotated to a maximum angle, the limiting bar abuts against the limiting groove, so as to prevent the door body from continuing to rotate; and in a case where the door body is opened to a seventh angle, the positioning center point moving to an end point of the first trajectory line proximate to the door side wall and proximate to the door front wall, wherein there is a fifth gap between the first shaft and an end wall of the first trajectory groove proximate to the door side wall and proximate to the door front wall, and the second shaft moving to a middle of the second trajectory groove.

2. The refrigerator according to claim 1, wherein the seventh angle is greater than or equal to 63° and less than or equal to 67°.

3. The refrigerator according to claim 2, wherein in a case where the door body is closed, the door front wall is located in a third reference plane;

in a case where the door body is in the closed state, there is a third gap between the first shaft and an end wall of the first trajectory groove away from the door side wall, and there is a fourth gap between the second shaft and an end wall of the second trajectory groove away from the door side wall and proximate to the door front wall; and in a case where the door body is pushed to close by a large force, the door body continues to move in a closing direction from the closed state to a first preset angle and squeezes a door seal, so that the door front wall is located at a side of the third reference plane proximate to the box body; and there is a second preset angle between the door front wall and the third reference plane.

4. The refrigerator according to claim 3, wherein a plane where a surface of the box body proximate to the hinge assembly is located is referred to as a datum plane;

in a case where the door body is in the closed position, the door front wall is perpendicular to the datum plane, and a distance between the positioning center point and the datum plane is a first preset distance;

in a case where the door body is opened to 90°, the door front wall is parallel to the datum plane, and a distance between the positioning center point and the door front wall is a second preset distance; and wherein a difference between the first preset distance and the second preset distance is greater than or equal to 0 mm and less than or equal to 1 mm.

5. The refrigerator according to claim 4, wherein a side edge formed by an intersection of the door front wall and the door side wall is referred to as a first side edge, and a side of the datum plane proximate to the box body is referred to as an inner side; and during a process of the door body being opened from the closed state, the first shaft moves along the first trajectory groove in a direction proximate to the door side wall, and the second shaft moves along the second trajectory groove in a direction proximate to the door side wall and away from the door front wall, so that the door body moves towards the inner side of the datum plane while rotating, and a distance that the first side edge of the door body exceeds the datum plane is less than 5 mm.

6. The refrigerator according to claim 5, wherein during a process of the door body being opened from the closed state to the maximum angle, the positioning center point of the first shaft moves unidirectionally towards the direction proximate to the door side wall relative to the first trajectory groove of the door body, so that the door body moves laterally towards the inner side; wherein during a process of the door body being opened from the closed state to the seventh angle, the door body maintains a tendency to move towards the inner side; wherein a distance that the door body moves towards the inner side is referred to as a first distance; and during a process of the door body being opened from the seventh angle to the maximum angle, a distance that the door body moves to an outer side is referred to as a second distance.

7. The refrigerator according to claim 6, wherein the first distance is greater than the seventh distance.

8. The refrigerator according to claim 3, wherein in a case where the first shaft is in contact with the end wall of the first trajectory groove away from the door side wall, the second preset angle between the door front wall and the third reference planes is greater than 0° and less than or equal to 3°.

9. A refrigerator, comprising:

a box body defining a storage compartment therein, and the storage compartment including a freezing compartment and a refrigerating compartment disposed in a height direction;

a door body being used to open and close the storage compartment; the door body including a left side wall, a right side wall, an upper side wall, a lower side wall, a door front wall, and a door rear wall; wherein a side wall of the left side wall and the right side wall of the door body proximate to a hinge assembly is referred to as a door side wall; the door front wall is a side wall of the door body away from the box body when the door body is closed, and the door rear wall is a side wall of the door body proximate to the box body when the door body is closed;

a side edge formed by an intersection of the door front wall and the door side wall is referred to as a first side edge, and a side edge formed by an intersection of the door side wall and the door rear wall is referred to as a second side edge;

the hinge assembly including a first hinge assembly and a second hinge assembly; the first hinge assembly being disposed on an upper portion of the box body and fixedly connected to the box body and the door body;

the second hinge assembly being disposed on a lower portion of the box body and fixedly connected to the box body and the door body;

the first hinge assembly and the second hinge assembly being disposed along a same axis, so that the door body rotates around the axis to implement opening and closing of the door body; wherein the first hinge assembly includes a first hinge plate, a first double-shaft assembly, a first trajectory groove, and a second trajectory groove;

the first hinge plate including a first connecting portion and a first extending portion connected to the first connecting portion;

the first double-shaft assembly including a first shaft and a second shaft; the first shaft and the second shaft being both formed on the first extending portion; wherein the first shaft is a main shaft and the second shaft is a secondary shaft;

the first hinge assembly further including a first mounting block, and the first mounting block including a first plate body and a first protruding portion;

the first plate body extending downwards to form the first protruding portion, and the first protruding portion defining the first trajectory groove and the second trajectory groove therein;

the second hinge assembly including a second hinge plate, a second double-shaft assembly, a third trajectory groove, and a fourth trajectory groove;

the second hinge plate including a second connecting portion, and a second extending portion connected to the second connecting portion; the second extending portion extending along the second connecting portion towards a direction away from the box body; wherein the second connecting portion is fixedly connected to the box body through a fastener;

the second double-shaft assembly including a third shaft and a fourth shaft; the third shaft and the fourth shaft being both disposed on the second extending portion and extending upwards from an upper surface of the second extending portion;

the third shaft being inserted in the third trajectory groove and matched with the third trajectory groove; the fourth shaft being inserted in the four trajectory grooves and matched with the fourth trajectory groove;

the second hinge assembly further includes a second mounting block; the second mounting block including a second plate body and a second protruding portion; the plate body extending upwards to form the second protruding portion, and the second protruding portion defining the third trajectory groove and the fourth trajectory groove therein; and, the door body including a second end cover; the second end cover being disposed at a lower end of the door body and corresponding to a position of the second hinge assembly; and, the second end cover including a second receiving groove, the second receiving groove being opened downwards, and the second mounting block being embedded in the second receiving groove;

the second hinge plate further including a first fit portion, and the second mounting block further including a second fit portion matched with the first fit portion; when closing the door body, the first fit portion and the second fit portion being matched and locked, and when opening the door body, the first fit portion and the second fit portion being disengaged from locking; wherein the second fit portion is configured as a locking hook; the locking hook is disposed at a side of the second plate body; a fixed end of the locking hook is fixedly connected to the second plate body, and a free end of the locking hook extends in a direction away from the second plate body and is bent in a direction proximate to the second plate body, so as to form an opening towards the second plate body; and, the free end of the locking hook is closer to the box body than the fixed end of the locking hook;

the first fit portion is configured as a blocking portion; the blocking portion is disposed at a side of the second extending portion, the blocking portion extends from the side of the second extending portion in a direction away from the second extending portion, and a second gap is defined between the blocking portion and the second connecting portion;

in a case where the door body is in a closed state, the blocking portion being located in the opening; the free end of the locking hook being located in the second gap and abutting against a side of the blocking portion proximate to the box body;

during a process of the door body being opened, the locking hook being deformed under force to overcome blocking of the blocking portion, so that the locking hook is disengaged from the blocking portion; and the locking hook including a third extending portion and a bending portion; the third extending portion being connected to a side of the second plate body, and the third extending portion being integrally formed with the second plate body;

an end of the bending portion being fixedly connected to an end of the third extending portion away from the second plate body, and another end of the bending portion extending in the direction away from the second plate body and being bent in the direction proximate to the second plate body;

the third extending portion being fixedly connected to the second end cover disposed at the lower end of the door body through a fastener;

wherein during a rotation of the door body, the first shaft moves in the first trajectory groove, and the second shaft moves in the second trajectory groove.;

a limiting portion including an embedding portion and a limiting bar; the limiting portion being a sheet metal member; the limiting bar and the embedding portion being integrally formed; the limiting bar extending along a width direction of the door body; the embedding portion being plate-shaped and being embedded in the second receiving groove;

the limiting portion being fixedly installed in the second accommodating groove through clamping of the second mounting block and an inner wall of the second accommodating groove;

the second hinge plate further including a limiting groove; the limiting groove being located at a position of the second extending portion proximate to the door side wall and proximate to the door front wall and running through the second extending portion along a thickness direction of the second extending portion;

in a case where the door body rotates to a maximum angle, the limiting bar abutting against the limiting groove, thereby blocking the door body from continuing to rotate;

the first shaft and the second shaft being both cylindrical; an orthogonal projection of a central axis of the first shaft in the first trajectory groove being referred to as a positioning center point, and an orthogonal projection of a central axis of the second shaft in the second trajectory groove being referred to as a guiding center point;

in a case where the door body is opened to different angles, the positioning center point moving along a first trajectory line, and the guiding center point moving along a second trajectory line;

in a case where an opening angle of the door body is 0°, the door body is in the closed state, the positioning center point is located at an initial positioning point of the first trajectory line, and the guiding center point is located at an initial guiding point of the second trajectory line;

a bisecting plane of an included angle formed by the door front wall and the door side wall being referred to as a bisecting plane; a point located at a side of the bisecting plane away from the door side wall being referred to as a third setting position; in a case where the door body is closed, the initial positioning point being located at the third setting position;

during the opening process of the door body, the first trajectory line extending from the initial positioning point to a direction proximate to the door side wall, and then extending to a seventh positioning point in a certain arc towards a direction proximate to the door side wall and proximate to the door front wall; the seventh positioning point being an end point of the first trajectory line;

the second trajectory line including the initial guiding point and a ninth guiding point that is closer to the door side wall and further away from the door front wall compared to the initial guiding point;

in a case where the door body is opened to a first angle, the positioning center point being located at a first positioning point of the first trajectory line, and the first positioning point being closer to the door side wall than the initial positioning point; the guiding center point being located at a first guiding point of the second trajectory line, and the first guiding point being closer to the door side wall and farther away from the door front wall than the initial guiding point;

in a case where the door body is opened to a second angle, the door body being rotated and opened to the second angle, and the locking hook being disengaged from the blocking portion;

during a process of the door body being opened from any angle greater than the closed state to any angle less than the second angle, movement trends of the guiding center point and the positioning center point remaining unchanged;

during a process of the door body being opened from any angle greater than the second angle to any angle less than a seventh angle, the positioning center point of the first shaft moving along a curved trajectory segment of the first trajectory line towards a direction proximate to the door side wall and proximate to the door front wall, and the guiding center point of the second shaft moving along the second trajectory line towards a direction proximate to the door side wall and away from the door front wall; and in a case where the door body is opened to the seventh angle, the positioning center point being located at the seventh positioning point on the first trajectory line, and the guiding center point being located at the seventh guiding point on the second trajectory line; wherein the first angle is less than the second angle, the second angle is less than the seventh angle, the seventh angle is less than an eighth angle, and the eighth angle is equal to 90°.

10. The refrigerator according to claim 9, wherein the second angle is any value from 13° to 17°.

11. The refrigerator according to claim 9, wherein the seventh angle is set to any value from 63° to 67°.

12. The refrigerator according to claim 9, wherein in a case where the door body is opened to the seventh angle, the positioning center point of the first shaft moves to the seventh positioning point of the first trajectory line proximate to the door side wall and proximate to the door front wall, and there is a fifth gap between the first shaft and an end wall of the first trajectory groove proximate to the door side wall and proximate to the door front wall.

13. The refrigerator according to claim 9, wherein in a case where the door body is closed, the door front wall is located in a third reference plane; and in a case where the door body is in the closed state and continues to be rotated to squeeze a door seal, the door front wall moves to a side of the third reference plane proximate to the box body, and an included angle between the door front wall and the third reference plane is referred to as a second preset angle.

14. The refrigerator according to claim 13, wherein in a case where the door body is closed, there is a fourth gap between the second shaft and an end wall of the second trajectory groove matched with the second shaft away from the door side wall.

15. The refrigerator according to claim 13, wherein in a case where the door body is closed, there is a third gap between the first shaft and an end wall of the first trajectory groove away from the door side wall; and/or there is the fourth gap between the second shaft and an end wall of the second trajectory groove away from the door side wall and proximate to the door front wall.

16. The refrigerator according to claim 13, wherein in a case where the first shaft is in contact with the end wall of the first trajectory groove away from the door side wall, a second preset angle between the door front wall and the third reference plane is greater than 0° and less than or equal to 3°.

* * * * *